Nov. 11, 1958
W. G. REICHERT
2,859,498
AUTOMATIC METHOD AND APPARATUS FOR MAKING CASTINGS
Filed Aug. 13, 1954
31 Sheets-Sheet 1
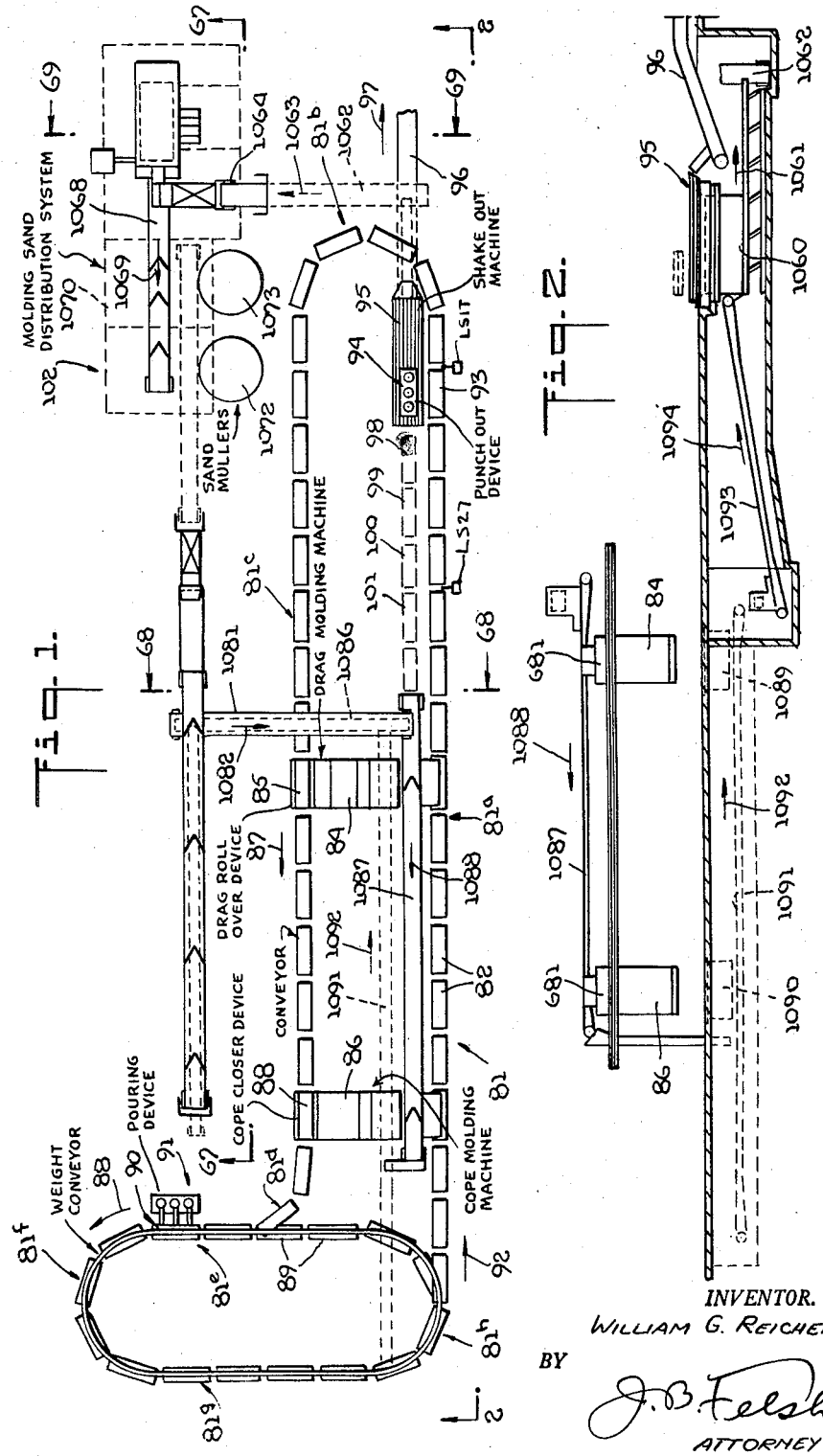
INVENTOR.
WILLIAM G. REICHERT
BY
J. B. Felshin
ATTORNEY Nov. 11, 1958 W. G. REICHERT 2,859,498
AUTOMATIC METHOD AND APPARATUS FOR MAKING CASTINGS
Filed Aug. 13, 1954 31 Sheets-Sheet 2
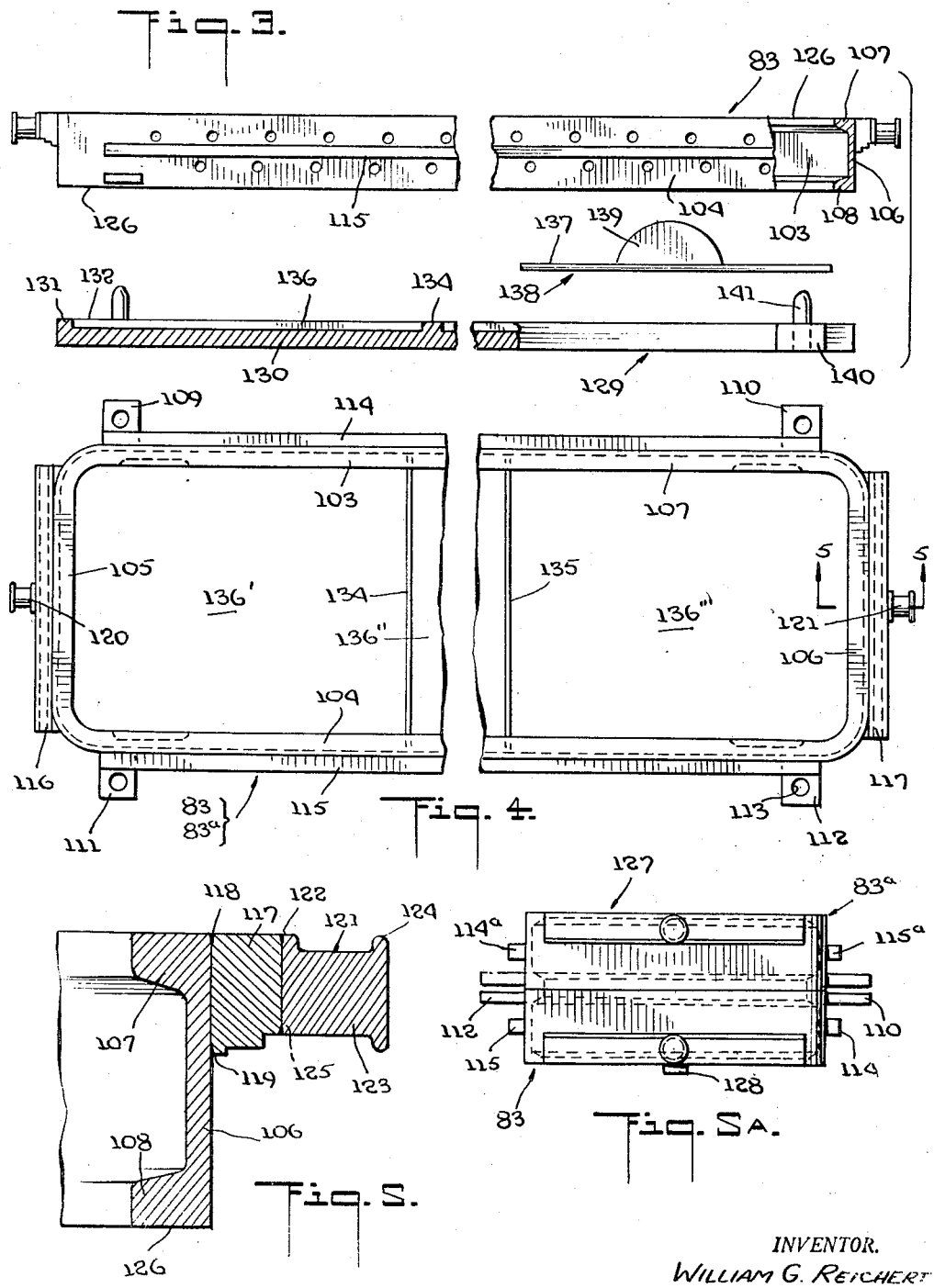
INVENTOR.
WILLIAM G. REICHERT
BY
J. B. Felshin
ATTORNEY

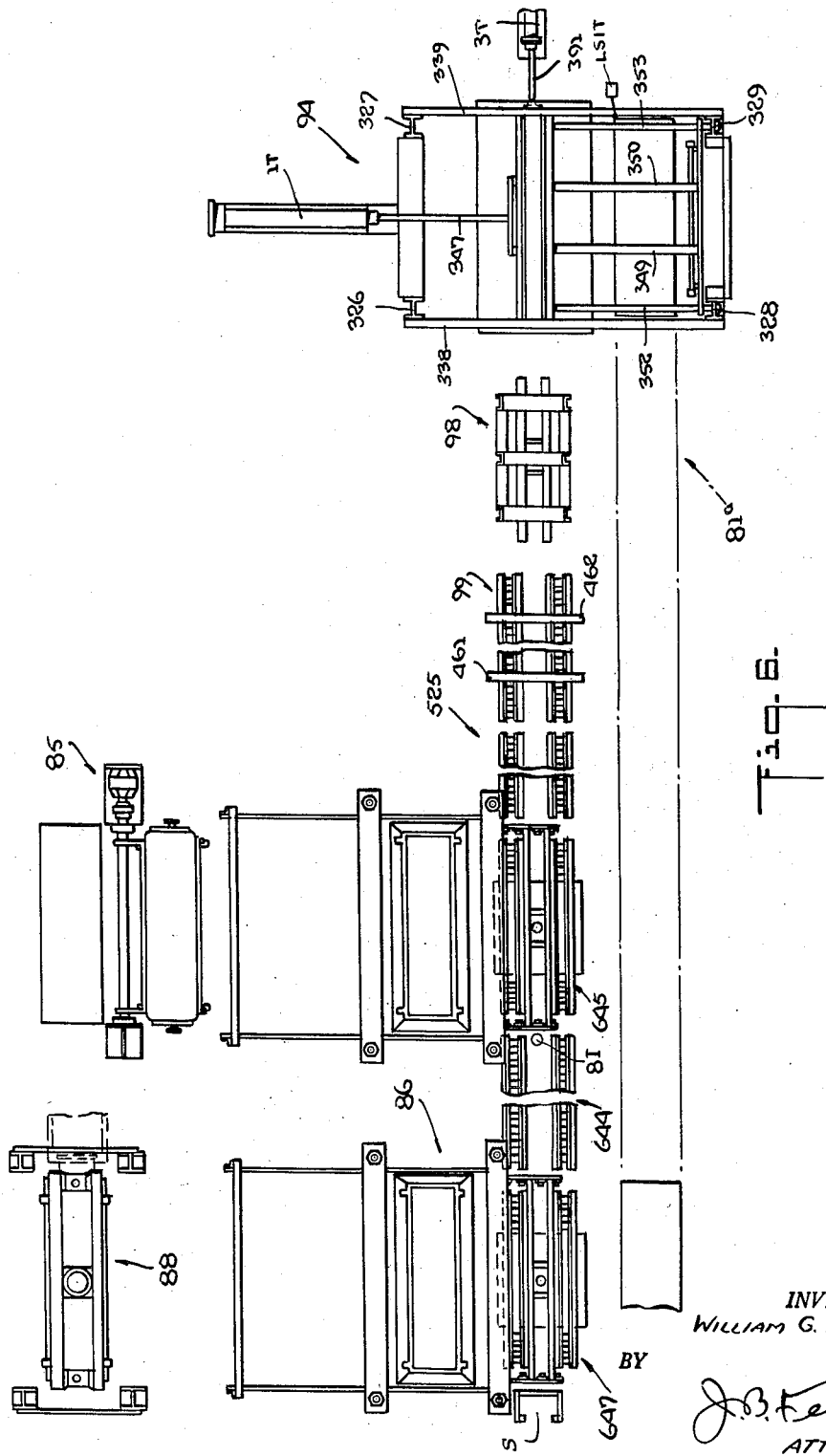

Nov. 11, 1958 W. G. REICHERT 2,859,498
AUTOMATIC METHOD AND APPARATUS FOR MAKING CASTINGS
Filed Aug. 13, 1954 31 Sheets-Sheet 4
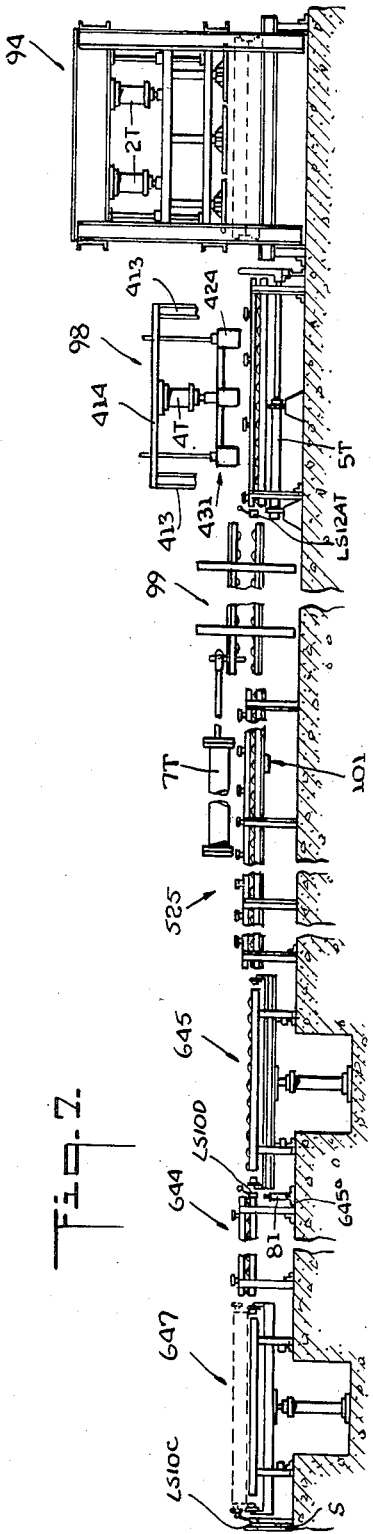
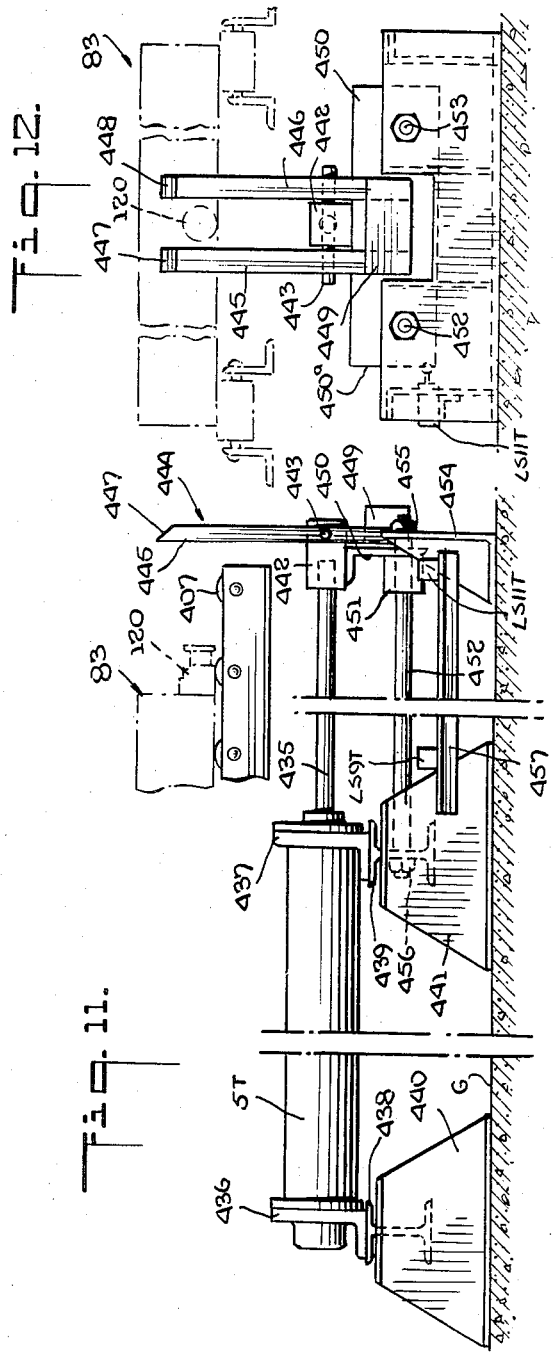
INVENTOR.
WILLIAM G. REICHERT
BY
ATTORNEY Nov. 11, 1958  W. G. REICHERT  2,859,498
AUTOMATIC METHOD AND APPARATUS FOR MAKING CASTINGS
Filed Aug. 13, 1954  31 Sheets-Sheet 5
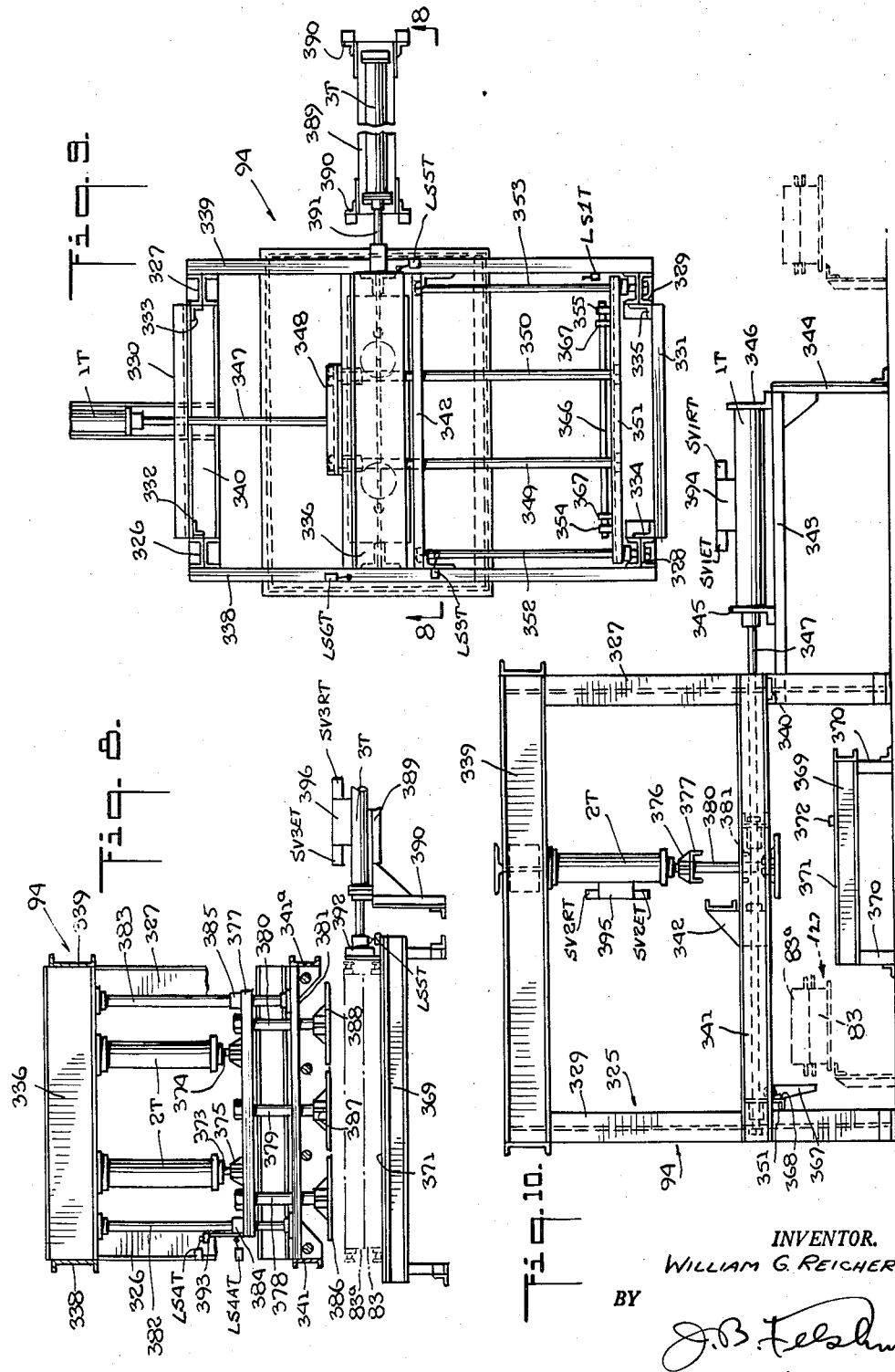
INVENTOR.
WILLIAM G. REICHERT
BY
J.B. Felshin
ATTORNEY

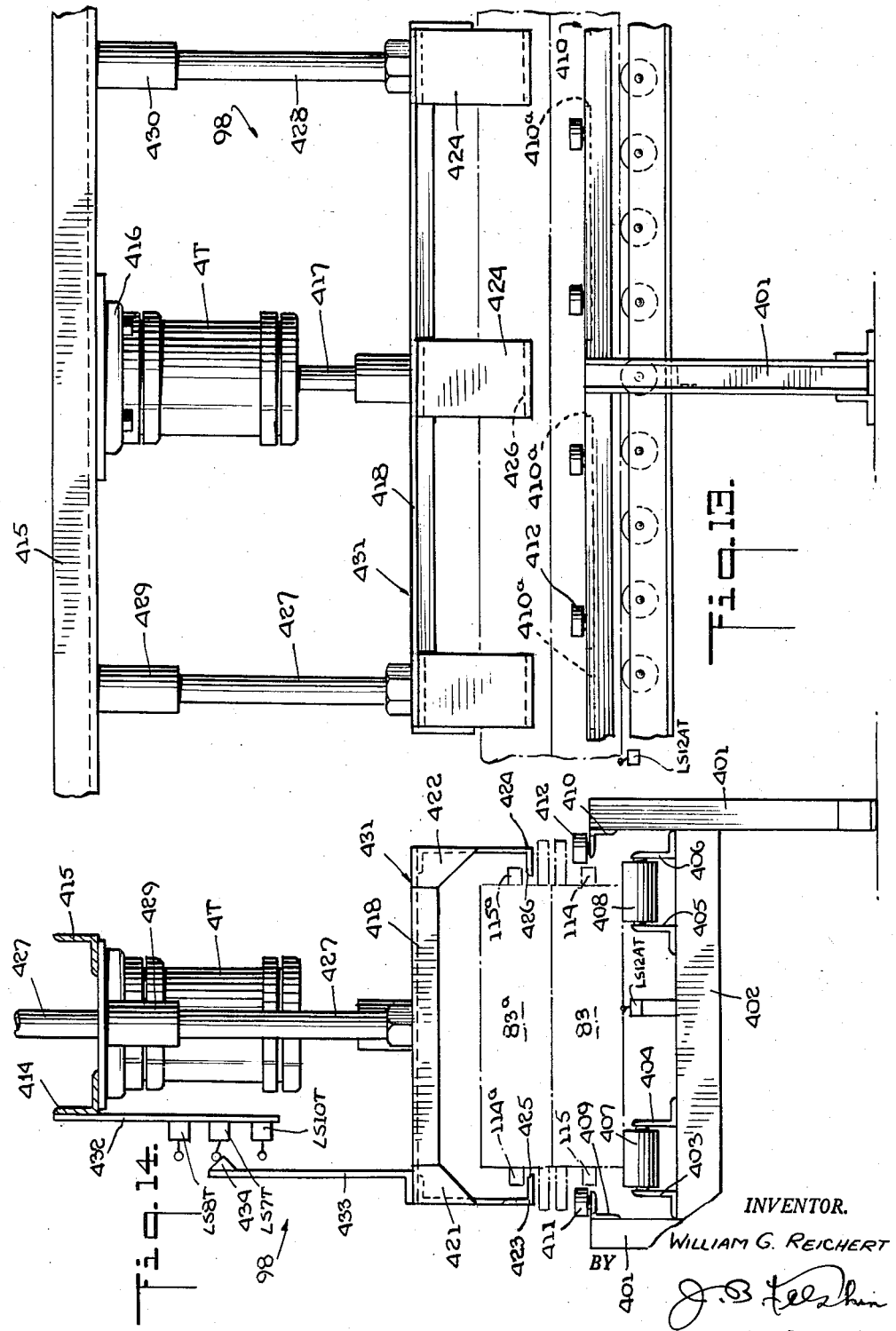

Nov. 11, 1958 W. G. REICHERT 2,859,498
AUTOMATIC METHOD AND APPARATUS FOR MAKING CASTINGS
Filed Aug. 13, 1954 31 Sheets-Sheet 7
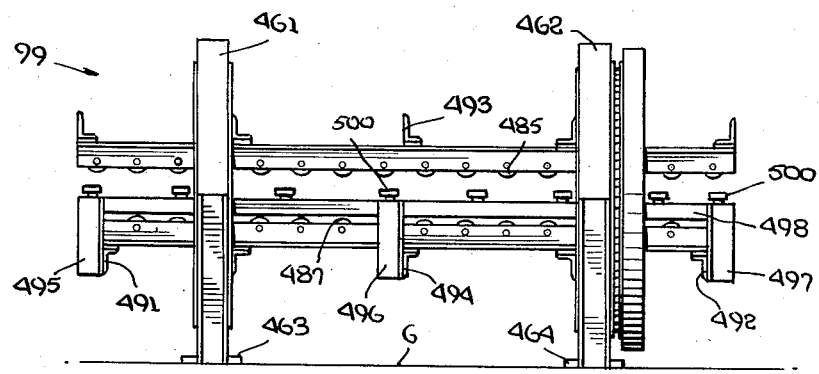
Fig. 15.
Fig. 16.
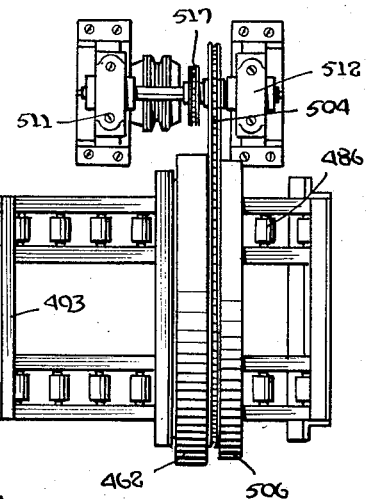
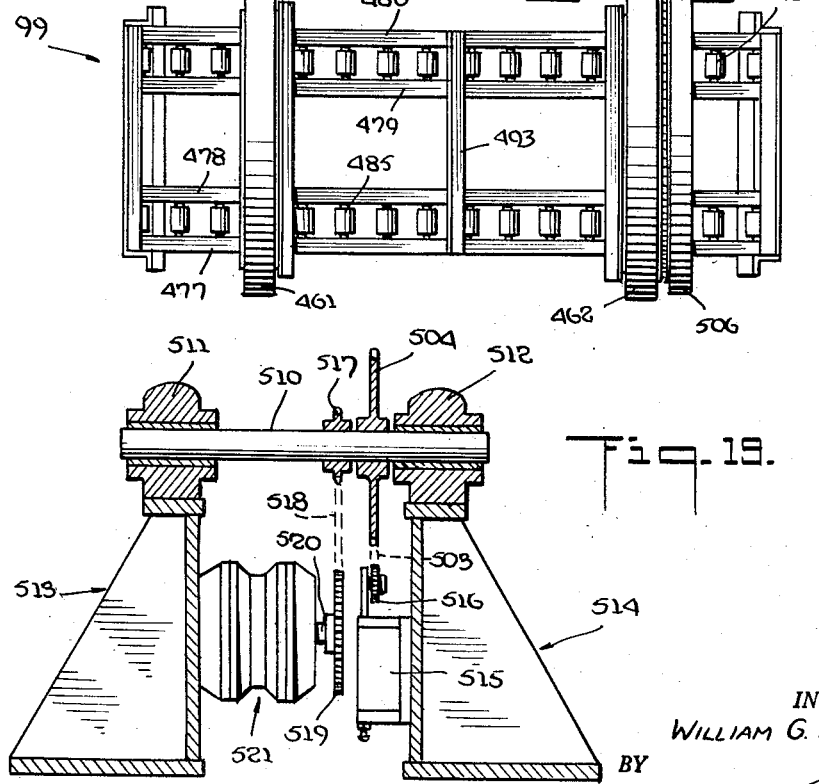
Fig. 19.
INVENTOR.
WILLIAM G. REICHERT
BY
ATTORNEY Nov. 11, 1958  W. G. REICHERT  2,859,498
AUTOMATIC METHOD AND APPARATUS FOR MAKING CASTINGS
Filed Aug. 13, 1954  31 Sheets-Sheet 8

INVENTOR.
WILLIAM G. REICHERT
BY J. B. Feelehun
ATTORNEY

INVENTOR.
WILLIAM G. REICHERT
BY
ATTORNEY

INVENTOR.
WILLIAM G. REICHERT

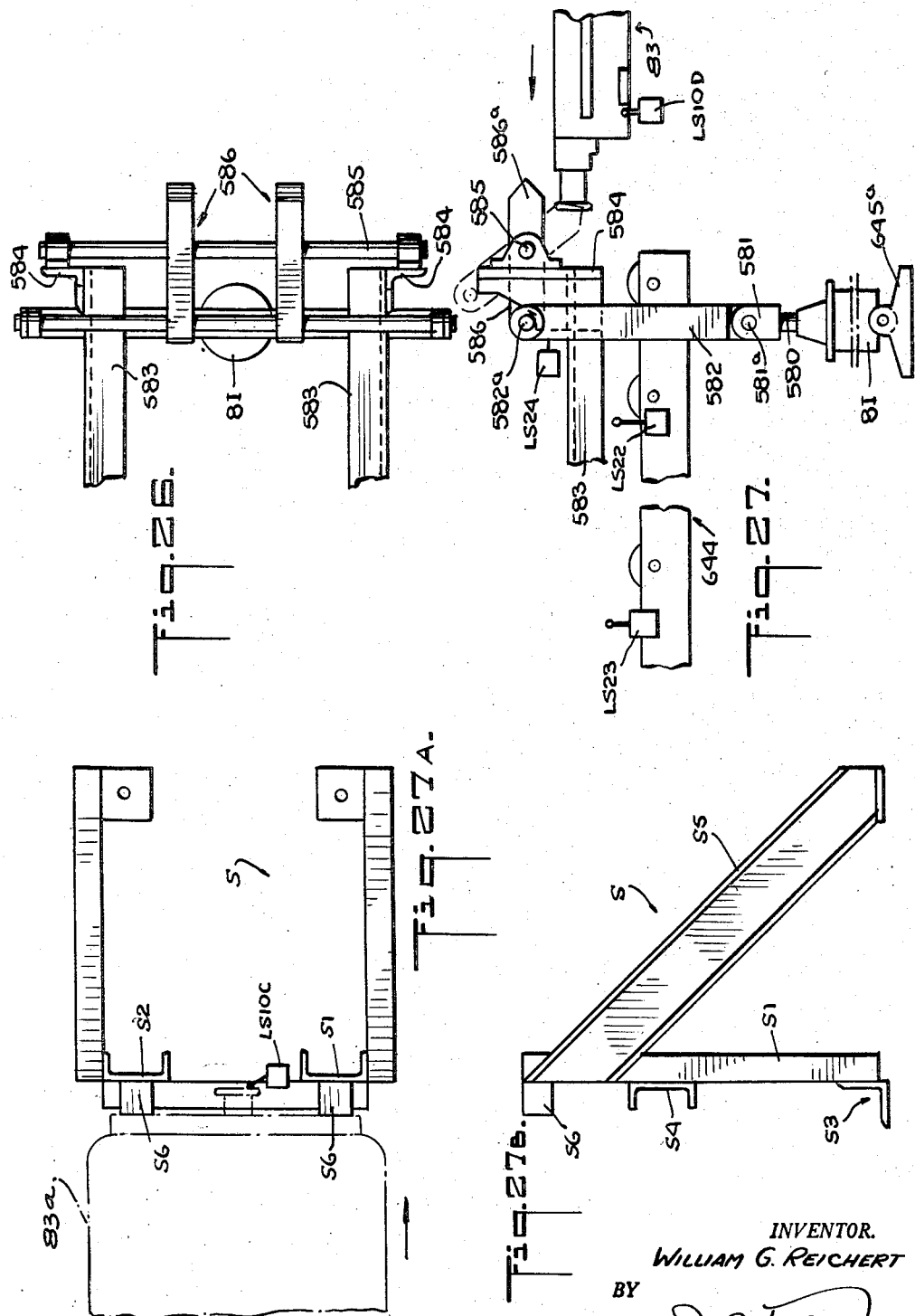

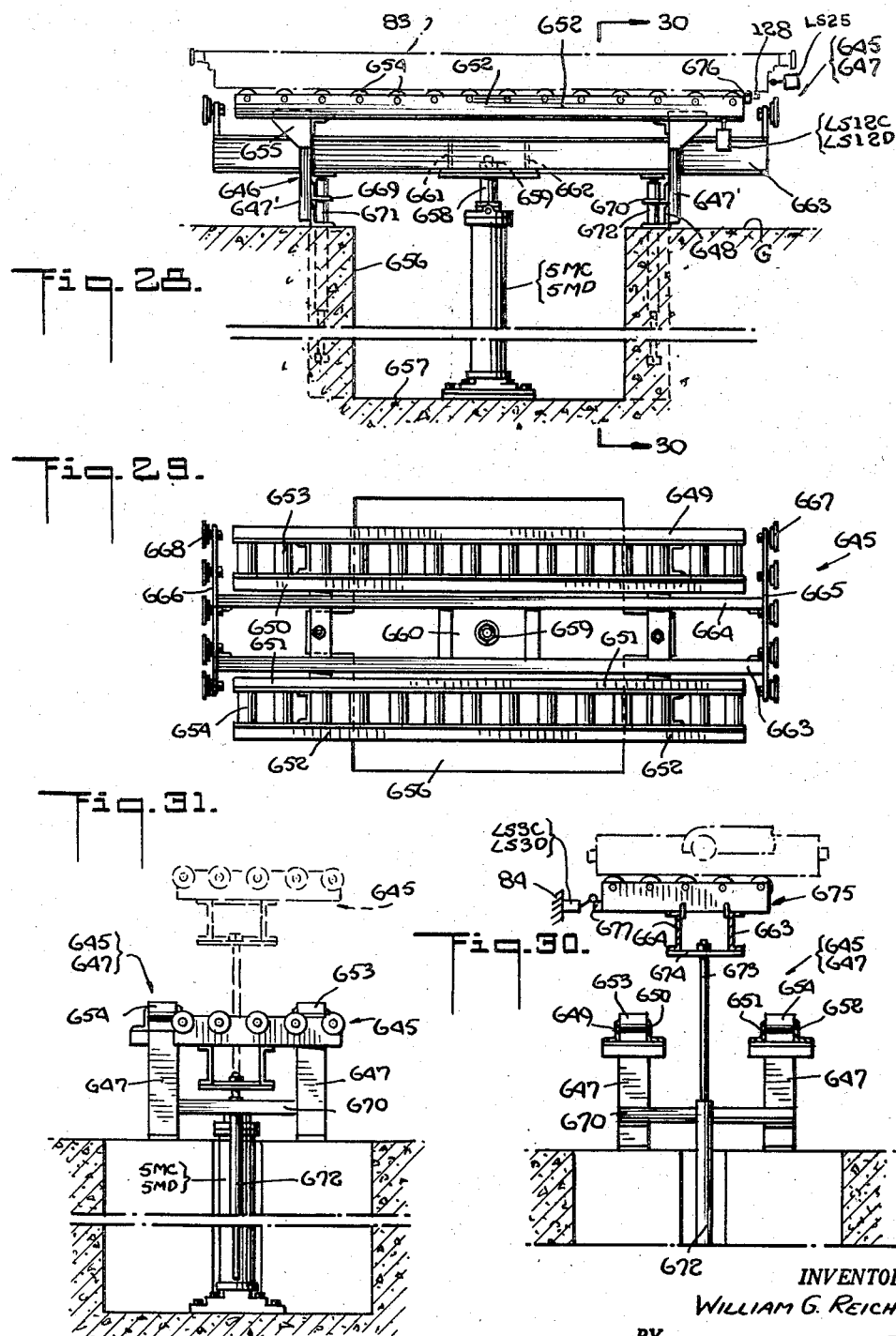

Nov. 11, 1958   W. G. REICHERT   2,859,498
AUTOMATIC METHOD AND APPARATUS FOR MAKING CASTINGS
Filed Aug. 13, 1954   31 Sheets-Sheet 13
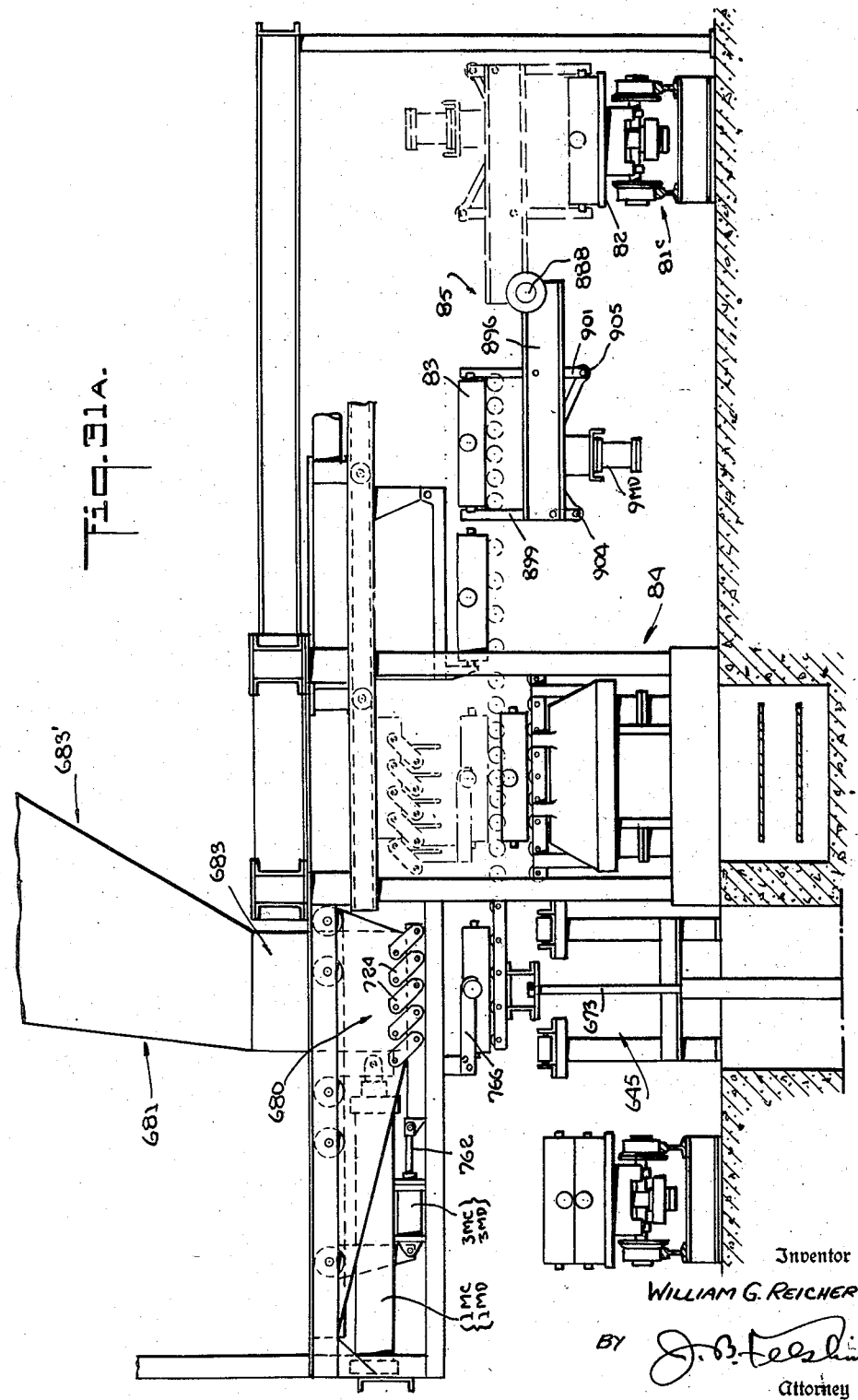

Nov. 11, 1958 W. G. REICHERT 2,859,498
AUTOMATIC METHOD AND APPARATUS FOR MAKING CASTINGS
Filed Aug. 13, 1954 31 Sheets-Sheet 14
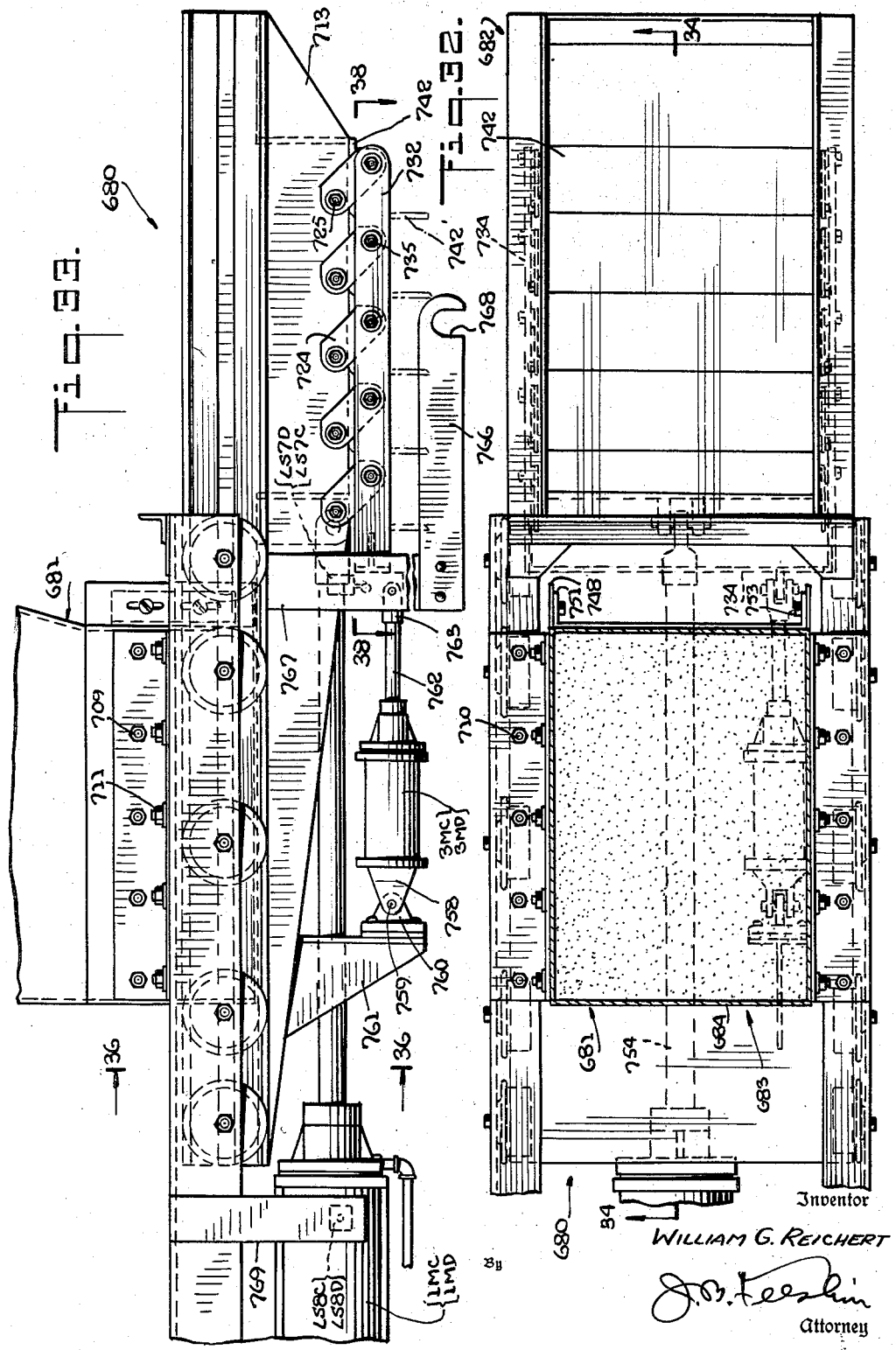
Inventor
WILLIAM G. REICHERT
Attorney

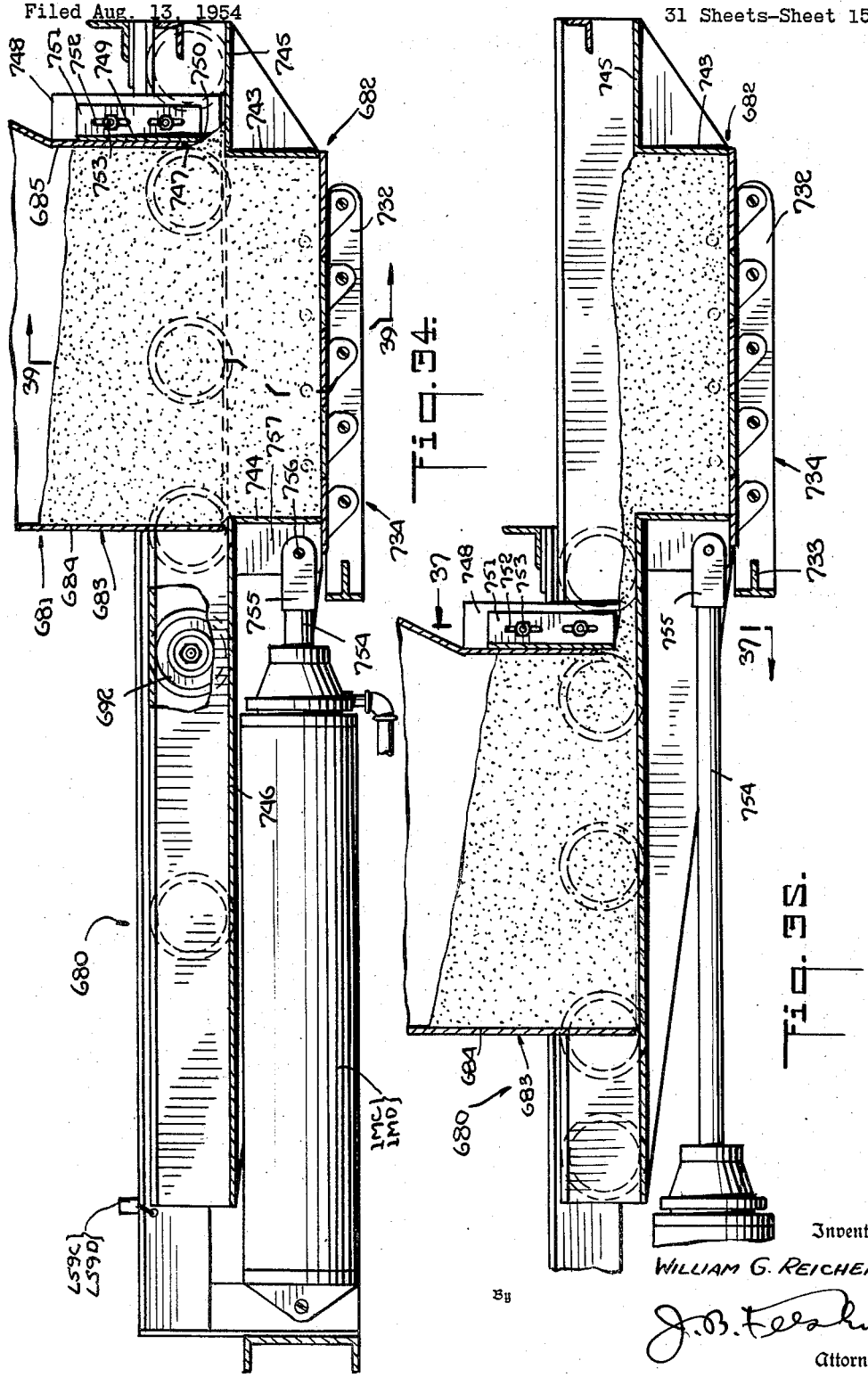

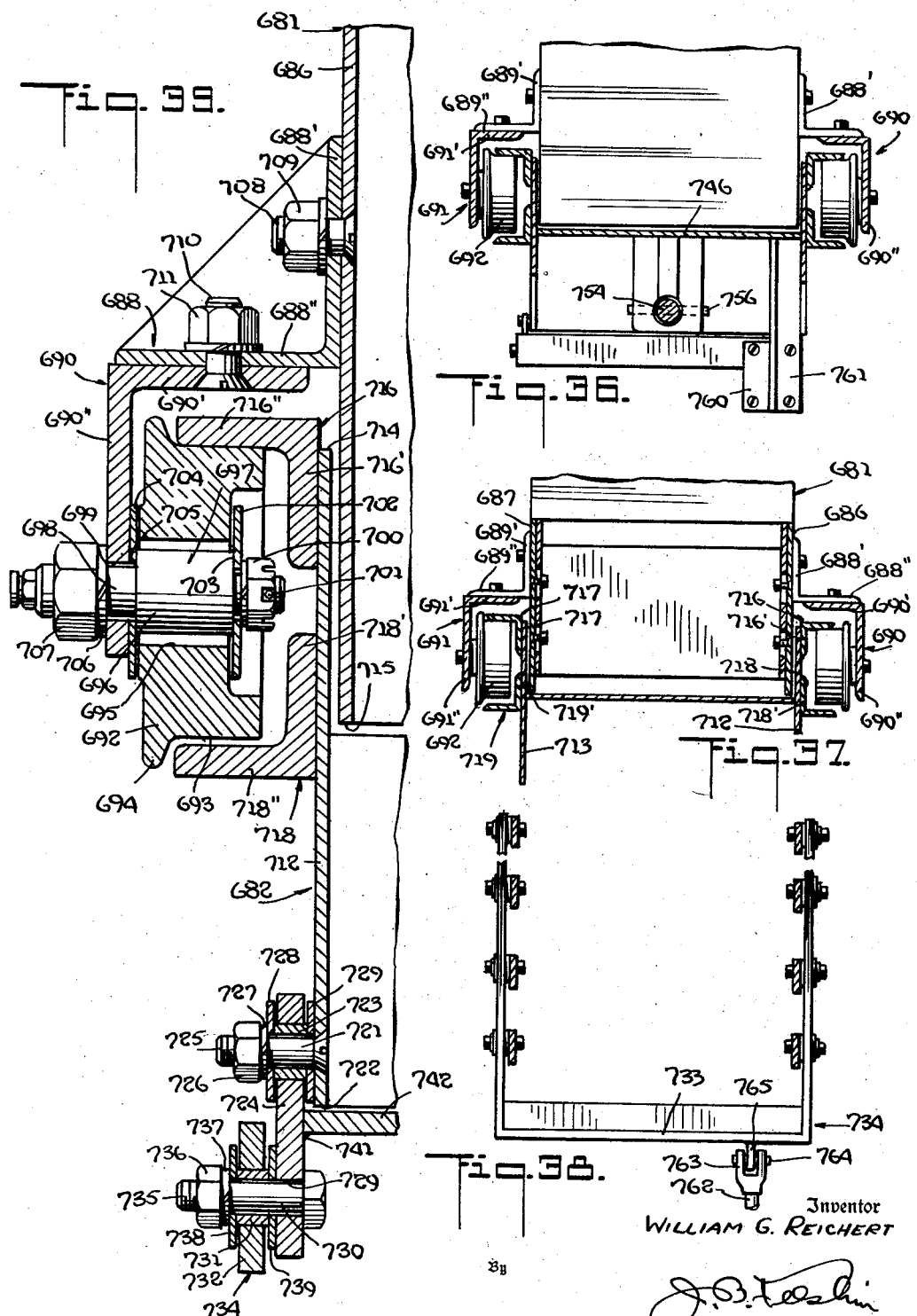

Nov. 11, 1958  W. G. REICHERT  2,859,498
AUTOMATIC METHOD AND APPARATUS FOR MAKING CASTINGS
Filed Aug. 13, 1954  31 Sheets-Sheet 17
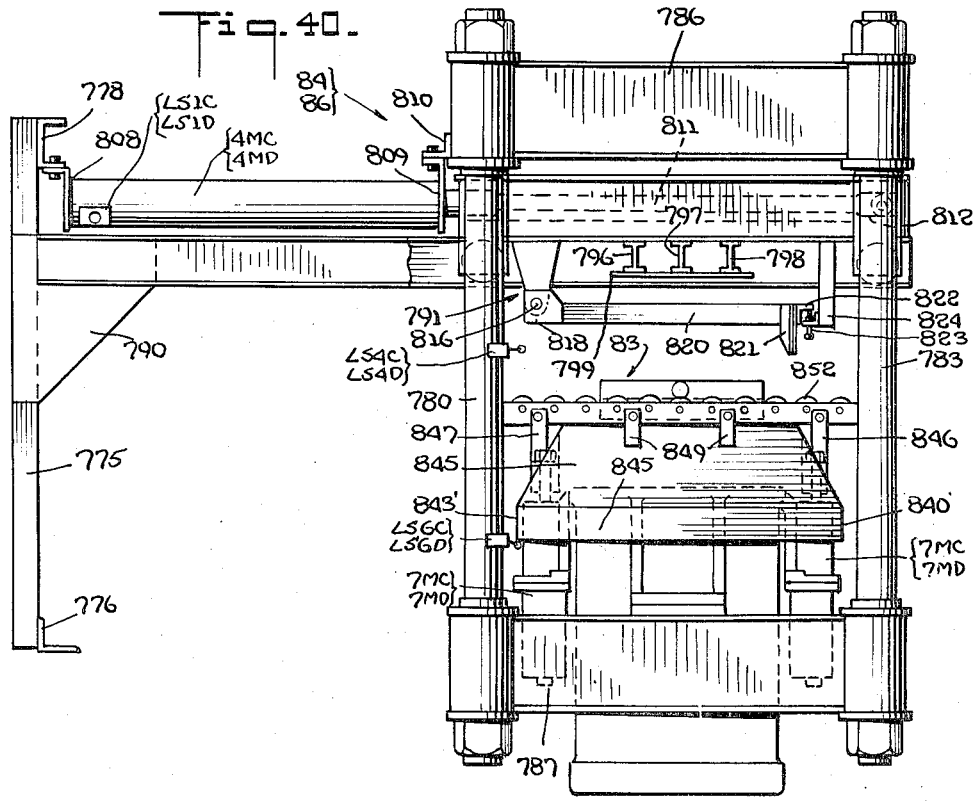
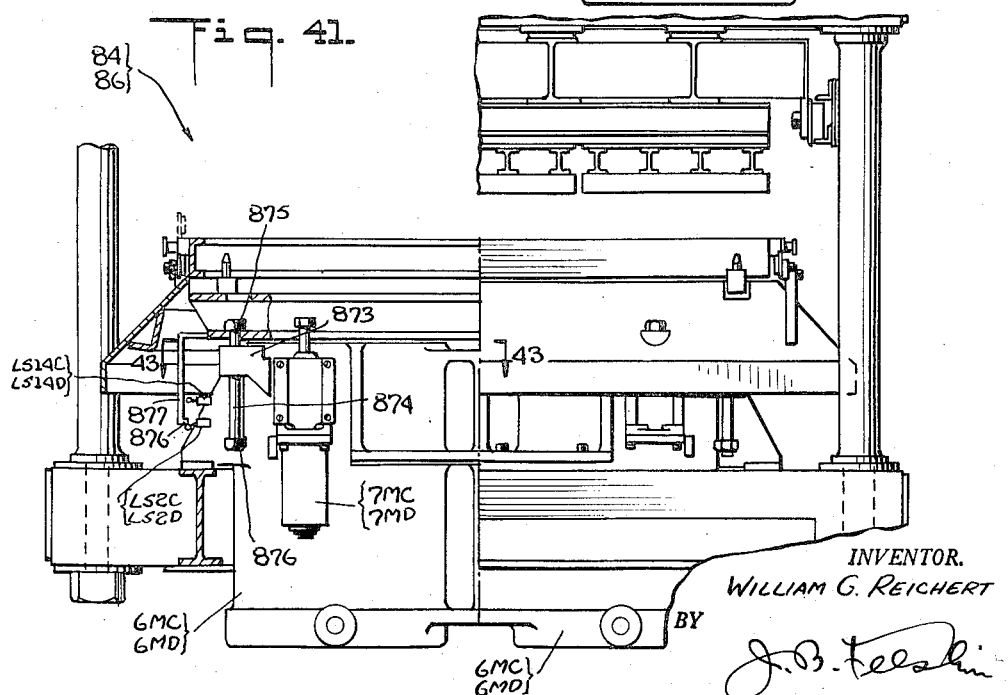
INVENTOR.
WILLIAM G. REICHERT
BY
ATTORNEY

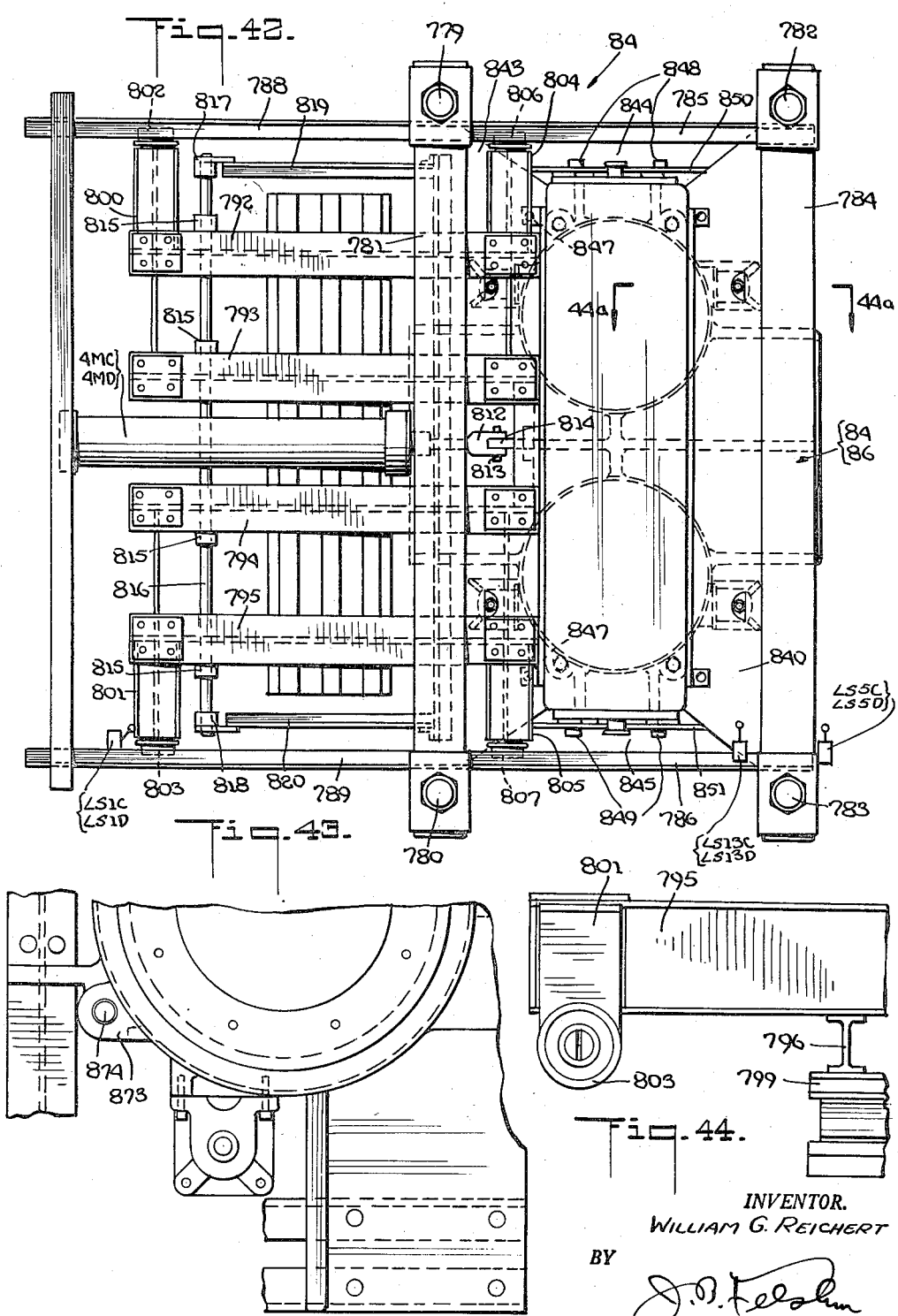

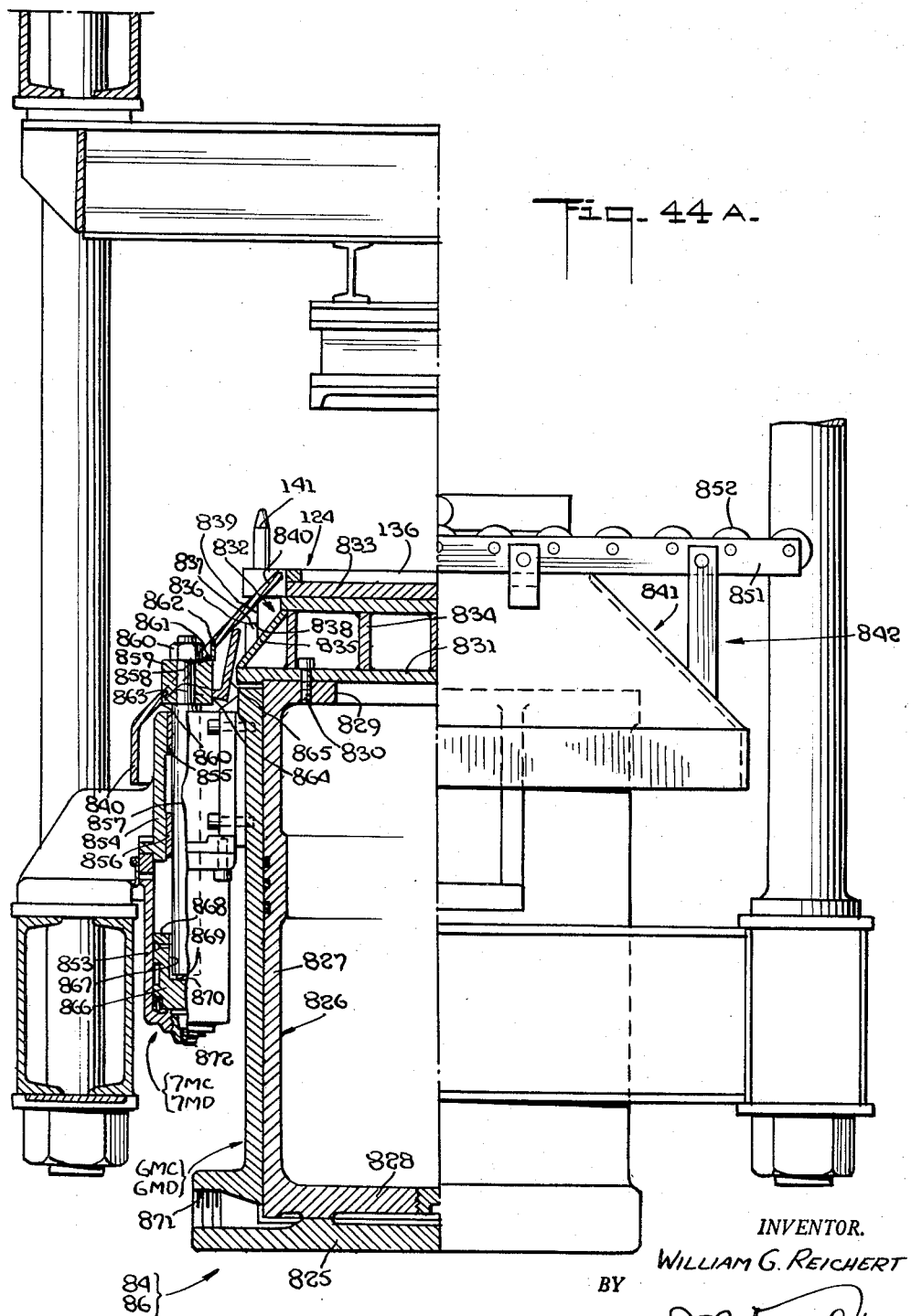

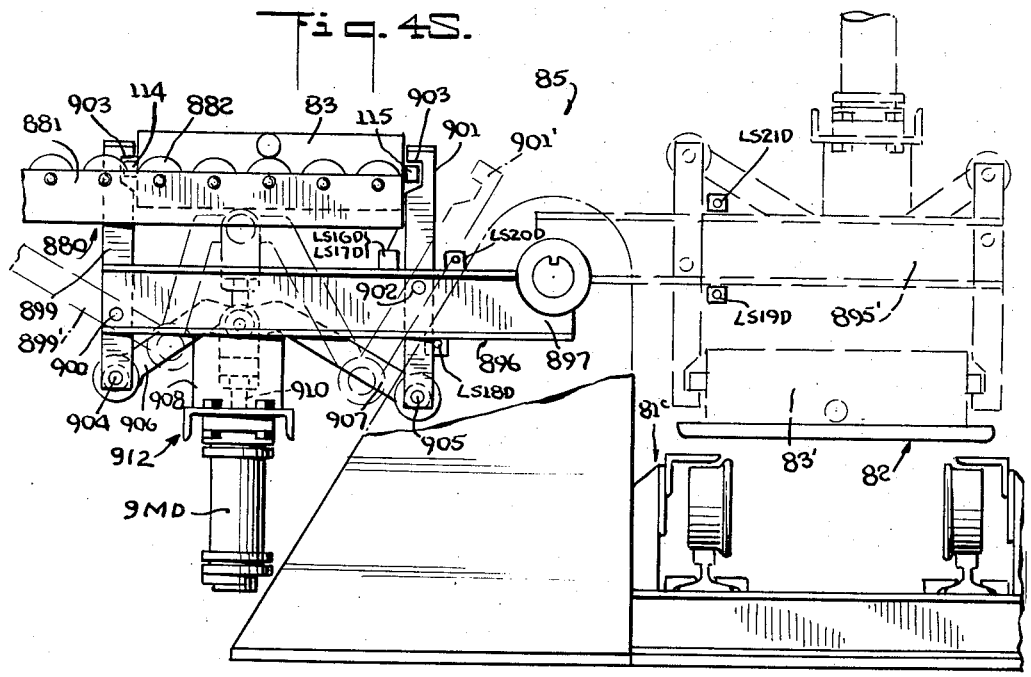
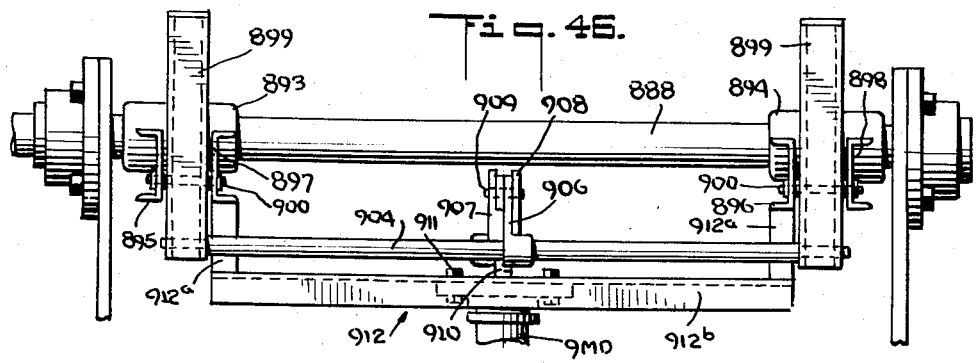
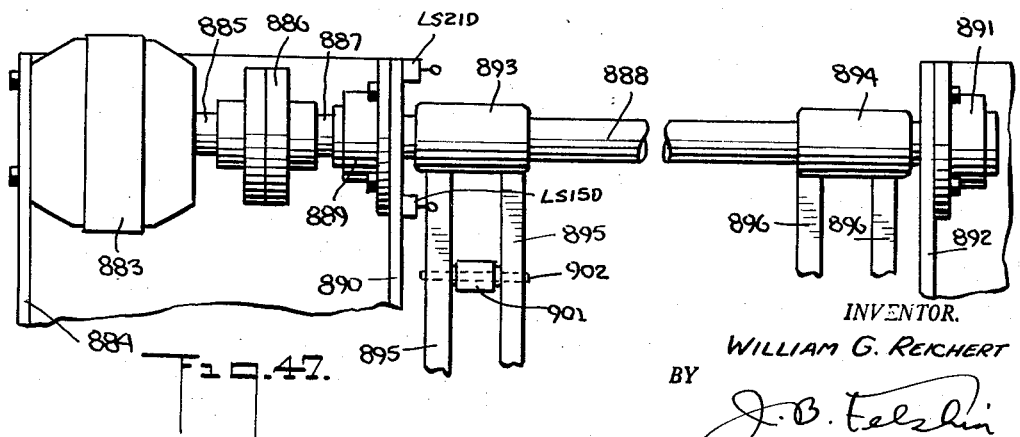

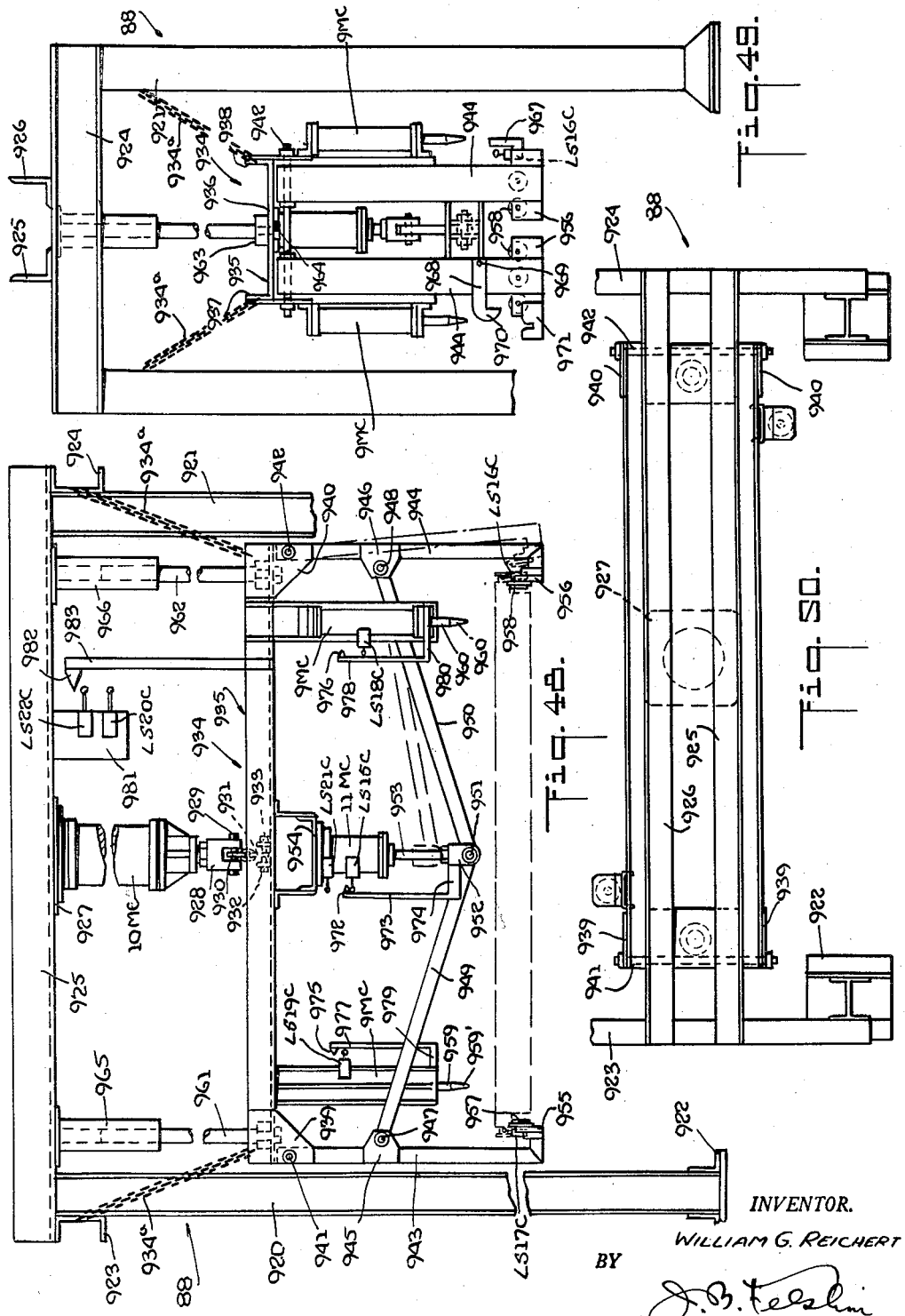

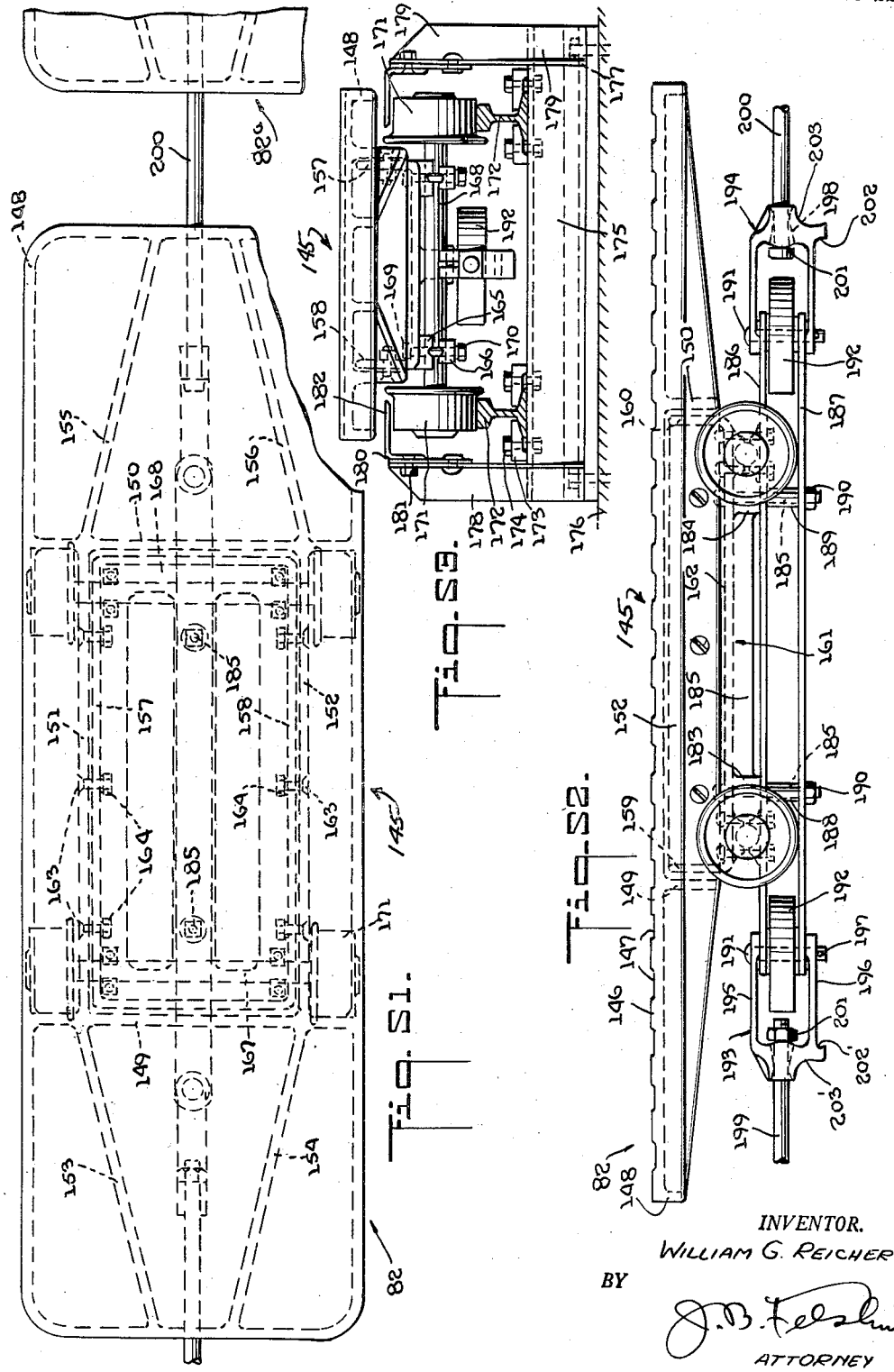

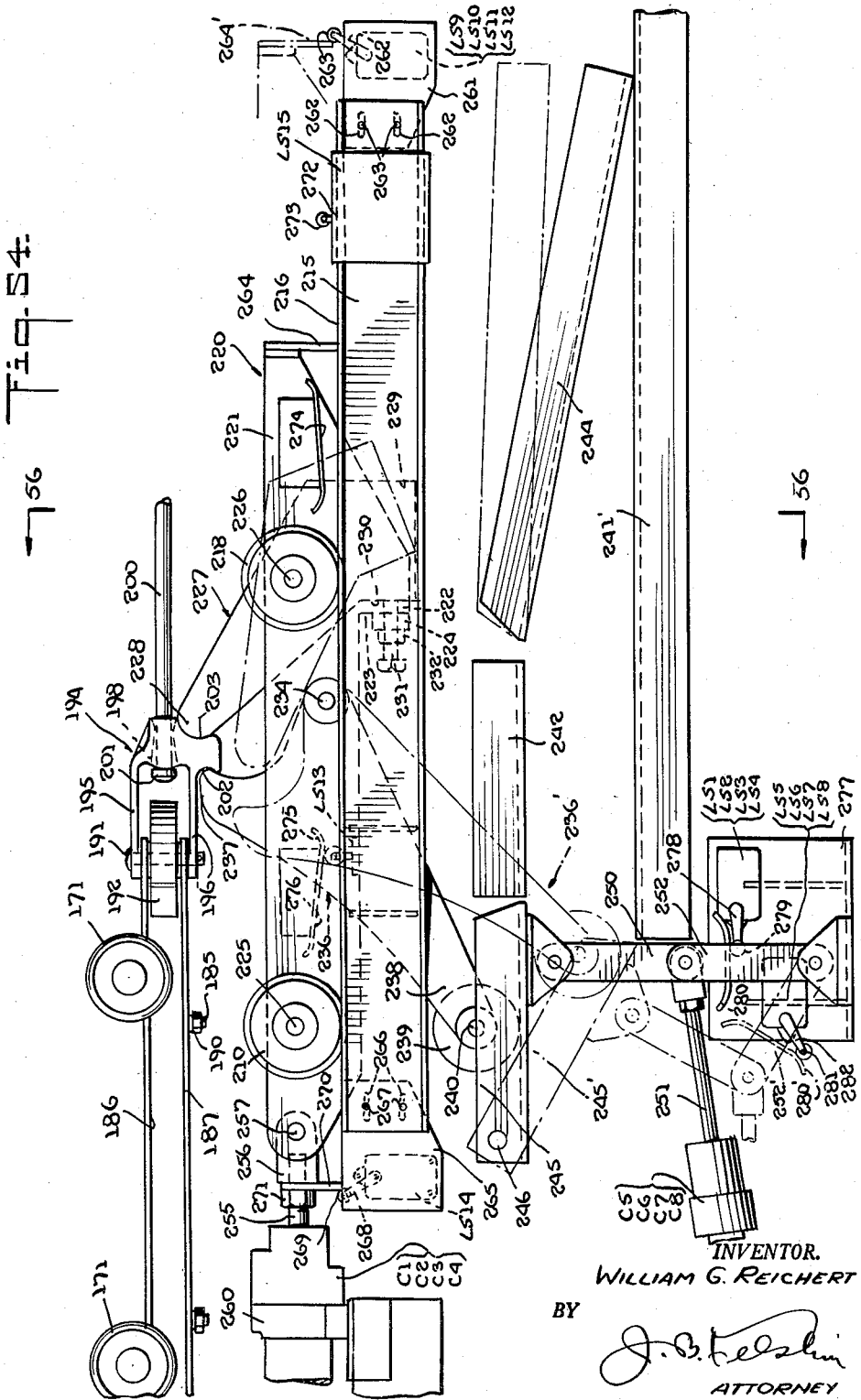

Nov. 11, 1958 W. G. REICHERT 2,859,498
AUTOMATIC METHOD AND APPARATUS FOR MAKING CASTINGS
Filed Aug. 13, 1954 31 Sheets-Sheet 24
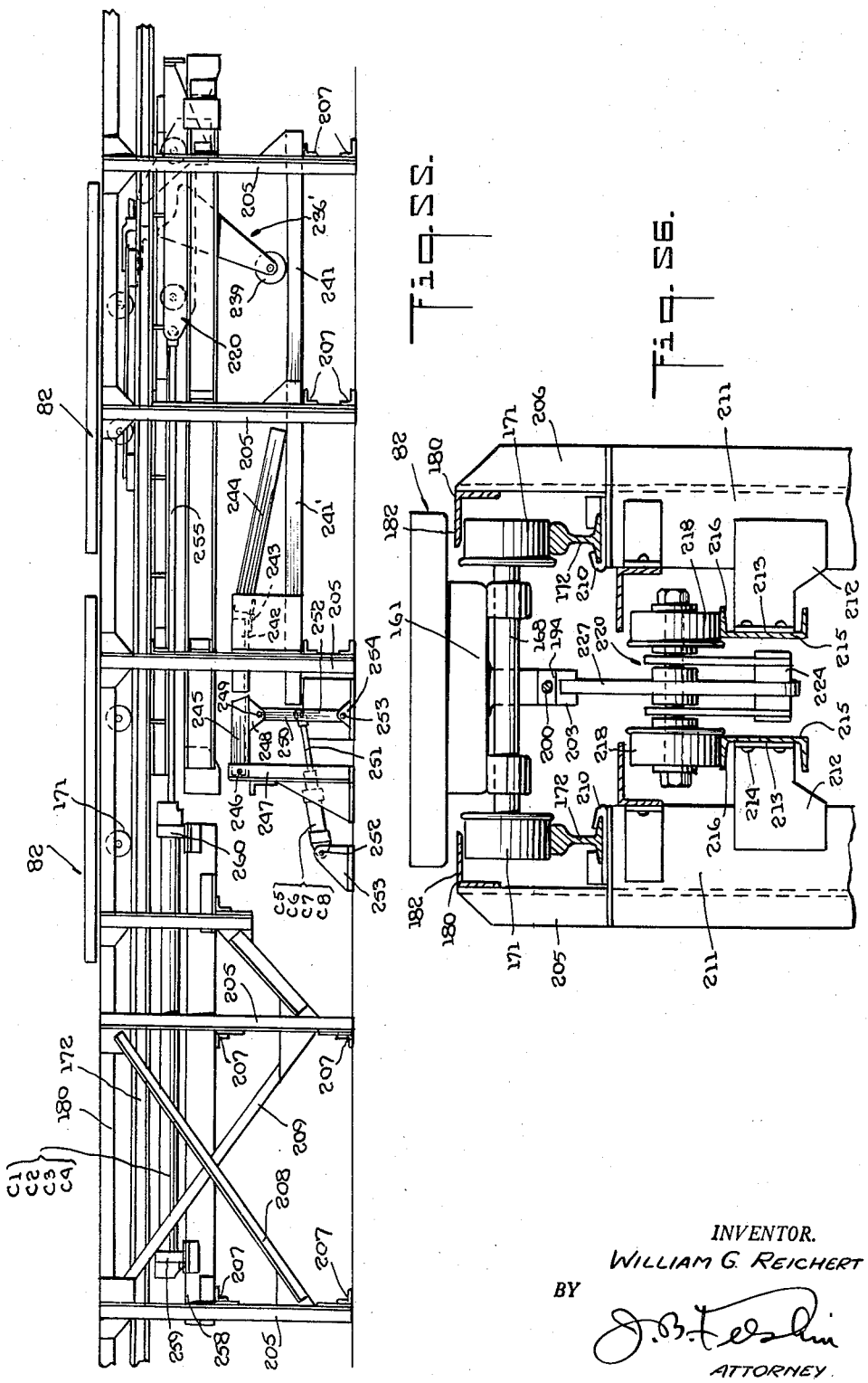
INVENTOR.
WILLIAM G. REICHERT
BY
ATTORNEY

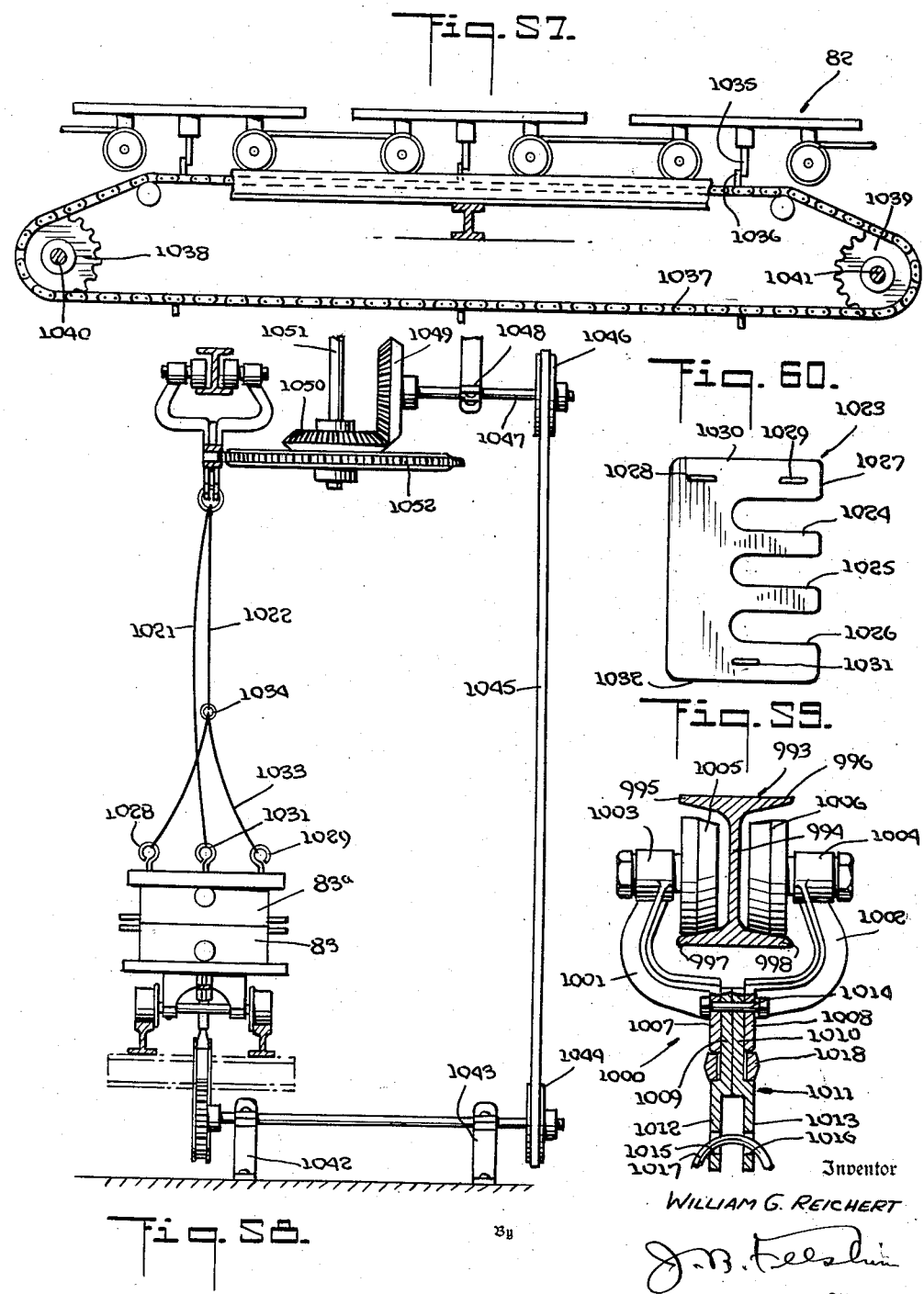

Nov. 11, 1958  W. G. REICHERT  2,859,498
AUTOMATIC METHOD AND APPARATUS FOR MAKING CASTINGS
Filed Aug. 13, 1954  31 Sheets-Sheet 26
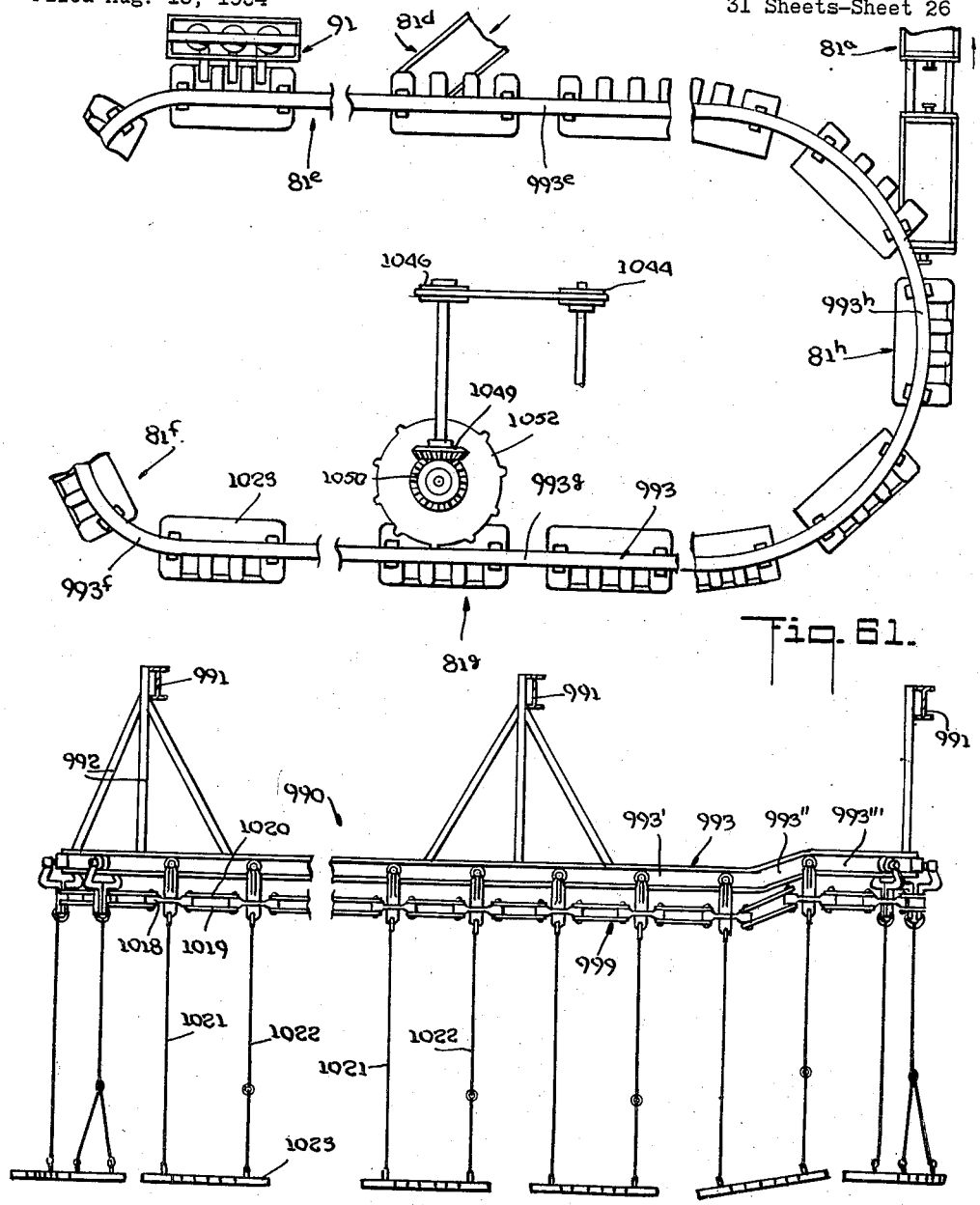
Inventor
WILLIAM G. REICHERT
By
Attorney

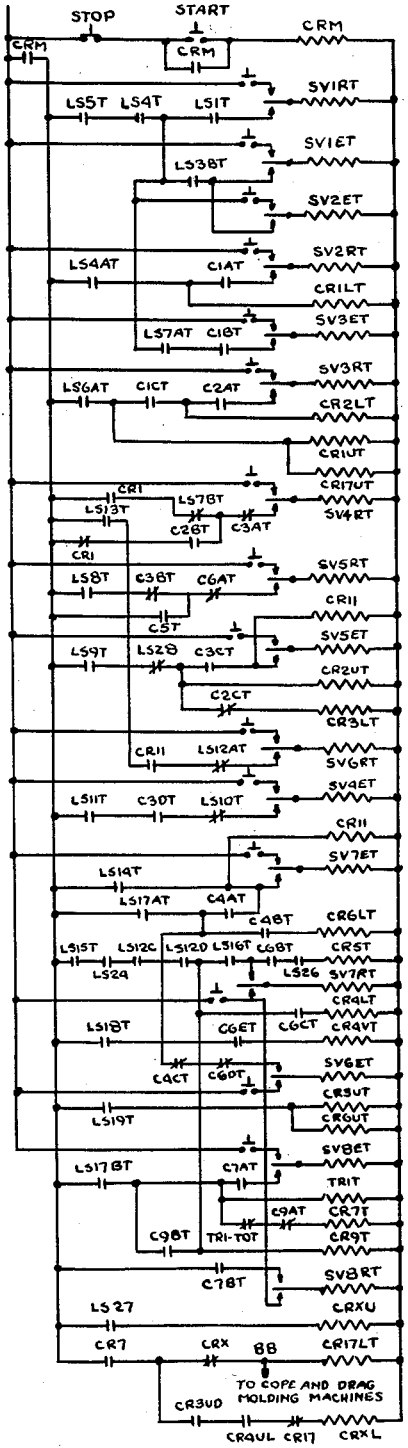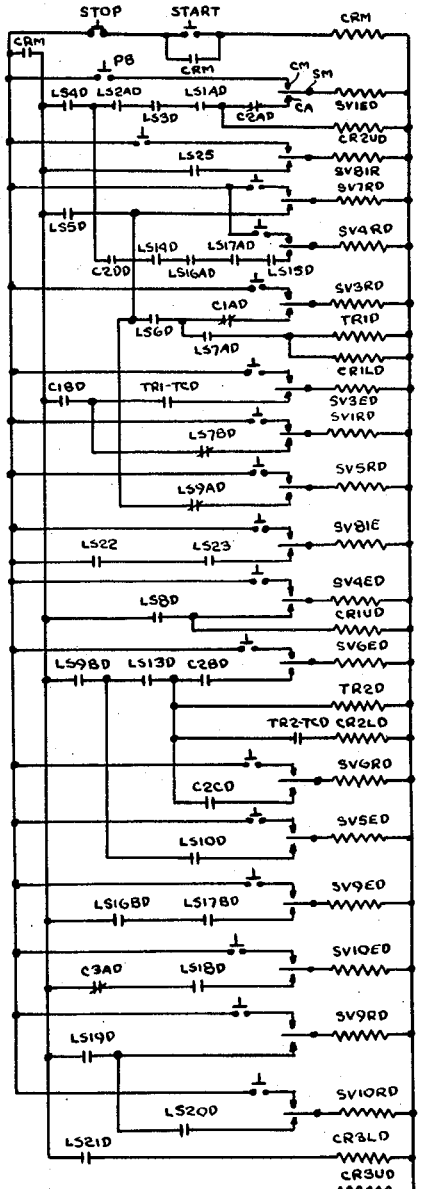
Fig. 6S.
INVENTOR.
WILLIAM G. REICHERT
BY
ATTORNEY

INVENTOR.
WILLIAM G. REICHERT

Nov. 11, 1958  W. G. REICHERT  2,859,498
AUTOMATIC METHOD AND APPARATUS FOR MAKING CASTINGS
Filed Aug. 13, 1954  31 Sheets-Sheet 31
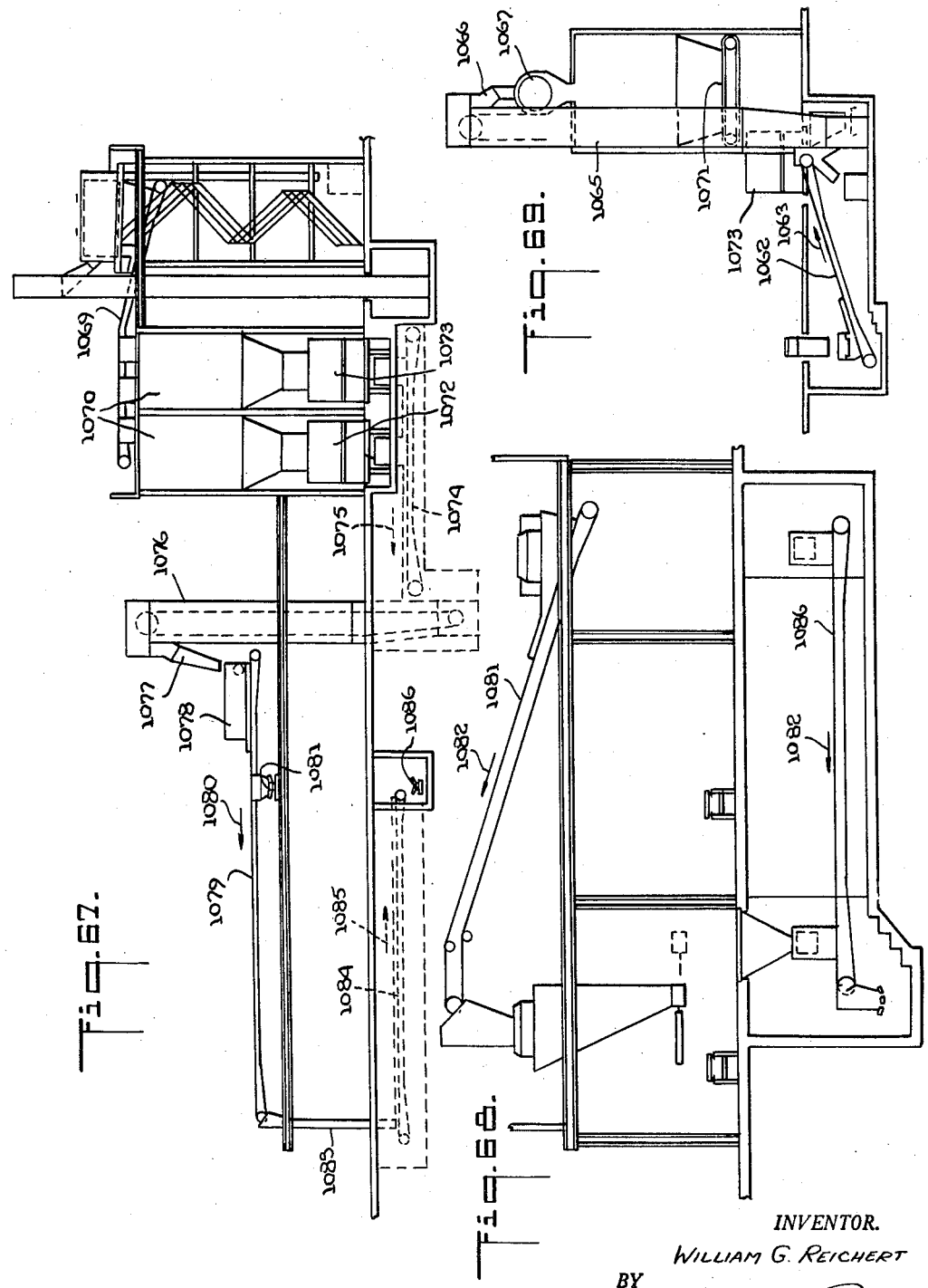
INVENTOR.
WILLIAM G. REICHERT
BY
ATTORNEY United States Patent Office 2,859,498
Patented Nov. 11, 1958

2,859,498
AUTOMATIC METHOD AND APPARATUS FOR MAKING CASTINGS

William G. Reichert, Newark, N. J.

Application August 13, 1954, Serial No. 449,656

72 Claims. (Cl. 22—20)

This invention relates to an automatic apparatus and method for making castings.

It is an object of the present invention to provide a foundry apparatus which separates an empty mold flask into separate drag and cope sections, applies pattern plates to said flask sections, fills the latter with molding sand in which mold impressions are formed by the pattern plates, assembles the cope and drag sections to forms a sand-filled molding flask, pours molten casting metal into said sand mold impressions, allows the metal to cool to form castings, punches out the sand and castings from the flask, and then separates the sections of the flask to repeat the above cycle of operations.

An object is to provide an apparatus of the character described and which is completely automatic in operation and requires no supervision or manual control except for the pouring device which may be push-button operated or of any conventional arrangement.

Still another object is to provide an automatic apparatus of the character described which may be manually controlled if so desired.

A further object is to provide an apparatus of the character described having a novel unstacker device for separating the cope section from the drag section and comprising means for supporting the drag section while raising the cope section upwardly therefrom, means for moving the drag section forwardly beyond the raised cope section, and means for lowering the cope section onto said supporting means after the drag section has been moved out from under the cope section.

Another object is to provide an apparatus of the character described and comprising a conveyor, means for moving the conveyor through successive intermittent index movements, means for placing the sand-filled molding flasks in series on the conveyor which then carries the flasks to the metal-pouring station and then to the punch-out station, and means for successively transferring the flasks from the conveyor to the punch-out device where the sand and castings are removed from the flasks.

A further object is to provide that the conveyor be articulated with a plurality of drive mechanisms for imparting indexing impulses to the conveyor simultaneously at spaced points therearound so as to prevent slack from accumulating throughout the length of the conveyor.

Another object is to provide an automatic control means for actuating the drive mechanisms to impart indexing movements to the conveyor at predetermined intervals.

Still another object is to provide automatic means for preventing indexing movement of the conveyor until the device for transferring the casting-containing flask from the conveyor to the punch-out device, the device for placing the sand-filled drag section on the conveyor, and also the device for placing the sand-filled cope section on the drag section are in their respective proper predetermined positions.

Another object is to provide automatic means for preventing operation of the above three devices until the conveyor has been indexed and is stationary.

A further object is to provide means for placing a weight on each of the assembled flasks before the latter have casting metal poured thereinto and for removing the weight therefrom after the pouring operation.

Another object is to provide an empty drag roll-over device for inverting the empty drag section so that the latter will have its parting plane surface at the bottom to be received by the pattern plate.

Still another object is to provide a vibrator device for vibrating the emptied flask sections to shake out therefrom any molding sand still clinging thereto.

A further object is to provide a flask indexing device which holds back the entire line of empty flask sections and permits two flask sections at a time to move forwardly to the cope and drag molding machines, respectively, where the sections are again filled with sand.

Another object is to provide a foundry apparatus of the character described comprising a sand casting apparatus comprising means to support a horizontal flask comprising a cope section assembled on top of a drag section at an unstacker station, means to raise the cope section above the drag section at said unstacker station, means to move the drag section longitudinally forwardly to an empty drag roll-over station beyond the raised cope section, means to invert the advanced drag section, means to lower the raised cope section to the level of the advanced and inverted drag section, means to advance the inverted drag section from said roll-over station to a vibrator station, means to move the lowered cope section to said roll-over station, means to vibrate said drag section at said vibrator station to shake out sand clinging thereto, means to advance the drag section from said vibrator station to an index station, means to advance the cope section from said roll-over station to said vibrator station, means to vibrate the cope at said vibrator station, means to advance the cope section to the index station, means to advance the cope and drag sections, with the drag section behind the cope section; beyond the index station, a drag elevator beyond the index station, a cope elevator beyond the drag elevator, said drag elevator comprising means to raise the drag section, means to move the raised drag section at right angles to the direction of previous movement of the cope and drag sections to a drag molding station, a molding means at said drag molding station and having a pattern plate, said molding means having means to assemble the pattern plate with the drag section at the underside thereof, means to pour sand into the upper open end of the drag section and over the pattern plate, means to compress the poured sand against the pattern plate, means to cause relative movement between the pattern plate and the sand-filled drag section to remove the pattern plate therefrom to a position below the drag section, means to move the drag section from the molding station to a filled drag station, a conveyor, means to reinvert the drag section so that it is right-side-up and place the drag section on said conveyor, said cope elevator having means to raise the cope section, means to move the raised cope section at right angles to said direction of previous movement to a cope molding station, a molding means at said cope molding station and having a pattern plate, means to assembly said last-mentioned pattern plate to the underside of the cope section, means to pour sand into the upper open end of the cope section to fill the same and cover the pattern plate thereunder, means to compress the sand against the pattern plate, means to disassemble the pattern plate from the cope section, means to move the cope section to a cope closer station in vertical alignment above said conveyor, said conveyor having means to move the filled drag section to a position beneath the cope section at said cope closer station, cope closing means for assembling the cope section in superimposed relation to the drag section to form a molding flask supported on said conveyor, means to place a weight on the supported flask, means to pour molten casting metal into the weighted flask, means to remove said weight from the flask after the pouring operation, said conveyor including means to move the flask filled with casting metal to a punch-out station, means at the punch-out station to punch out the castings and sand from the flask, and means to move the empty flask from the punch-out station to said unstacker station.

Still another object is to provide a foundry apparatus of the character described comprising a continuous circuitous conveyor having means for supporting a series of flask sections in end-to-end relation, means for indexing the conveyor through intermittent movements each of a distance equal to the spacing between alternate flask sections, and a plurality of flask section treating means adjacent the conveyor for subjecting said flask sections to various operations, said plurality of treating means including means to support a horizontal flask comprising a cope section assembled on top of a drag section at an unstacker station, means to separate the cope section from the drag section at said unstacker station, means to move the drag section to an empty drag roll-over station, means to invert the drag section, means to move the drag section to a drag molding station, a molding means at said drag molding station and having a pattern plate, said molding means having means to assemble the pattern plate with the drag section at the underside thereof, means to pour sand into the upper open end of the drag section and over the pattern plate, means to compress the poured sand against the pattern plate, means to cause relative movement between the pattern plate and the sand-filled drag section to remove the pattern plate therefrom, means to move the drag section from the molding station to a filled drag station, means to reinvert the drag section so that it is right-side-up and place the drag section on said conveyor, means to move the cope section to a cope molding station, a molding means at said cope molding station and having a pattern plate, means to assemble said last-mentioned pattern plate to the underside of the cope section, means to pour sand into the upper open end of the cope section to fill the same and cover the pattern plate thereunder, means to compress the sand against the pattern plate, means to disassemble the pattern plate from the cope section, means to move the cope section to a cope closer station in vertical alignment above said conveyor, said conveyor having means to move the filled drag section to a position beneath the cope section at said cope closer station, cope closer means for assembling the cope section in superimposed relation to the drag section to form a molding flask supported on said conveyor, means to pour molten casting metal into the weighted flask, whereby a series of flasks filled with casting metal are placed on said conveyor so as to be transported thereby during the indexing movements thereof, means for successively removing one of said metal-filled flasks from the conveyor at a transfer station after each index movement of the conveyor, and moving said removed flasks to a punch-out station, means at the punch-out station to punch out the casting and sand from the flask, and means to move the empty flasks from the punch-out station to said unstacker station.

A further object is to provide a foundry apparatus of the character described comprising automatic control means for actuating the various flask treating devices and the conveyor drive mechanism in properly timed sequence.

Another object is to provide an automatic control means of the character described comprising a plurality of fluid-actuated means for operating said flask treating devices and the conveyor drive mechanism, valve means for controlling said fluid-actuated means, solenoid means for actuating said valve means, and electrical circuit means for energizing said solenoid means in properly timed sequence.

Still another object is to provide limit switches actuable by said flask treating devices and the conveyor drive mechanism for controlling the operation of said electrical circuit means in response to the respective positions of said devices and said drive mechanism, whereby the operation of said flask treating devices and drive mechanism are interdependent on and controlled by each other.

A further object is to provide a pair of novel sand measuring devices, one for the cope sections and the other for the drag sections, each sand measuring device comprising a hopper containing a supply of molding sand, a measuring box movable from a first position where it engages a flask section and receives a predetermined quantity of sand from the hopper to a second position over the respective molding machine to which second position it pulls the engaged flask section and gate members on the measuring box which open to permit the sand to be discharged therefrom into the flask section.

Another object is to provide a novel molding machine comprising a squeeze car having a strike-off member and movable from a first position to a second position over the sand-filled flask section to cause the strike-off member to remove the excess sand from the top of the flask section and movable back to the first position to cause the strike-off member to pull the flask section from the molding machine to the next flask treating device.

Still another object is to provide an apparatus of the character described comprising a novel sand distribution system including sand processing means, means for conveying spilled sand, excess sand struck off from the flask sections by the strike-off member, and also sand punched out from the flask sections to said sand processing means, and means for conveying processed sand from said sand processing means to the hoppers of the sand measuring devices.

A further object is to provide a novel method of making castings and having the advantages and objects noted above with respect to the apparatus.

Other objects and advantages of the present invention are inherent in the structure as claimed and disclosed or will become apparent to those skilled in the art as the detailed description proceeds.

In the drawings:

Fig. 1 is a schematic top plan view of the foundry apparatus embodying the present invention;

Fig. 2 is a side elevational view taken on line 2—2 of Fig. 1;

Fig. 3 is an exploded side elevational view, partly broken away, of a flask section, a pattern plate, and a dish plate;

Fig. 4 is a top plan view of a flask section;

Fig. 5 is a vertical sectional view taken on line 5—5 of Fig. 4;

Fig. 5a is an end elevational view showing two flask sections in assembled relation to form a complete flask comprising a cope flask section and a drag flask section;

Fig. 6 is a top plan view showing several parts of the apparatus including the punch-out device, the empty drag roll-over device, the vibrator, the elevators, and the molding machines, drag rollover and cope closing device;

Fig. 7 is a side elevational view of the devices shown in Fig. 6 except for the molding machines, drag rollover and cope closer. Fig. 7 also showing the unstacker device for separating the cope section from the drag section;

Fig. 8 is a vertical sectional view of the punch-out device on line 8—8 of Fig. 9;

Fig. 9 is a top plan view of the punch-out device;

Fig. 10 is an end elevational view of the latter;

Fig. 11 is a side elevational view showing the cylinder-actuated device under the unstacker device for moving the flask sections to the latter device from the punch-out device;

Fig. 12 is an end view of the structure shown in Fig. 11;

Fig. 13 is a side elevational view of the unstacker;

Fig. 14 is an end elevational view thereof;

Fig. 15 is a side elevational view of the empty drag roll-over device;

Fig. 16 is a top plan view of said drag roll-over device;

Fig. 19 is a vertical sectional view on line 19—19 of Fig. 17;

Fig. 26 is a partial top plan view of a flask stop for the drag elevator;

Fig. 27 is a side elevational view of the structure of Fig. 26;

Fig. 27A is a top plan view of a flask stop for copes at the cope elevator;

Fig. 27B is a side elevational view of the structure shown in Fig. 27A;

Fig. 28 is a side elevational view of one of the two elevators;

Fig. 29 is a top plan view of the elevator shown in Fig. 28;

Fig. 30 is a vertical sectional view on line 30—30 of Fig. 28 but shows the elevator in its raised position.

Fig. 31 is an end elevational view of the elevator in the raised position;

Fig. 31a is a transverse vertical sectional view of the apparatus showing the inter-relationship of the drag elevator, sand measuring device, filled drag roll-over device, and the main conveyor;

Fig. 32 is a top plan view on the sand measuring device;

Fig. 33 is a side elevational view thereof;

Fig. 34 is a vertical sectional view taken on line 34—34 of Fig. 32;

Fig. 35 is a vertical sectional view similar to Fig. 34 but shows the sand measuring device in the extended position;

Fig. 36 is a vertical sectional view on line 36—36 of Fig. 33;

Fig. 37 is a vertical sectional view on line 37—37 of Fig. 35;

Fig. 38 is a horizontal sectional view on line 38—38 of Fig. 33;

Fig. 39 is a vertical sectional view on line 39—39 of Fig. 34;

Fig. 40 is an end elevational view of one of the two molding machines;

Fig. 41 is a side elevational view of the molding machine with parts thereof broken away for purposes of clarity in illustration;

Fig. 42 is a top plan view of the molding machine;

Fig. 43 is a horizontal sectional view on line 43—43 of Fig. 41;

Fig. 44 is a side elevational detail view showing the squeeze head of the molding machine;

Fig. 44a is a vertical sectional view on line 44a—44a of Fig. 42;

Fig. 45 is an end elevational view of the full drag roll-over device for placing the drag sections which have been rammed with molding sand in the drag molding machine onto the main conveyor cars in properly reinverted position;

Fig. 46 is a side elevational view of the full drag roll-over device;

Fig. 47 is a top plan view of the hydromotor arrangement for actuating said roll-over device;

Fig. 48 is a side elevational view of the cope closer device which places the filled cope sections in assembled superimposed relation onto the filled drag sections;

Fig. 49 is an end elevational view of the cope closer device;

Fig. 50 is a top plan view thereof;

Fig. 51 is a top plan view of one of the cars of the main conveyor and its connections to the adjacent cars thereof;

Fig. 52 is a side elevational view of the car structure;

Fig. 53 is an end elevational view thereof showing the track structure on which the cars roll along;

Fig. 54 is a side elevational view showing one of the drive mechanisms for the main conveyor;

Fig. 55 is a side elevational view showing the main conveyor structure including the drive mechanism;

Fig. 56 is a vertical sectional view taken transversely of the conveyor structure of Fig. 55;

Fig. 57 is a side elevational view showing a part of the mechanism actuated by the moving cars of the main conveyor for imparting motion to an overhead weight conveyor which carries a series of weights, and places the latter on the assembled flasks;

Fig. 58 is a transverse vertical sectional view of the overhead weight conveyor;

Fig. 59 is an enlarged sectional detail view showing the overhead roller mounting arrangement of the weight conveyor;

Fig. 60 is a top plan view of one of the weights;

Fig. 61 is a top plan view of the entire overhead weight conveyor and other associated parts of the apparatus;

Fig. 62 is a side elevational view of the weight conveyor;

Figs. 65 and 66 show schematic wiring diagrams of the electrical system for automatically controlling the various operative devices of the apparatus in properly timed sequence;

Fig. 67 is a longitudinal vertical sectional view on line 67—67 of Fig. 1 and shows the molding sand distribution system;

Fig. 68 is a transverse vertical sectional view on line 68—68 of Fig. 1 and shows additional structural details of said sand system; and Fig. 69 is a transverse vertical sectional view on line 69—69 of Fig. 1 and shows other portions of said sand system.

GENERAL OPERATION

Figure 17:
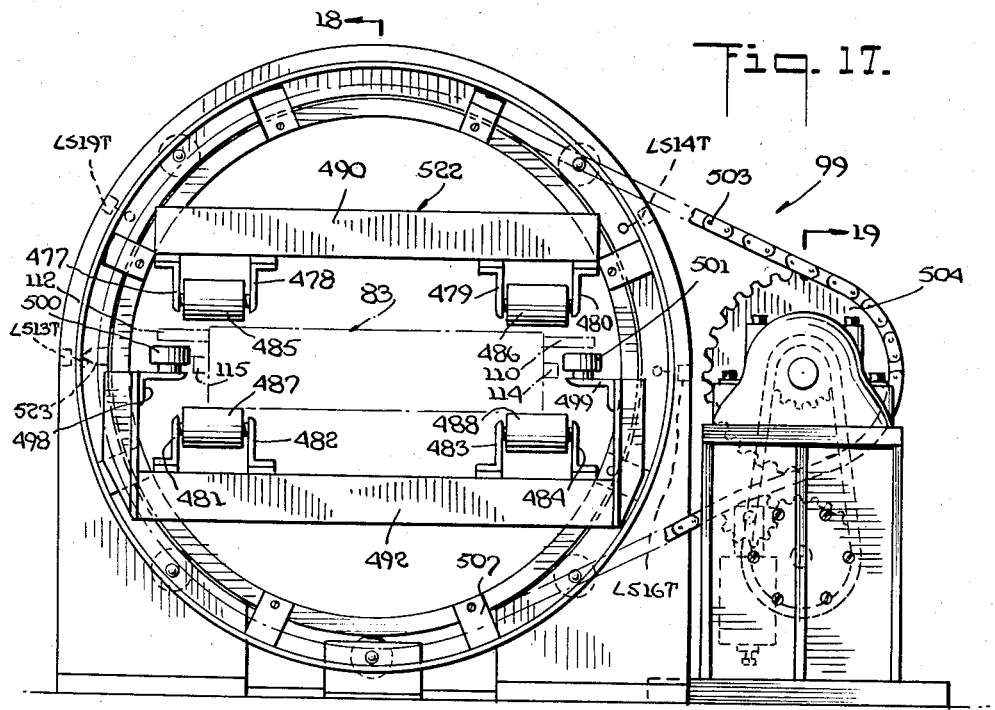
Fig. 17 is an end elevational view of the drag roll-over device.

Referring now to the drawings in more detail wherein is disclosed a preferred embodiment of an apparatus in accordance with the present invention, the general over-all function and mode of operation of the apparatus will first be briefly described. As seen in Fig. 1, the apparatus comprises a continuous horizontally-extending conveyor indicated generally by the reference numeral 81 and comprising a series of cars 82, interconnected and rolling on a suitable track structure to be described below.

Conveyor 81 comprises a straight portion 81a leading toward a curved portion 81b at one end which in turn leads to a second straight portion 81c extending parallel to portion 81a. The left-hand end of portion 81c is curved at 81d and leads to a relatively short straight portion 81e which leads to a curved portion 81f leading to another short straight portion 81g extending parallel to portion 81e. Portion 81g leads to a curved portion 81h which in turn leads to the beginning of straight portion 81a.

Each of the cars 82 is adapted to support cope and drag flask sections indicated generally by the reference numerals 83, 83a in Fig. 4. The flask sections 83, 83a are identical in structure and are adapted to be assembled in superimposed pairs to form a complete molding flask, one of the flask sections acting as the cope 83a and the other flask section acting as the drag 83. A molding machine 84 applies a pattern plate to each of the drag flask sections 83 and fills said drag sections 83 with molding sand.

The filled drag sections are successively placed onto the cars 82 of conveyor portion 81c by a drag roll-over device at 85. These filled drag sections are conveyed in series by conveyor portion 81c in the direction of arrow 87 toward a cope molding machine 86 which applies a pattern plate to each of the cope flask sections 83a and fills the latter with molding sand. The filled cope flask sections 83a are then placed in superimposed relation on the filled drag flask sections by a cope closer device at 88, thereby forming a complete molding flask filled with sand having therein impressions or cavities into which the cast metal may be poured to form castings.

These assembled molding flasks are then carried by conveyor 81 in the direction of arrow 88 along conveyor portions 81e, 81f, 81g, during which time a series of weights 89 are placed on the molding flasks by a weight conveyor structure indicated generally at 90. A pouring device of any suitable type and indicated at 91 pours molten metal into the impressions formed in the molding sand within the flasks and the latter are then conveyed along conveyor portion 81a in the direction of arrow 92. The castings within the flasks cool while they are thus conveyed by conveyor portion 81a until they reach a transfer station at 93 where they are moved transversely from the cars 82 of conveyor 81 and into a punch-out device indicated generally at 94.

The punch-out device 94 forces the molding sand and the metal castings out of the open bottom of the flask and onto a shake-out machine 95 which jostles the castings to remove most of the sand adhering thereto. The castings are then conveyed away from the apparatus by conveyor belt 96 in the direction of arrow 97. The empty but still assembled flask sections are then moved to an unstacker device 98 which lifts the cope section 83a upwardly off the lower drag section 83. The two flask sections then pass successively to a roll-over device 99 which inverts only the drag section 83 so that the latter will be oriented in the same position as the cope section 83a.

The two flask sections are then moved to a vibrator device 100 which further shakes the molding sand from the flask sections and the latter are then conveyed to a brush device 101 which further removes the molding sand still adhering to the flask sections 83 and 83a. The first of these two flask sections is then conveyed to the molding machine 86 where it is again filled with molding sand to form a cope and the second of these flask sections is then conveyed to the molding machine 84 where it is again filled with molding sand to form a drag and the above-described cycle of operations is then repeated, it being understood that a plurality of flask sections 83, 83a are continuously being processed in series in the above-described manner. The reference numeral 102 indicates generally a molding sand distribution apparatus for collecting the sand, reconditioning it, and feeding it to the sand measuring devices of the molding machines 84, 86, where the sand is rammed into the cope and drag flask sections 83, 83a.

The flask sections

Referring now to Figures 3 to 5a inclusive, each flask section 83 and 83a comprises a pair of side walls 103, 104 joined to a pair of end walls 105, 106 to form a rectangular frame structure open at the top and bottom ends. An integral flange 107 projects inwardly from the upper edge of each of the walls 103 to 106 and extends continuously around the upper open end of the flask section. A similar flange 108 is formed integral with the lower edges of said walls 103 to 106 and extends in continuous fashion around the lower open end of the flask section.

A pair of lugs 109, 110 project horizontally outwardly from opposite ends of side wall 103 and a second pair of lugs 111, 112 project outwardly from the opposite side wall 104. Each of the lugs 109 to 112 is provided with a vertical aperture 113 therethrough for receiving a guide pin of a pattern plate in a manner to be described below. Also secured to side walls 103, 104 and projecting horizontally outwardly therefrom are a pair of rectangular bars in the form of longitudinal ribs 114, 115 which provide means for gripping the flask sections 83 when the latter are manipulated in several of the operative devices of the apparatus.

End walls 105, 106 have transverse elements 116, 117 secured thereto adjacent their upper edges by welding as at 118, 119 in Fig. 5. A pair of trunnions 120, 121 are welded to intermediate portions of elements 116, 117 respectively by welding at 122. Trunnions 120, 121 each comprises an intermediate cylindrical portion 123 formed integral with an outer circular flange 124 and an inner circular flange 125 abutting the respective element 116 or 117. Trunnions 120, 121 are coaxially aligned with the longitudinal center line of flask sections 83 and 83a.

The edges of side walls 103, 104 and end walls 105, 106 are horizontally flat and planar to form a parting plane surface 126 which is adapted to abut against a similar parting plane surface on another flask section when the two flask sections are placed in assembled superimposed relation as shown in Fig. 5a. In this figure, flask section 83a is substantially similar to flask section 83. However, the latter has been inverted so as to form the drag section of the complete assembled mold flask indicated generally by the reference numeral 127, whereas flask section 83a forms the upper or cope portion of the complete flask 127. The only difference between flask section 83 and 83a is that drag section 83 is provided with a downwardly projecting lug 128 for a purpose to be described below.

Referring now to Fig. 3, the reference numeral 129 indicates generally a dish plate comprising a horizontal planar base portion 130 having upwardly projecting wall portions 131 at the outer edges thereof and extending peripherally therearound. Wall portions 131 are provided with flat upper surfaces at 132 adapted to abut against the parting plane surfaces 126 of flask sections 83, 83a.

Extending transversely across base portion 130 are a plurality of integral rib portions 134, 135 for dividing the recess 136 in the upper surface of dish plate 129 into several compartments 136', 136" and 136''', each of the latter being adapted to receive the planar base portion 137 of a pattern plate indicated generally at 138. Each of the pattern plates 138 is provided with an upwardly projecting pattern portion 139 adapted to form an impression in the molding sand in a conventional manner well-known in the art.

A pair of lugs extend outwardly from each of the opposite sides of dish plate 129 as indicated at 140 and are adapted to be aligned with lugs 109 to 112 respectively of flask sections 83, 83a. Each of the lugs 140 of dish plate 129 is provided with a vertical guide pin 141 projecting upwardly therefrom and adapted to enter the aperture 113 formed in each of the lugs 109 to 112.

It will thus be seen that dish plate 129, with a plurality of pattern plates 138 mounted in the recesses 136 thereof, may be placed in superimposed assembled relation with respect to each flask section 83, 83a, the planar upper surfaces 132 of dish plate 129 abutting against the parting plane surfaces 126 of flask section 83, 83a. Guide pins 141 engaging within lug apertures 113 serve to maintain dish plate 129 and pattern plates 138 in proper aligned relation with respect to flask sections 83, 83a. A pair of said dish plates 129 are provided, each being mounted in a respective one of the molding machines 84, 86, as will be explained in more detail below.

*The main conveyor*

Referring now to Figs. 51 to 53 inclusive, each of the conveyor cars 82 comprises a pallet indicated generally at 145 and having a top platform surface 146 formed with recesses 147. Pallet surface 146 is adapted to support a drag section 83 placed thereon. A flange 148 extends continuously around the periphery of pallet 145 and projects downwardly from platform 146. A pair of transversely extending ribs 149, 150 are formed integral with platform 146 and project downwardly therefrom. Extending between ribs 149, 150, are a pair of longitudinal ribs 151, 152. Two additional pairs of ribs 153, 154 and 155, 156 extend in an outwardly converging manner from transverse ribs 149, 150 to the outer flanges 148.

It will thus be seen that longitudinal ribs 151, 152 and transverse ribs 149, 150 are joined together to form a rectangular recess in the bottom intermediate portion of pallet 145. Projecting upwardly into this recess are the vertical side walls 157, 158 and end walls 159, 160 of the frame member indicated generally at 161 and having a horizontal base portion 162 joined to said vertical walls 157 to 160. Side walls 157, 158 of frame member 161 are secured to longitudinal ribs 151, 152 of pallet 145 by bolts 163 extending therethrough and secured by nuts 164.

Four shaft clamps 165 are secured to the lower surface of frame base 162 adjacent the four corners thereof and are each provided with a semi-cylindrical recess adapted to coact with an oppositely disposed semi-cylindrical recess formed in a respective one of four bearing segments 166. Each pair of bearing segments 165, 166 thus cooperates to form a bearing for rotatably mounting a pair of horizontal shafts 167, 168 extending therethrough. Each pair of bearing segments 165, 166 is maintained in assembled relation around one of the shafts 167, 168 by a pair of vertical bolts 169 extending down through suitable apertures formed in frame base portion 162 and the lower bearing segment 166. Bolts 169 have nuts 170 threaded on the lower ends thereof and abutting the lower surfaces of bearing segments 166.

The opposite outer ends of shafts 167, 168 have wheels 171 secured thereon and adapted to roll along conventional track rails 172 which are secured by brackets 173 and bolts 174 to the transverse ties 175 mounted to the foundation 176 by bolts 177. A series of vertical column elements 178, 179 are secured to the opposite ends of ties 175 and extend upwardly therefrom. The upper ends of column elements 178, 179 have longitudinally-extending angle elements 180 secured thereto by bolts 181 and provided with a flange 182 extending horizontally inwardly over wheels 171 so as to act as an upper guide for the latter to prevent cars 82 from turning over.

Extending downwardly from the lower surface of frame base portion 162 are a pair of longitudinally-spaced lugs 183, 184 having a strengthening rib 185 extending therebetween. Each of the lugs 183, 184 is provided with a vertical aperture extending therethrough and also through base portion 162 for receiving a bolt 185. A longitudinally-extending link 186 is provided with suitable apertures receiving bolts 185 and is separated from a lower link 187 by a pair of spacer sleeves 188, 189 surrounding bolts 185. Spacer sleeves 188, 189 and links 186, 187 are maintained in assembled relation on bolts 185 by nuts 190 threaded on the lower ends of the latter.

Both opposite outer ends of links 186, 187 are provided with vertically aligned apertures receiving pins 191 extending therethrough. A wheel 192 is rotatably mounted on each of the pins 191 and is adapted to engage suitable guide rails as the cars 82 move around bends in the path of travel of conveyor 81. A pair of bifurcated clevises 193, 194 are each provided with spaced arms 195, 196 having suitable apertures receiving pins 191 so as to be rotatably mounted about the vertical axes of the latter. Cotter pins 197 maintain pins 191 in assembled relation with respect to wheels 192, clevises 193, 194 and links 186, 187.

Each of the clevises 193, 194 is provided with a horizontally-extending aperture 198 of outwardly flaring configuration for receiving the end of a connecting rod indicated at 199, 200 respectively. The extreme ends of the connecting rods 199, 200 are threaded and have nuts 201 mounted thereon. The opposite end of connecting rod 200 is fastened in a similar manner to the next adjacent car 82a to the right of car 82 in Fig. 51, whereas the opposite end of connecting rod 199 is similarly fastened to the next adjacent car (not shown) to the left of said car 82. It will thus be seen that cars 82 of the main conveyor 81 are interconnected in a continuous series in end-to-end relation.

The rear clevis 194 is provided with a forwardly-facing small concave recess at 202 adapted to receive the latch of a drive mechanism for the main conveyor 81 and described below. Rear clevis 194 is further provided with a rearwardly-facing larger concave recess 203 adapted to receive the drive dog of said drive mechanism. The forward clevis 193 is shaped in a similar manner but the recesses 202', 203' thereof serve no useful function and exist solely because clevises 193 and 194 are made identical for convenience in manufacture.

*The main conveyor drive mechanism*

Referring now to Figs. 54 to 56 inclusive, the drive mechanism for moving the interconnected cars 82 comprising main conveyor 81 will now be described. The floor on which main conveyor 81 is mounted is provided with a plurality of pits (not shown), preferably four in number, at spaced points along conveyor 81. There are four drive mechanisms provided, each being located within a respective one of said pits. One of the drive mechanisms is located adjacent the cope closer device 88, another adjacent the drag roll-over device 85, the third adjacent punch-out device 94, and the fourth adjacent pouring device 91.

Each drive mechanism comprises a frame structure having a series of vertical column elements 205 along one side of main conveyor 81 and a second series of vertical column elements 206 extending along the opposite side of conveyor 81. A plurality of angle elements 207 extend transversely between column elements 205, 206 and are secured thereto so as to rigidify the frame structure. The longitudinal angle elements 180, described above as guiding car wheels 171, are secured to the upper ends of column elements 205, 206. Column elements 205, 206 are further rigidified by angularly extending cross struts as at 208, 209.

Main conveyor track rails 172 are mounted on suitable support members 210 which are in turn mounted on supports 211. Secured to the latter are a series of brackets 212 having flange portions 213 to which are secured by bolts 214 a pair of parallel longitudinally-extending channel members 215. The latter have upper horizontally-extending leg portions 216 serving as tracks for the wheels 218 of a reciprocally movable dolly indicated generally by the reference numeral 220.

Dolly 220 comprises a pair of vertical parallel plates 221 each having a downwardly-projecting ear 222 adjacent the rear end of dolly 220. Each of the ears 222 has a vertical edge 223 to which is secured a plate 224 extending between plates 221 and transversely thereto. Plates 221 are further provided with two pairs of horizontally aligned apertures receiving the horizontally-extending shafts 225, 226 on which dolly wheels 218 are rotatably mounted in any suitable manner.

A drive dog 227 is rotatably mounted on rear shaft 226 and comprises an upper rounded nose portion 228 adapted to engage the concave recess 203 in clevis 194. Dog 227 further comprises a lower portion 229 which is relatively massive compared to nose portion 228 and hence biases dog 227 in a clockwise direction as viewed in Figs. 54 and 55 because the center of gravity of dog 227 is located to the right of shaft 226. Portion 229 is provided with a forward vertical shoulder 230 adapted to abut against the rear end of a set screw 231 extending through a threaded aperture provided in an intermediate portion of plate 224. Set screw 231 is adjustable to vary the angular position of dog 227 when the latter abuts thereagainst, set screw 231 being locked in said adjusted position by a lock nut 232.

It will thus be seen that dog 227 is free to rotate about the axis of shaft 226 in a counterclockwise direction as viewed in Fig. 54 to its lower position indicated by dash-dot lines so as to be disengaged from the recess 203 of clevis 194. Gravity causes dog 227 to rotate in a clockwise direction back to the position indicated in solid lines in Fig. 54 so as to provide that the nose portion 228 engages recess 203 for a purpose to be described.

A horizontal shaft 234 is mounted in dolly plates 221 at its opposite ends for rotatably mounting a latch member indicated generally at 236 and comprising an upwardly and rearwardly projecting rounded nose portion 237 adapted to engage the small forward recess 202 formed in each clevis 194. Latch member 236 further comprises a forwardly and downwardly extending portion 238 having a roller 239 rotatably mounted at the lower end thereof on a pivot pin 240. It will be seen that latch member 236 may be rotated in a counterclockwise direction as viewed in Fig. 54 about the axis of shaft 234 toward the position indicated in dash-dot lines wherein the nose portion 237 will be disengaged from the recess 202 of clevis 194. Since the center of gravity of latch member 236 is to the left of shaft 234, latch member 236 will normally tend to rotate in this counterclockwise direction.

Roller 239 is adapted to ride along a lower longitudinally-extending horizontal track member 241. A short track member 242 is mounted above track member 241 and has pivoted thereto at the rear end thereof by pivot pin 243 the forward end of a track member 244. The latter normally extends downwardly in the inclined position shown in Fig. 55 so that its rear end rests upon track member 241 but is rotatable upwardly about the axis of pivot pin 243. The forward end of track member 242 is adjacent the rear end of a track member 245 pivoted at 246 to the upper end of a short column element 247.

A bracket 248 secured to the rear underside of track member 245 is pivotally connected at 249 to the upper end of a link 250 which in turn is pivotally connected at its lower end to a piston rod 251 and also to the upper end of a link 252. The latter is pivotally connected at 253 to a fixed bracket 254. Piston rod 251 is connected to a piston reciprocally slidable within a hydraulic cylinder indicated at C5, C6, C7, C8. Since there are four drive mechanisms, four different reference designations are employed to indicate the respective cylinders of each mechanism for purposes of clarity when describing the hydraulic and electrical control systems of the drive mechanism in a subsequent portion of this specification. Each of the cylinders C5, C6, C7, C8 is pivotally connected at 252 to a fixed bracket 253.

When the cylinder C5, C6, C7, C8 is actuated to move piston rod 251 forwardly (to the left as viewed in Figs. 54 and 55), toggle links 250, 252 will be pivoted to the inclined positions indicated in dash-dot lines in Fig. 54 thereby rotating track member 245 downwardly to the dash-dot position indicated by the reference numeral 245'. When dolly 220 is in its rearmost position shown in Fig. 55, roller 239 will ride on track member 241 so as to maintain latch member 236 in the dash-dot position indicated at 236' in Fig. 54, thereby maintaining the nose portion 237 out of engagement with clevis 194. As dolly 220 is moved forwardly (to the left) roller 239 will ride along the inclined track member 244 and onto horizontal track member 242 at which time latch member 236 will have been rotated to the position indicated in solid lines in Fig. 54 so as to bring nose portion 237 at the proper height to engage concave recess 202 of clevis 194.

This engagement is maintained during the forward end portion of the forward stroke of dolly 220 while roller 239 rides along track members 242 and 245 and prevents the momentum of cars 82 of main conveyor 81 from moving forwardly at a greater speed than dolly 220 at the end of the forward stroke of the latter as dolly 220 is decelerating, and maintains recesses 203 of clevises 194 in engagement with nose portion 228 of the respective dog 227. That is, the movement and position of cars 82 correspond precisely to the movement and position of dolly 220 of each of the four drive mechanisms.

At the beginning of the rear stroke of dolly 220, cylinders C5, C6, C7, C8 are actuated to rotate pivoted track member 245 downwardly toward the inclined position indicated at 245' whereby roller 239 of latch member 236 will ride downwardly along the inclined track member 245 below the upper horizontal track member 242 and along the forward portion 241' of the lower horizontal track member 241. As roller 239 engages the lower surface of the inclined pivoted track member 244, the latter will pivot upwardly about the axis of pin 243 to permit roller 239 to pass beneath the rear end of track member 244. It will thus be seen that during the rearward stroke of dolly 220, latch member 236 will be in the downward position indicated in dash-dot lines by the reference numeral 236' so as to maintain nose portion 237 out of engagement with clevises 193, 194 as dolly 220 moves therebeneath. During this rearward movement of dolly 220, drive dog 227 will strike the lower projecting portions of clevises 193, 194 so as to be rotated to the lower position indicated in dash-dot lines and ratchet beneath said clevis lower portions. That is, drive dog 227 is in driving engagement with clevis 194 only when dolly 220 is moving to the left in its forward stroke.

In order to reciprocate dolly 220, each of the four drive mechanisms is provided with a main drive hydraulic cylinder indicated respectively by the reference designations C1, C2, C3, C4. The reciprocating piston within each of these main drive cylinders is connected to a piston rod 255 having its outer rear end secured to a clevis 256 which is in turn pivotally connected to a shaft 257 mounted in dolly plates 221 at the forward ends thereof. Each of the main drive cylinders C1, C2, C3, C4 is mounted on longitudinal supports 258 by brackets 259, 260 at the forward and rearward ends of each cylinder. Supports 258 may be mounted to intermediate portions of column elements 205, 206.

The rearward end of one of the track channels 215 along which dolly 220 rolls is provided with a bracket 261 adjustably mounted thereon by means of slots 262 receiving screws 263. Each of the four drive mechanisms is provided with a limit switch secured to bracket 261 and indicated respectively by the reference designations LS9, LS10, LS11, LS12. Each of these limit switches is of conventional type and is provided with a pivoted arm 262 having a roller 263 adapted to be engaged by a detent 264 mounted at the rear end of dolly 220.

The drive mechanism adjacent the mold punch-out device 94 is provided with three additional limit switches LS13, LS14, LS15 which the other three drive mechanisms do not have. The forward end of dolly track channel member 215 has a bracket 265 adjustably mounted thereon by slots 266 receiving screws 267 and supports the limit switch LS14. The latter has the usual pivoted actuating arm 268 having a roller 269 adapted to be engaged by a detent 270 secured to clevis 256 by nut 271 on piston rod 255.

Limit switch LS15 is mounted adjacent the rear end of track channel member 215 and is provided with a vertically reciprocable actuating member 272 having a roller 273 adapted to be engaged by a cam 274. Limit switch LS13 is of the same type as limit switch LS15 and its roller 275 is adapted to be engaged by cam 276. Both cams 274 and 276 are mounted to the opposite outer sides of respective dolly plates 221 and limit switches LS13, LS15 are mounted to the exterior sides of opposite track channel members 215. Cam 276 is so positioned to actuate limit switch LS13 as dolly 220 approaches the end of the forward indexing or drive stroke (to the left as viewed in Fig. 54), whereas cam 274 is positioned to actuate limit switch LS15 as dolly 220 approaches the end of its rearward or return stroke (toward the right as viewed in this figure).

Detent 264 will actuate limit switches LS9, LS10, LS11, LS12 when dolly 220 is in its extreme rearward position at the end of the return stroke and at the beginning of the drive stroke. Detent 270 will actuate limit switch LS14 when dolly 220 is in its extreme forward position at the end of the drive stroke and the beginning of the return stroke.

Each of the drive mechanisms is further provided with a support 277 having a pair of limit switches mounted thereon. One of these limit switches is designated LS1, LS2, LS3, LS4 for the four respective drive mechanisms while the other limit switch is designated LS5, LS6, LS7, LS8 respectively. Limit switches LS1, LS2, LS3, LS4 are each provided with an actuating arm 278 having a roller 279 adapted to be engaged by a cam 280 mounted to an intermediate portion of toggle link 252 when the latter is in its vertical position.

As indicated at 280', cam 280 engages the roller 281 on the actuating arm 282 of the respective limit switches LS5, LS6, LS7, LS8 when link 252 has been moved by the respective one of cylinders C5, C6, C7, C8 to the inclined position indicated by the dash-dot lines in Fig. 54 and the reference numeral 252'. It will thus be seen that when piston rods 251 of cylinders C5, C6, C7, C8 are in the extended outward position, limit switches LS1, LS2, LS3, LS4 are actuated, whereas when piston rods 251 are in the retracted position, limit switches LS5, LS6, LS7, LS8 will be actuated for a purpose to be described below.

The drive mechanism adjacent the cope closer device 88 is provided with cylinders C1 and C5 and limit switches LS1, LS5 and LS9. The drive mechanism adjacent the drag roll-over device 85 is provided with cylinders C2 and C6 and with limit switches LS2, LS6 and LS10. The drive mechanism adjacent the mold punch-out device 94 is provided with cylinders C3 and C7 and with limit switches LS3, LS7, LS11 and also limit switches LS13, LS14 and LS15. The drive mechanism adjacent the pouring device 91 is provided with cylinders C4 and C8 and with limit switches LS4, LS8 and LS12.

*The drive mechanism hydraulic system*

Figure 63:
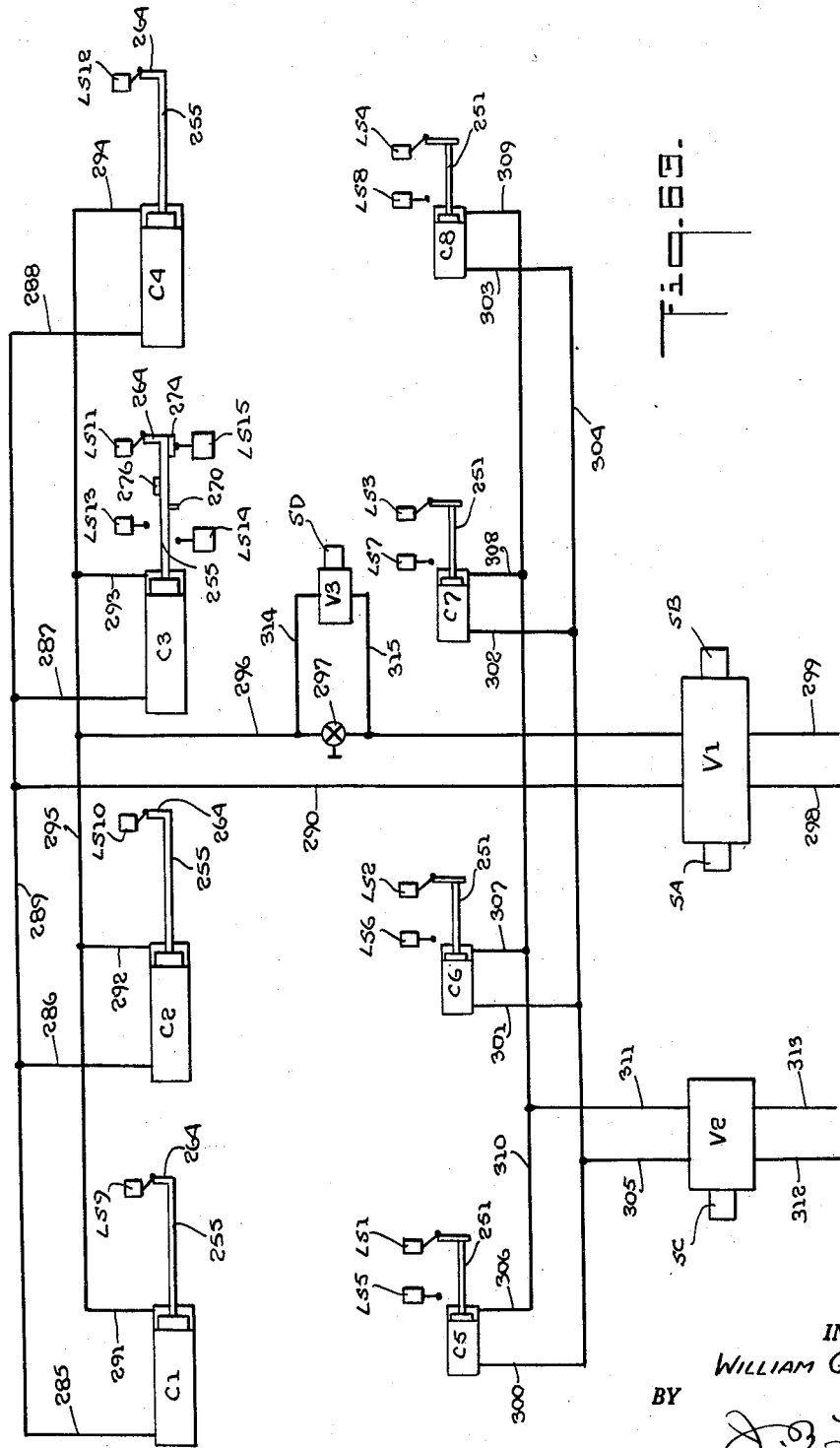
Fig. 63 is a schematic diagram showing the hydraulic system for actuating the drive mechanisms of the main conveyor.

Referring now to Fig. 63 wherein is shown a schematic diagram of the hydraulic actuating system for all four drive mechanisms, it will be seen that a series of hydraulic conduits 285 to 288 extend respectively from the forward ends of each of the main drive cylinders C1, C2, C3, C4 and are connected to a conduit 289 which is in turn connected to conduit 290 leading to a control valve V1. The forward ends of cylinders C1, C2, C3, C4 are connected by conduits 291 to 294 respectively to a conduit 294 which is in turn connected to conduit 296. The latter is provided with a needle valve 297 and is also connected to the control valve V1.

The hydraulic pressure medium, such as oil, is supplied to valve V1 from a pump (not shown) through inlet pipe 298 and an outlet return pipe 299 extends from valve V1 and communicates with the sump of said pump. A pair of solenoids SA and SB control the operation of valve V1 in a conventional manner whereby when solenoid SA is energized, inlet pipe 298 will be connected with conduit 296 to force oil into the rear ends of cylinders C1, C2, C3, C4 to cause the pistons of the latter to move forwardly in the drive or index direction. Similarly, when solenoid SB is energized, inlet pipe 298 will be connected to conduit 290 to force oil under pressure to the forward ends of cylinders C1, C2, C3, C4 to actuate the latter and move their respective pistons 255 rearwardly for the return stroke of dolly 220. During this return stroke, dolly 220 is disengaged from clevises 194 to permit conveyor cars 82 to remain stationary. When inlet pipe 298 is connected to either of conduits 290, 296, return pipe 299 will be connected by valve V1 to the other of said conduits 290, 296.

The forward ends of cylinders C5, C6, C7, C8 are connected by conduits 300 to 303 to a conduit 304 which is in turn connected by conduit 305 to another control valve V2 to which oil is supplied under pressure from said pump by a supply pipe 312, the oil returning from V2 to the sump by return pipe 313. The rearward ends of cylinders C5, C6, C7, C8 communicate with conduits 306 to 309 which are connected by conduits 310 and 311 to the control valve V2. The latter is actuated by a solenoid SC.

When solenoid SC is energized, inlet pipe 312 will be connected to conduit 311 to supply oil under pressure to the rear ends of cylinders C5, C6, C7, C8 to actuate the latter in a direction to retract piston rods 251 and thereby lower shelf track member 245 about pivot pin 246 to the inclined position shown in dash-dot lines in Fig. 54 and indicated by the reference numeral 245'.

When solenoid SC is de-energized, valve V2 is actuated to move piston rods 251 outwardly to raise track member 245 to the horizontal position. Return pipe 313 is, of course, connected to the respective one of conduits 305, 311 which is not connected to supply pipe 312.

A third valve V3 is connected by conduits 314, 315 to conduit 296 at opposite sides of valve 297 so as to provide a by-pass flow around the latter. When valve V3 is open, the flow through conduit 296 passes freely through conduit 314, valve V3, and conduit 315 and is hence unimpeded, whereas when valve V3 is closed, either completely or partially so, the flow through conduit 296 must go through valve 297 which offers a considerable resistance. It will thus be seen that if solenoid SD is energized to close valve V3 towards the end of both the drive stroke and return stroke of the pistons within cylinders C1, C2, C3, C4, the flow resistance through conduit 296 is thus increased whereby the dolly 220 of each drive mechanism will be decelerated towards the end portion of both its drive stroke and its return stroke, thereby avoiding the shock and impact effects that would otherwise result from the sudden stopping of dolly 220 at the end of each stroke.

*The drive mechanism electrical control system*

Figure 64:
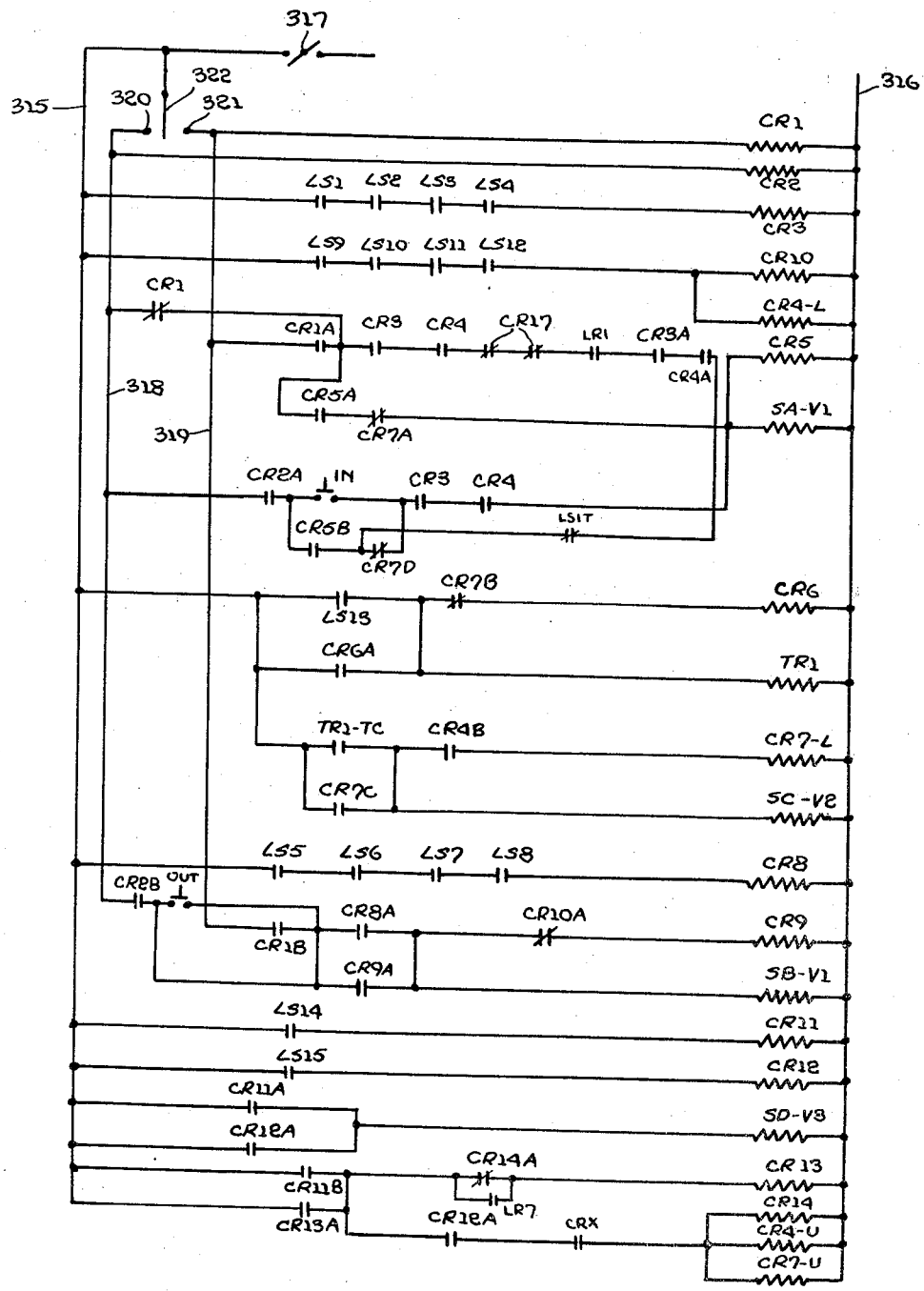
Fig. 64 is a schematic wiring diagram showing the automatic electrical control system for said main conveyor drive mechanism.

Referring to Fig. 64, the electrical control system for the four drive mechanisms of main conveyor 31 will now be described. Starting with the pistons of cylinders C1, C2, C3, C4 and also cylinders C5, C6, C7, C8 in their extended positions, shelf track member 245 is in its upper horizontal position. Driving dog 227 and latch member 236 are about three inches to the rear of clevis 194. Limit switches LS1, LS2, LS3, LS4 are closed by engagement with cams 280. Limit switches LS9, LS10, LS11, LS12 are closed by engagement with the respective detents 264 as at 264' in Fig. 54.

The reference numerals 315 and 316 in Fig. 64 indicate a pair of main leads, lead 316 being connected to one of a pair of power lines (not shown) and lead 315 being connected to the other of said power lines through a main control switch 317. A pair of leads 318, 319 have end contact terminals 320, 321 respectively adapted to be connected to lead 315 by a switch 322. The latter may be thrown in either direction so as to engage either terminal 320 or terminal 321. When contacting terminal 320, the control system is set for "hand" operation, whereas when switch arm 322 contacts terminal 321, the system is set for "automatic" operation.

Describing first the automatic mode of operation, switch 322 is thrown into engagement with terminal 321 to establish the circuit through relay CR1. The relays in the schematic diagram of Fig. 64 are indicated by conventional resistance symbols whereas the contacts opened or closed by the respective relays are given corresponding reference designations and are indicated by a pair of parallel lines. If said contacts are of the normally-open type adapted to be closed by energization of its respective relay, there is no diagonal line extending through the parallel lines symbolizing the pair of contacts, whereas if the contacts are of the normally-closed type adapted to be opened by energization of the respective relay, a diagonal line extends through said parallel symbol lines. Energization of said relay CR1 close normally-open contacts CR1A and CR1B. Since limit switches LS1, LS2, LS3, LS4 are closed, relay CR3 will also be energized. An energizing circuit is also established through relay CR10 since limit switches LS9, LS10, LS11, LS12 are closed, latching relay CR4–L also being thus energized.

Associated with another electrical control system for controlling devices of the apparatus other than the drive mechanisms now being described are four sets of contacts indicated at CR3 for the drag line, CR4 for the cope line, and two CR17 pairs of contacts for the punch-out device.

A normally closed linterlock contact LS1T provides a holding circuit for relay CR5 (Fig. 64). This contact LS1T is a limit switch which is closed by a mold entering the punch-out transfer station to be described hereinafter. When the mold enters the punch-out transfer station, limit switch LS1T opens thus disturbing the index circuit of the mold conveyor until the mold has been moved from the pallet to the punch-out station, which will again cause limit switch LS1T to close. Said limit switch LS1T is shown in Figs. 1 and 9 of the drawing and will be explained further in connection with the description of the punch-out transfer system.

Another normally open contact CR1 is placed in the indexing circuit of the mold conveyor in series with contact CR3A and CR4A (see Fig. 64). This contact is closed on the automatic cycle by the closing of the automatic switch and held closed by this switch energizing its coil CR1 (see upper end of Fig. 64).

When other devices of the apparatus are in the proper condition whereby main conveyor 81 may be indexed, the four pairs of normally-open contacts CR3, CR4, CR17 will be closed in a manner to be described below, thereby establishing a circuit through CR1A, CR3A, CR4A, LS1 and CR1D and relay CR5 to energize the latter. Solenoid SA of valve V1, also symbolized by a resistance symbol and indicated by the reference designation SA—V1, is thus energized causing cylinders C1, C2, C3, C4 to be moved forwardly in the drive or indexing direction, thereby also moving dollies 220 forwardly to cause the respective drive dogs 227 and latch members 236 to engage each of the clevises 194 and move conveyor 81 therewith.

Energization of relay CR5 closes normally-open contacts CR5A and normally-closed contacts CR7A are closed since relay CR7 has not yet been energized. This establishes a holding circuit through CR5A and CR7A to maintain relay CR5 and SA—V1 energized until the completion of the indexing movement of conveyor 81 irrespective of whether any of the four external pairs of contacts of the drag, cope and punch-out circuits have been opened in the meanwhile.

Near the end of the index stroke of cylinder C3, limit switch LS13 is closed by engagement with cam 276, thereby establishing a circuit through normally-closed contacts CR7B to energize relay CR6 and also time relay TR1. Normally-open contacts CR6A are thereby closed to form a holding circuit around limit switch LS13 so that relay CR6 and time relay TR1 are maintained energized even though LS13 is released by cam 276 as dolly 220 continues to the very end of the index stroke. At the end of the predetermined time interval for which time relay TR1 has been set, normally-open contacts TR1—TC are closed. Contacts CR4B, formerly closed by energization of latch relay CR4, established a circuit in series with TR1—TC to energize latch relay CR7—L which opens normally-closed contacts CR7B to de-energize relay CR6, thereby opening contacts CR6A and releasing time relay TR1.

Energization of latch relay CR7—L also closes normally-open contacts CR7C to establish a holding circuit around contacts TR1—TC to maintain solenoid SC of valve V2 designated SC—V2, energized thereby causing cylinders C5, C6, C7, C8 to retract their respective piston rods 251, thus lowering shelf track members 245 and allowing latch members 236 to pivot downwardly toward the position indicated in dash-dot lines in Fig. 54. Energization of latch relay CR7—L also causes opening of the normally-closed contacts CR7A thereby denergizing relay CR5 and also SA—V1.

At the end of the inward movement of piston rods 251 of cylinders C5, C6, C7, C8, limit switches LS5, LS6, LS7, LS8 are closed by engagement with cam 280, thereby establishing an energizing circuit through relay CR8. Normally-open contacts CR8A are thus closed to establish a circuit through CR1B, CR8A and normally-closed contacts CR10A to energize relay CR9. This same circuit also completes a circuit through CR9A and solenoid SB of valve V1, indicated at SB—V1. This causes piston rods 255 of cylinders C1, C2, C3, C4 to extend dollies 220 rearwardly for the return stroke. During this return stroke of dollies 220, the roller 239 of each latch member 236 will roll along the forward portion of lower horizontal track member 241 and beneath the inclined ramp track member 244, the latter being raised slightly to permit roller 239 to pass therebeneath and continue on to the rear portion of lower horizontal track member 241.

Near the end of the forward index or drive stroke of cylinder C3, limit switch LS14 is closed by engagement with detent 270 to complete an energizing circuit through relay CR11, thereby closing normally-open contacts CR11A to establish an energizing circuit through solenoid SD of valve V3 indicated at SD—V3. Actuation of valve V3 causes deceleration of pistons 255 and dollies 220 at the end of the indexing stroke. Near the end of the return stroke of cylinder C3, limit switch LS15 is engaged by cam 274 and is thereby closed to complete an energizing circuit through relay CR12, thus closing normally-open contacts CH12A to energize SD—V3 and decelerate dollies 220 at the end of the return stroke as well.

Energization of relay CR11 also closes normally-open contacts CR11B. Normally-closed contacts CR14A are closed because relay CR14 has not yet been energized, thereby completing an energizing circuit through relay CR13. The latter closes normally-open contacts CR13A forming a holding circuit around CR11B to maintain relay CR13 energized. When relay CR12 was energized, it closed contacts CR12A. An energizing circuit is thus established through contacts CR13A, CR12A to relay CR14, unlatching relay CR4—U, and unlatching relay CR7—U.

The normally-closed contacts CR14A are thus opened to de-energize relay CR13. Energization of CR7—U opens contacts CR7C thereby de-energizing SC—V2 to allow the shelf track members 245 to be raised to the upper horizontal position. Energization of unlatching relay CR4—U causes contacts CR4A to open, thereby interrupting the circuit to SA—V1 until the apparatus is ready for the next movement of conveyor 81. During the interval that cylinders C5, C6, C7, C8 were in the retracted condition to maintain shelf track member 245 in the downwardly inclined position, relay CR3 was de-energized to open contacts CR3A so that cylinders C1, C2, C3, C4 could not actuate dollies 220 in the indexing or drive direction. When cylinders C5, C6, C7, C8 are again extended to raise shelf track member 245, relay CR3 is again closed to establish a circuit for the index stroke and the above-described cycle of operations may be repeated.

Another normally open contact CR7 is placed in the coil circuit of relay CR13 (Fig. 64). This contact CR7 is closed by latching of relay CR7L (Fig. 64) at the end of a conveyor index, and at this time energizes coil CR13. In series with contact CR12A (Fig. 64) is a normally open contact CRX controlled by a relay CRXL (Fig. 65) in the punch-out transfer circuit to be described hereinafter. A limit switch LS27 (Fig. 1) is closed during passage of a pallet during an index of the conveyor. The function of said limit switch LS27 is to unlatch relay CRXL (Fig. 65 left side). The normally open contact CR7 remains open if relay CRXL has not latched. Thus relay or coil CR13 (Fig. 64) cannot be energized until contact CR14A is closed by energization of relay CR14 which is completed through contact CR13A, contact CR12A and normally open contact CRX. If relay CRXL has not latched, closing normally open contact CRX, the coil CR13 would not be energized because its circuit passes through contact CR11B and contact CR14A. Contact CR11B is closed by limit switch LS14 (Fig. 64) energizing relay CR11 near the end of the mold conveyor index stroke.

As will appear hereinafter, the unlatch circuit to contact CR3UD (Fig. 65, left side) is such that the unlatched impulse is received from contact CR7 of Fig. 64 through contact CRXU as explained below under the explanation of the punch-out transfer line electrical system.

As will be explained hereinafter, relay CR17UT of the punch-out transfer line is unlatched when cylinder 3T extends, fully closing limit switch LS6AT to be described hereinafter, and completing the circuit to the unlatch coil of relay CR17UT (Fig. 65). This motion clears the index circuit of the mold conveyor for a further index.

The normally closed contact CRX (Fig. 65, left side) as will be explained hereinafter, is in the latch circuit of relay CR17LT in series with the normally open contact CR7 of the drive mechanism electrical control system. Thus, relay CR7 (Fig. 64) latches, closing contact CR7 near the end of the index of a pallet, at which time normally open contact CRX is closed as relay CRXU is unlatched during the action of the conveyor. At this time relay CR17LT latches, setting up a block to further indexing operations until relay CR17UT is unlatched.

As indicated in Fig. 65 left side, the normally closed contact CRX and the normally open contact CR7 are connected in parallel also to the unlatch circuits of relay CR3UD (Fig. 65, right side) of the drag circuit and relay CR4UC (Fig. 66) of the cope circuit. The unlatching of these relays CR3UD and CR4UC stops further indexing movements of the mold conveyor, as seen from the wiring diagram of Fig. 64, until they are latched by a completion of drag rollover or cope closing movements, which will be described hereinafter.

As will be seen hereinafter, the latch coil CRZL is in series with contacts CR3UD, CR4UC and normally closed contact CR17 of the drag machine, cope machine, and punch-out transfer line, respectively. These contacts are closed when the respective machines have completed their drag roll over, cope closing, and transfer to unstacker, all to be described hereinafter. The latching of coil CRXL at this time closes the normally open contact CRX which is in the unlatch circuit of relay CR7U of the drive control system, as shown on Fig. 64 and serves as an interlock therefor. Thus, unless coil CRXL latches at the completion of the actions of the drag roll over, cope closing, and transfer to unstacker, to be described hereinafter, the coil CR7U will not unlatch, and the unlatching of this coil CR7U closes contact CR7D in the circuit of the solenoid SAV1 (Fig. 64) which causes the conveyor to move.

The "hand" operation of the drive mechanism electrical control system operates in the following manner. Switch 322 is thrown to engage "hand" terminal 320, thereby establishing an energizing circuit through relay CR2 to close contacts CR2A. Manual push-button switch designated "In" may now be depressed to establish a circuit through CR2A, In, CR3, and CR4 to energize relay CR5 and also SA—VI. Contacts CR5B close and normally-closed contacts CR7D are closed since relay CR7 has not yet been energized, thereby establishing a holding circuit around push-button switch In to maintain SA—V1 energized after switch In has been released. Energization of relay CR2 also closes contacts CR2D.

If the push-button switch designated "Out" is now depressed, a circuit is established through CR2B, Out, CR8A, CR10A to energize relay CR9. SB—V1 will also be energized through this circuit and is maintained energized after push-button Out has been released by a holding circuit established around button Out through normally-open contacts CR9A which are closed by energization of relay CR9. It will thus be seen that solenoids SA and SB of valve V1 may be operated by push-button switches In and Out to cause actuation of cylinders C1, C2, C3, C4 and thereby control the indexing movement of conveyor 81 manually instead of by the automatic method described above.

*The punch-out device*

Referring now to Figs. 6 to 10 inclusive, the punch-out device 94 comprises a frame structure 325 having four vertical column members 326, 327, 328, 329 each of I-shape in cross section and located at the four corners of frame structure 325. A pair of horizontally-extending channel elements 330, 331 are connected at their opposite ends to the upper portions of column elements 326, 327, and 328, 329 respectively by vertically-extending angle elements 332 to 335. A beam 336 is secured at its opposite ends to longitudinal channel members 338, 339 which are in turn secured at their opposite ends to column members 326, 328 and 327, 329 respectively at the upper ends of the latter.

A horizontal channel member 340 extends between column members 326, 327 and is secured at its opposite end to intermediate portions of said column members. A horizontal channel element 341 is secured at its opposite ends to intermediate portions of column members 327 and 329 and a similar channel element 341a is secured to column elements 326 and 328. Extending between said channel elements 341 and secured thereto is a transversely-extending structure indicated at 342.

A horizontal support 343 has one end secured to channel member 340 and the opposite end supported by a pair of vertical legs 344. A cylinder 1T is mounted on support 343 by brackets 345, 346. Cylinder 1T is of the fluid-actuated type, such as an air cylinder, and is provided with a piston reciprocally slidable therein and connected to a piston rod indicated at 347. The outer end of piston rod 347 is secured to an intermediate portion of a horizontally-extending member 348. The latter has secured to the outer ends thereof a pair of spaced parallel rods 349, the opposite ends of which are secured to a horizontal member 351.

Rods 349, 350 are slidable through suitable bearings secured to structure 342. A pair of horizontally-extending guide rods 352, 353 are fixedly secured at their inner ends to structure 342 and at their outer ends to column elements 328, 329 respectively. Member 351 is provided at its opposite outer ends with a pair of suitable apertures slidably receiving guide rods 352, 353. By this means, member 351 is mounted for slidable reciprocal movement toward and away from air cylinder 1T.

Member 351 is provided with a pair of spaced bearings 354, 355 rotatably mounting a horizontally-extending shaft 366. A pair of downwardly extending dogs 367 are secured to shaft 366 so as to be pivotally mounted about the axis of rotation of said shaft 366. Each of dogs 367 is provided with a shoulder portion 368 adapted to abut against member 351 so as to limit rotation of dogs 367 in the clockwise direction as viewed in Fig. 10.

As best seen in Fig. 6, the straight portion 81a of conveyor 81 extends adjacent column elements 328, 329 between the latter and the other pair of column elements 326, 327. A horizontal table 369 supported on vertical legs 370 is located alongside of conveyor portion 81a. The upper horizontal surface 371 of table 369 is in approximate horizontal alignment with the lower surface of the drag flask sections 83 as conveyor portion 81a conveys the assembled flasks 127. It will be recalled that these flasks 127 have previously been filled with molding sand by drag molding machine 84 and cope molding machine 86, have had molten casting metal poured therein by pouring device 91, and have been cooled to solidify the castings along the major run of the straight portion 81a of conveyor 81 before they have arrived at the punch-out device 94.

It will thus be seen that cylinder 1T may be actuated to retract piston rod 347 and thereby move the entire structure comprising elements 348, 349, 350, 351 inwardly toward the right as viewed in Fig. 10. During this retracting movement, dogs 367 will engage a flask 127 on conveyor portion 81a and move the flask 127 inwardly and transversely of conveyor portion 81a onto the upper surface 371 of table 369 until the lower drag section 83 of flask 127 abuts against a stop member 372 on table 369. When air cylinder 1T is actuated to move member 351 outwardly toward the extended position shown in Fig. 10, dogs 367 will strike the upper cope section 83a so as to pivot upwardly and ratchet past flask 127 until dogs 367 reach the other side of flask 127 when gravity moves dogs 367 downwardly toward the position shown with shoulder portions 368 abutting member 351.

The limit switch LS1T is a limit switch which is closed by the flask on the mold conveyor as it arrives at the transfer station to the mold punch out and transfer cycle.

A pair of vertical air cylinders 2T are secured at their upper ends to member 336 and are each provided with a piston reciprocally slidable therein and connected to a piston rod 373, 374 secured to brackets 375, 376 mounted to a horizontally-extending channel member 377. The latter is secured to the upper ends of three vertical rods 378, 379, 380 which are reciprocally slidable within suitable bearing openings provided in a horizontally-extending member 381. The latter extends between and is fixedly secured to channel members 341, 341a. A pair of fixed guide rods 382, 383 are fixedly secured at their upper ends to member 336 and at their lower ends to member 381. The opposite ends of member 376 are provided with a pair of bearings 384, 385 slidably receiving guide rods 382, 383, respectively.

The lower ends of rods 378, 379, 380 have each secured thereto a respective one of a series of punch-out members 386, 387, 388, each comprising a planar horizontal portion of a size and shape adapted to fit within one of the interior compartments 136', 136", 136''' of flask sections 83 and 83a. It will thus be seen that air cylinders 2T may be actuated to move the entire structure comprising member 377, rods 378, 379, 380 and punch-out members 386, 387, 388 in a downward direction to cause the latter to force the molding sand and castings in flask sections 83, 83a downwardly through the lower open ends of drag section 83. Table 369 is provided with suitable openings (not shown) through which the molding sand and castings may fall downwardly to the shake-out machine 95.

After flask sections 83, 83a have been emptied of the molding sand and castings, air cylinders 2T are actuated to move punch-out members 386, 387, 388 upwardly out of flask sections 83, 83a and then air cylinder 3T is actuated to move the empty flask sections 83, 83a from table 369 to the cope unstacker device 98. Air cylinder 3T is fixed to a support 389 mounted on vertical legs 390 and contains a reciprocally slidable piston connected to a piston rod 391 having a pusher member 392 secured to the outer end thereof. Pusher member 392 is adapted to engage the ends of flask sections 83, 83a to move the latter toward the left as viewed in Fig. 8 along the horizontal surface 371 of table 369. The cope unstacker device 98, to be described in detail below, is located to the left of punch-out device 94 as viewed in Fig. 8 and receives flask sections 83, 83a after pusher member 392 has moved the latter from table 369.

A detent 393 is fixedly mounted with respect to member 377 and is adapted to actuate a limit switch LS4T when member 377 is in its uppermost position with punch-out members 386, 387, 388 in their raised positions above flask sections 83, 83a. When air cylinders 2T have been actuated to move member 377 and punch-out members 386, 387, 388 downwardly, detent 393 will actuate another limit switch LS4AT when member 377 is in its lowermost position. Another limit switch LS5T is engaged by pusher member 392 when the latter is in its retracted position shown in Fig. 8, pusher member 392 actuating a limit switch LS6T when air cylinder 3T has been actuated to move pusher member 392 to its extended position.

Still another limit switch LS3T is actuated by engagement with member 351 when air cylinder 1T has retracted the latter at the end of the stroke during which flask sections 83, 83a are moved from conveyor portion 81a onto table 369.

The supply of air under pressure to cylinders 1T, 2T, 3T is controlled by valves indicated at 394, 395, 396 respectively, each of these valves being actuated by a pair of solenoids indicated at SV1ET and SV1RT, SV2ET and SV2RT, and SV3ET and SV3RT. When solenoids SV1ET, SV2ET and SV3ET are energized, cylinders 1T, 2T, 3T respectively, will be actuated to move their piston rods outwardly toward the extended positions whereas when solenoids SV1RT, SV2RT, SV3RT are energized, the respective cylinders will be actuated to retract their piston rods, as will be explained in more detail below.

*The cope unstacker device*

Referring now to Figs. 7 and 10 to 14 inclusive, the cope unstacker device 98 is located adjacent to punch-out device 94 and comprises a frame structure including vertical column elements 401 having transverse beams 402 secured thereto for supporting longitudinally-extending angle elements 403, 404, 405, 406. A series of rollers 407 are rotatably mounted between angle elements 403, 404 for rotation about their respective horizontal axes and a similar series of rollers 408 are rotatably mounted between angle elements 405, 406. The upper ends of column elements 401 have longitudinally-extending angle elements 409, 410 secured thereto and two series of rollers 411, 412 are rotatably mounted to angle elements 409, 410 respectively for rotation about their respective vertical axes. Drag flask section 83 is adapted to rest upon and roll along rollers 407, 408, rollers 411, 412 being adapted to engage the flask section ribs 114, 115 to guide flask sections 83, 83a. The horizontal flanges of angle elements 409, 410 have cut outs 410a for the purpose hereinafter appearing.

As shown in Fig. 7, a plurality of vertical column elements 413 support at their upper ends a pair of longitudinally-extending angle elements 414, 415 to which is secured by bracket 416, the upper end of a vertical air cylinder 4T. The latter is provided with a reciprocally slidable piston connected to a piston rod 417 secured at its lower end to a horizontal member 418. The opposite ends of the latter are provided with a plurality of downwardly-extending spaced channel members 423, 424 secured thereto by gussets 421, 422. At the lower ends of members 423, 424 are horizontally-extending flanges 425, 426, aligned with cut outs 410a adapted to extend beneath the longitudinal ribs 114a, 115a of cope section 83a, as cope section 83a together with drag section 83 is moved longitudinally along rollers 407, 408 by pusher member 392 of cylinder 3T of the punch-out device 94.

A pair of vertical guide rods 427, 428 are secured at their lower ends to member 418 and have upward portions slidably extending through bearings 429, 430 secured to angle elements 414, 415. It will thus be seen that the entire structure indicated generally by the reference numeral 431 and comprising elements 412, 423 and 424 is mounted by guide rods 427, 428 and bearings 429, 430 for vertical reciprocating movement and is actuated upwardly or downwardly by cylinder 4T.

As shown in Figs. 13 and 14, structure 431 is in an intermediate position which it assumes as flask sections 83, 83a are pushed onto rollers 407, 408 from punch-out device 94. Cylinder 4T is then actuated to raise structure 431 thereby causing flange portions 425, 426 to engage ribs 114a, 115a of cope section 83a thereby raising the latter upwardly from drag section 83. While cope section 83a is maintained in this raised position, drag section 83 is moved by a device, to be described below, out from under cope section 83a and then cylinder 4T is actuated to lower structure 431 to its lowermost position to place cope section 83a directly onto rollers 407, 408. During such movement members 423, 424 move through cut outs 410a in members 410.

A limit switch LS12AT is suitably mounted to be held open by a flask on the conveyor as it rolls from the unstacker to the roll over (Figs. 13, 14).

A vertical switch mounting member 432 is secured at its upper end to angle element 414 and provides a means for supporting three limit switches arranged in vertical alignment and designated LS8T, LS7T and LS10T. A vertically extending bracket 433 is secured at its lower end to member 418 and its upper end is provided with a V-shaped nose 434 adapted to engage the actuating arms of limit switches LS7T, LS8T, LS10T. When structure 431 is in the intermediate position shown in Fig. 14, nose 434 will engage limit switch LS7T, whereas when structure 431 has been raised by cylinder 4T to its uppermost position, nose 434 will actuate limit switch LS8T. When structure 431 is in its lowermost position to place cope section 83a directly onto rollers 407, 408, nose 434 will actuate limit switch LS10T.

As best seen in Figs. 11 and 12, the device for moving drag section 83 out from beneath cope section 83a and into the roll-over device 99 and then moving section 83a into said device 99, comprises an air cylinder 5T having a horizontally-reciprocable piston connected to a piston rod 435. Cylinder 5T is secured by brackets 436, 437 to a pair of transverse I-beams 438, 439 mounted in blocks 440, 441 resting upon the ground indicated by the reference letter G. The outer end of piston rod 435 is secured to a member 442 having a pivot pin 443 extending transversely therethrough for rotatably mounting a bifurcated dog 444.

The latter comprises a pair of spaced vertically-extending members 445, 446 having beveled edges 447, 448 at their upper ends and connected together at their lower ends by a plate 49 extending therebetween. A bracket 450 is secured to member 442 and extends downwardly therefrom to support a pair of bearing sleeves 451 slidably mounted on a pair of horizontally-extending guide rods 452, 453 respectively. The forward ends of guide rods 452, 453 are threaded and are secured to brackets 454 by nuts 455. The rear ends of guide rods 452, 453 are similarly threaded and are secured to I-beam 439 by nuts as at 456.

It will thus be seen that member 442 with bifurcated dog 444 pivoted thereto, is slidably movable along guide rods 452, 453 and may be moved forwardly or rearwardly by actuation of cylinder 5T. When moved rearwardly (to the left as viewed in Fig. 11), elements 445, 446 of dog 444 will straddle trunnion 120 of flask section 83 or 83a to engage the end of the flask section and move the latter longitudinally of the unstacker device 98 along rollers 407, 408 thereof. The lower end of dog 444 will engage members 450 so as to prevent dog 444 from rotating in a clockwise direction as viewed in Fig. 11. After dog 444 has moved either flask section 83 or flask section 83a to the roll-over device 99, cylinder 5T is actuated to cause piston rod 445 to move to its extended position, during which extending movement the beveled upper ends 447, 448 of dog 444 will engage the next succeeding flask section 83 or 83a to cause dog 444 to pivot about the axis of pin 443 in a counterclockwise direction as viewed in Fig. 11 so as to ratchet beneath said flask section until the initial extended position shown in Fig. 11 is reached when gravity will cause dog 444 to again assume the vertical position shown.

A horizontal support member 457 is mounted on support block 441 and bracket 454 and has three limit switches LS9T, LS11T, fixed thereon. As shown in Fig. 12, the outer end 450a of member 450 is adapted to engage the actuating arms of these limit switches for a purpose to be described below.

*The empty drag roll-over device*

Figure 18:
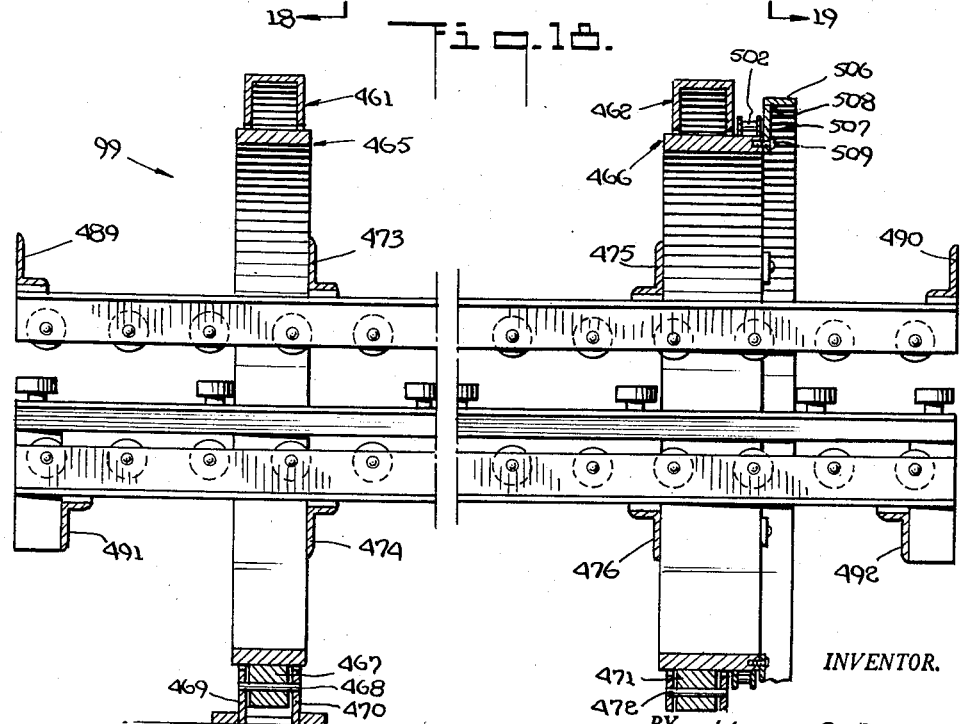
Fig. 18 is a vertical sectional view on line 18—18 of Fig. 17.

Referring now to Figs. 15 to 19 inclusive, the empty drag roll-over device 99 comprises a pair of coaxially-aligned ring stands 461, 462 mounted on the ground or floor G by base members 463, 464. As best seen in Fig. 18, each ring stand 461, 462 is of channel shape in cross-section and is provided with a central opening rotatably receiving a cylindrical inner ring indicated by reference numerals 465, 466 respectively. Around the periphery of ring stand 461 and located within the hollow interior thereof are a series of rollers 467 rotatably mounted about horizontal axes by means of pins 468 extending therethrough and received within suitable apertures provided in the vertical portions 469, 470 of ring stand 461. Another series of rollers 471 are similarly rotatably mounted within the other ring stand 462 by means of pins 472. Rollers 467 and 471 engage the exterior cylindrical surfaces of inner rings 465, 466 respectively so as to rotatably mount the latter about a horizontal axis with respect to the stationary ring stands 461, 462.

A pair of angle elements 473, 474 are secured at their opposite ends to the periphery of inner ring 465 and extend thereacross parallel to each other and in a chordal relation to inner ring 465. A similar pair of angle elements 475, 476 are likewise secured at their outer ends to the periphery of the other inner ring 466 and extend thereacross parallel to angle elements 473, 474. As shown in Fig. 17, two pairs of longitudinal angle elements 477, 478 and 479, 480 are secured to angle elements 473 and 475 while another series of angle elements 481, 482 and 483, 484 are likewise secured to angle elements 474, 476 and extend longitudinally of roll-over device 99 parallel to longitudinal angle elements 477, 480.

A first upper series of rollers 485 are rotatably mounted about their respective horizontal axes between angle elements 477, 478 and a second upper series of rollers 486 are rotatably mounted between angle elements 479, 480. A lower series of rollers 487 are rotatably mounted about their respective horizontal axes between angle elements 481, 482 and a second lower series of rollers 488 are similarly rotatably mounted between angle elements 483, 484. The forward and rearward extremities of longitudinal angle elements 477 to 484 have transverse angle elements 489 to 492 secured thereto and extending parallel to transverse angle elements 473 to 476.

As best seen in Fig. 15, a transverse angle element 493 extends across and is secured to angle elements 477 to 480 and another transverse angle element 494 is secured to angle elements 481 to 484 at intermediate portions thereof between ring stands 461 and 462. The outer opposite ends of transverse angle elements 491, 494 and 492 have vertical angle elements 495, 496 and 497 secured thereto and extending upwardly therefrom to support at their upper ends a pair of longitudinally-extending members 498, 499. A series of guide rollers 500 are rotatably mounted about their respective vertical axes to member 498 and a second series of guide rollers 501 (Fig. 17) are similarly rotatably mounted to member 499.

As best seen in Fig. 18, inner ring 466 is provided with a portion extending rearwardly and outwardly of ring stand 462, said portion having mounted on the outer cylindrical surface thereof a series of sprocket teeth 502 engaged by a sprocket chain 503 which also engages a sprocket wheel 504. A cylindrical chain guard 506 is provided with a plurality of radially-extending members 507 welded thereto at 508 and secured to the rear end of inner ring 466 by screws 509 so as to mount chain guard 506 securely to the rear end of inner ring 466 and in coaxial alignment therewith.

Sprocket wheel 504 is fixedly secured to a horizontal shaft 510 rotatably mounted at its opposite ends in bearings 511, 512 secured on the upper ends of a pair of supports 513, 514. A bracket 515 is secured to support 514 and has an idler sprocket 516 rotatably mounted thereon and engaging chain 503 to take up the slack in the latter. A sprocket wheel 517 is also fixedly secured on shaft 510 and is driven by another chain 518 in engagement with a sprocket wheel 519 secured to the outer end of the output shaft 520 of a hydromotor indicated generally at 521 and mounted on support 513.

Hydromotor 521 is of well-known construction and is merely a hydraulic actuator which provides an output torque on shaft 520 in either direction of rotation of the latter, the fluid medium supplied to hydromotor 521 being controlled by a plunger type valve (not shown) actuated by a pair of solenoids. When one of these solenoids is energized, shaft 520 is rotated in one direction and when the other solenoid is energized, shaft 520 is rotated in the opposite direction in a similar manner, as will be understood by those skilled in the art.

It will thus be seen that cylinder 5T of the cope unstacker device 98 may be actuated to cause dog 444 to move drag section 83 from the unstacker device 98 onto rollers 487, 488 of the roll-over device 99. Hydromotor 521 is then actuated to rotate the entire structure 522, comprising inner rings 465, 466, the angle elements 477 to 484 secured thereto, and rollers 485 to 488 rotatably mounted on the latter through the drive connection provided by sprocket wheel 519, chain 518, sprocket wheel 517, shaft 510, and sprocket wheel 504. A suitable control mechanism to be described below is provided to limit rotation of this rotating structure 522 to an angle of 180 degrees whereby drag section 83 is inverted so as to be in the same upright position as cope section 83a, the latter then being moved from the cope unstacker device 98 onto rollers 485, 486 by a second actuation of cylinder 5T. Roll-over device 99 serves the function of providing that the drag sections 83 and cope sections 83a assume the same upright position after being separated by the unstacker device 98.

A pair of limit switches LS13T and LS16T are secured to diametrically-opposite portions of ring stand 461 and another pair of limit switches LS19T and LS14T are also mounted on ring stand 461 and are angularly displaced from LS13T, LS16T a predetermined angular distance of approximately 30 degrees. A dog 523 is secured to rotatable inner ring 465 and is adapted to engage the actuating arms of limits switches LS13T, LS14T, LS16T, LS19T, as inner ring 466 rotates within ring stand 462. The automatic electrical control system of which these limit switches are a part will be described in detail below.

*The vibrator device*

Figure 21:
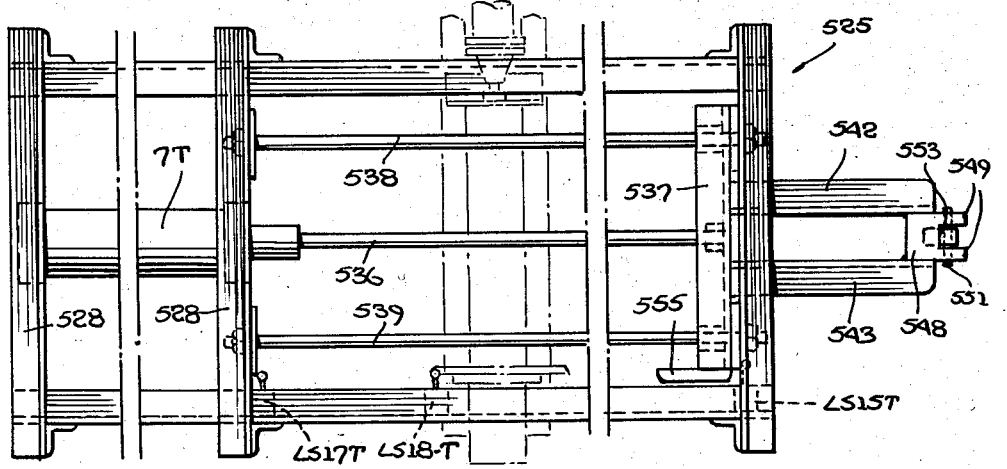
Fig. 21 is a top plan view of the structure shown in Fig. 20.
Figure 20:
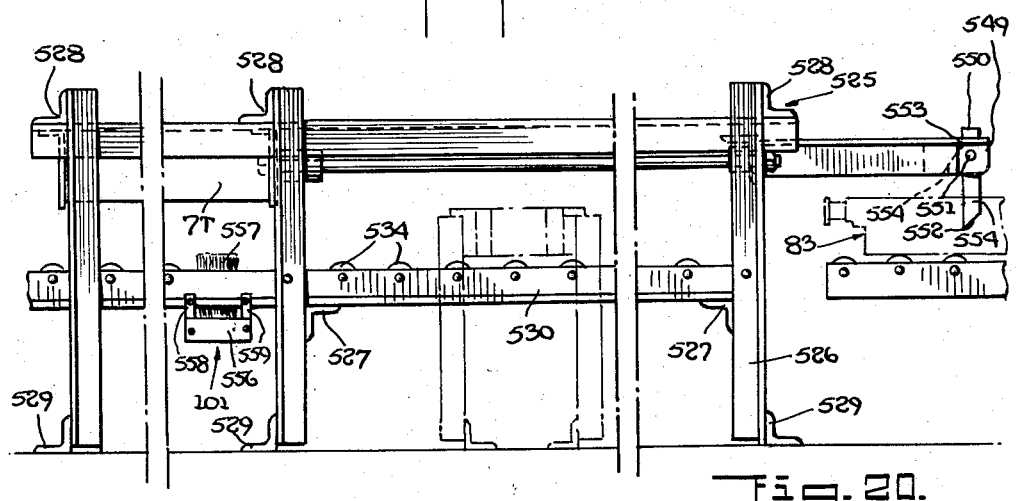
Fig. 20 is a side elevational view of the fluid-actuated cylinder means for moving the flask sections from the drag roll-over device to the vibrator device.
Figure 22:
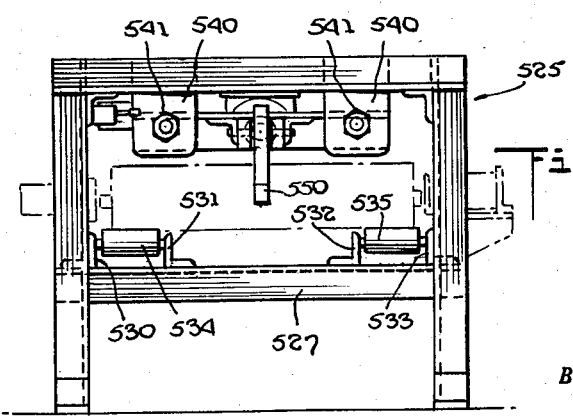
Fig. 22 is an end elevational view of the structure shown in Figs. 20 and 21.

Referring now to Figs. 20 to 21 inclusive, flask sections 83, 83a are pulled from roll-over device 99 onto a conveyor structure indicated generally by the reference numeral 525 where the flask sections are subjected to the action of the vibrator device 100. Conveyor structure 525 comprises a series of vertical column elements 526 interconnected by transverse angle elements 527 at intermediate portions thereof, angle elements 528 at the upper ends of column elements 526, and angle elements 529 at the lower ends thereof. Two pairs of longitudinal angle elements 530, 531 and 532, 533 are mounted on angle elements 527 and extend throughout the length of conveyor structure 525 for rotatably mounting therebetween two series of rollers 534, 535.

An air cylinder 7T extends horizontally between and is secured to a pair of adjacent transverse angle elements 528 and is provided with a reciprocal piston connected to a piston rod 536 extending longitudinally of structure 525. The forward end of piston rod 536 is connected to a transverse member 537 having adjacent its opposite ends a pair of bearing openings slidably receiving the fixed guide rods 538, 539, the latter being mounted at their opposite ends to downwardly-extending brackets 540 fixed to a pair of angle elements 528, guide rods 538, 539 being maintained in assembled position by nuts 541 engaged with the threaded ends thereof. It will thus be seen that transverse member 537 is guided by rods 538, 539 for reciprocal sliding movement in the direction of the longitudinal axis of the conveyor structure 525.

A pair of horizontally-extending elements 542, 543 are secured at their forward ends to transverse member 537 and project rearwardly therefrom to mount therebetween a yoke 548 having bifurcations 549 receiving a dog 550 pivotally mounted therebetween for rotation about a horizontal axis by a pivot pin 551 extending therethrough. The lower end of dog 550 is beveled downwardly and forwardly as at 552. Yoke 548 is provided with a vertical abutment surface 553 against which the upper portion of dog 550 abuts so as to prevent rotation of dog 550 in a counterclockwise direction as viewed in Fig. 20. Yoke 548 is further provided with a surface 554 extending downwardly and forwardly from the lower edge of vertical surface 553 so as to provide a clearing space to permit dog 550 to rotate freely in a counterclockwise direction as viewed in Fig. 20.

It will thus be seen that when air cylinder 7T is actuated to cause piston rod 536 to move toward its rearward or extended position as shown in Figs. 20 and 21, beveled surface 552 will engage a flask section 83 or 83a and pivot dog 550 in the clockwise direction so as to enable dog 550 to ratchet over the end wall of the flask section and then pivot as a result of gravity toward the vertical position shown with the lower portion 554 of dog 550 projecting downwardly into the hollow interior of the flask section 83 or 83a while the latter is supported on the rollers of roll-over device 99. Air cylinder 7T may then be actuated to cause piston rod 536 to be moved forwardly in its return or retracted stroke thereby moving dog 550 forwardly to cause flask section 83 or 83a to be pulled by dog 550 from the rollers of roll-over device 99 onto the rollers 534, 535 of conveyor structure 525.

When member 537 is in its rearward or extended position it engages a limit switch LS15T. Another limit switch LS17T is actuated by member 537 when the latter is in its forward or retracted position. Intermediate these two limit switches is a third limit switch LS18T which is engaged by a bar 555 and is maintained closed during the period it takes the length of bar 555 to pass the location of limit switch LS18T. The functions of limit switches LS15T, LS17T, LS18T will become apparent when the electrical control system is described below.

It will be obvious that after cylinder 7T is actuated to retract dog 550 in the forward direction to move a drag section 83a from roll-over device 99 onto rollers 534, 535, cylinder 7T is actuated for the extended stroke to move dog 550 rearwardly to engage a cope section 83 which is then also transferred from roll-over device 99 onto rollers 534, 535 by a second retracted stroke of air cylinder 7T. The latter is again actuated to return dog 550 to the extended position and this cycle of operations is continued with drag and cope sections being alternately transferred from roll-over device 99 to conveyor structure 525.

Brush device 101 is located approximately below cylinder 7T and comprises a brush 556 having upwardly projecting bristles 557 and is mounted to longitudinal angle elements 530, 533 by brackets 558, 559. The flask sections 83, 83a when urged forwardly by dog 550 will continue to abut each other in end-to-end relation so as to move continuously in the forward direction on rollers 534, 535. As the flask sections 83, 83a pass over brush device 101, bristles 557 will engage the lower ends of the flask sections to remove molding sand therefrom.

Figure 23:
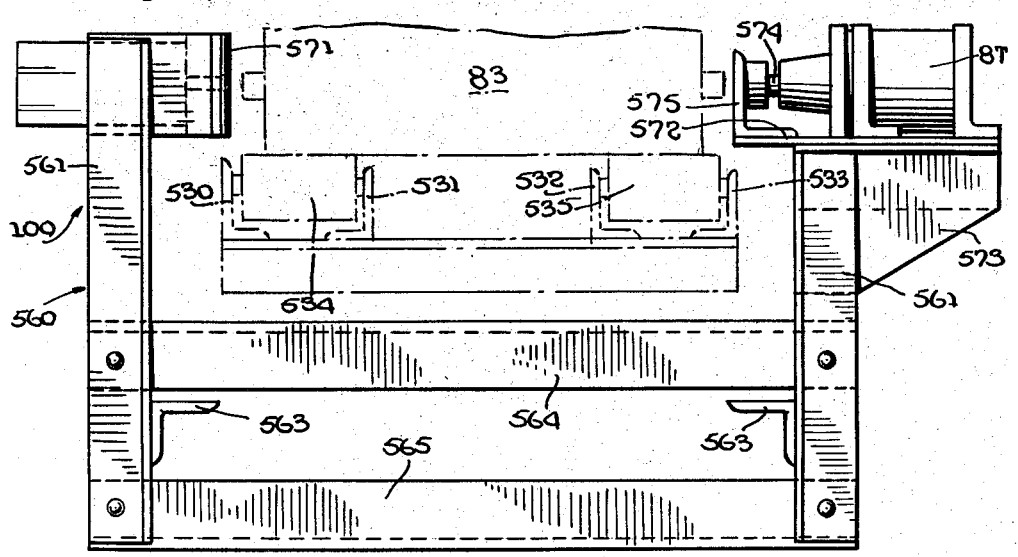
Fig. 23 is an end elevational view of the vibrator device associated with the structures of Figs. 20 to 22.
Figure 24:
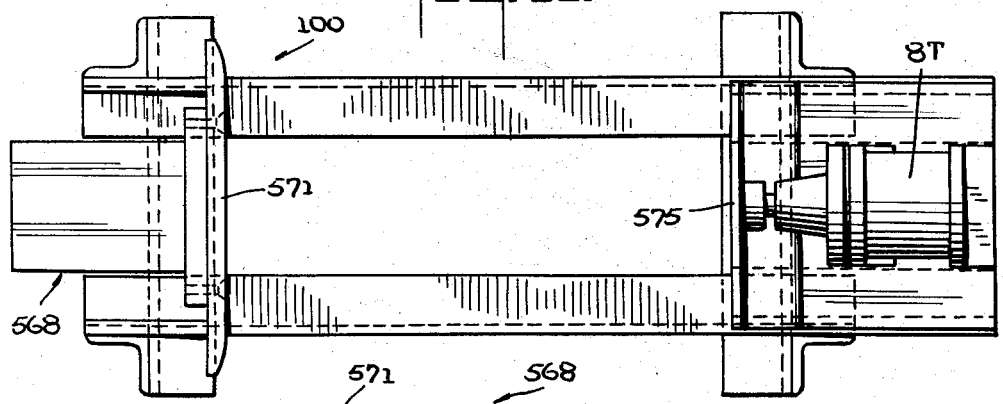
Fig. 24 is a top plan view of the vibrator device.
Figure 25:
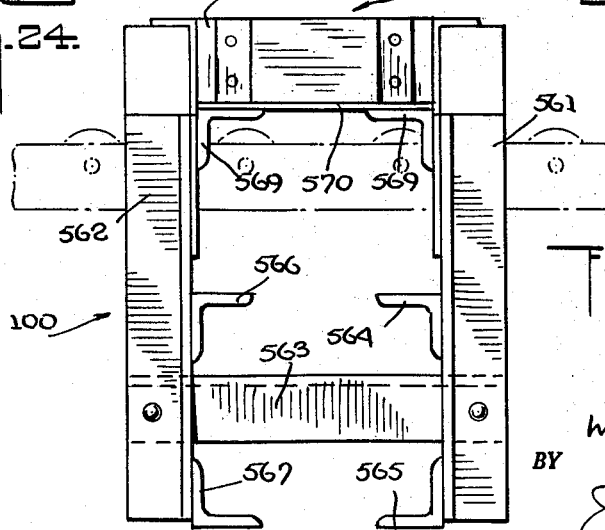
Fig. 25 is a side elevational view thereof.

At the end of the retracting stroke of air cylinder 7T, the flask section 83 or 83a moved thereby onto conveyor structure 525 will be located in a position to be engaged by vibrator device 100 indicated in dash-dot lines in Figs. 20 and 21 and shown more clearly in Figs. 23 and 24. Vibrator device 100 comprises a frame structure 560 having vertical column elements 561 between which extend the angle elements 530 to 533 and rollers 534, 535 of conveyor structure 525. Another pair of vertical column elements 562 are provided on opposite sides and are secured to column elements 561 respectively by longitudinal angle elements 563. The pair of column elements 561 are connected by transverse angle elements 564, 565 and the other pair of column elements 562 are connected by angle elements 566, 567.

At one side of frame 560, a vibrator 568 is mounted on the upper ends of column elements 561, 562 by a mounting means including brackets 569 and plate 570. Vibrator 568 comprises a contact plate 571 for engaging a flask section 83 or 83a. Vibrator 568 is of conventional construction and the details thereof are well-known in the art. At the opposite side of frame 560 and in alignment with vibrator 568 is an air cylinder 8T mounted on a support 572 secured to the upper ends of column elements 560, 561 by a pair of gussets 573. Cylinder 8T is provided with a reciprocable piston connected to a piston rod 574 which is in turn connected to a pusher member 575 slidable on mounting plate 572 and adapted to engage flask section 83 or 83a to move the latter laterally against contact plate 571 of vibrator 568, thereby permitting the latter to shake off the molding sand still adhered to flask sections 83, 83a.

*The flask section indexing mechanism*

The line of return flasks passing the vibrator is approximately a solid line and is moved beyond the vibrating device with copes and drags alternating. As the cope and drag elevators are emptied to the molding machines (as will appear hereinafter), and returned to their lowered position, two places on the line of return flasks are emptied by the elevators. These two spaces are refilled by two consecutive strokes of cylinder 7T or indexing cylinder. The impetus is passed from cylinder 7T through the line of flasks which are approximately end to end on the conveyor. On the first stroke of cylinder 7T, the station at the drag elevator which has been emptied, is refilled temporarily with a cope flask which was just ahead of this station previously. On the second stroke of cylinder 7T the impetus of the line of flasks moves the cope flask out of the drag elevator station and onto the portion of the conveyor between the drag and cope elevators. The impetus is carried out so that the cope flask which was just ahead of the cope elevator station is moved into the cope elevator. During the second stroke of the cylinder, a drag flask is moved into the drag elevator and it is this drag flask which pushes the cope flask out of the drag elevator and toward the cope elevator. The line of flasks is now, again, properly refilled, there being a cope flask on the cope elevator and a drag flask on the drag elevator.

Means is provided to stop the line of flasks after the drag and cope elevators have been refilled and to permit a cope flask to pass through the lowered drag elevator to the portion of the conveyor which takes it to the lowered cope elevator. To this end there is mounted just beyond the cope elevator 647 a stop S (see Figs. 27A and 27B). This stop may be attached to the floor. It comprises a pair of vertical channels S1 and S2 interconnected by a bottom horizontal angle S3 and an intermediate horizontal channel S4. The lower ends of said channels are fixed to the floor. Attached to the upper ends of the vertical channels S1 are inclined channels S5, the lower ends of which may be attached to the foundation. Fixed to the upper ends of the vertical channels S1 are abutment members S6 located at such a height that a cope fully on the cope elevator will contact these stops and be stopped thereby. The arrow in Fig. 27A shows direction of movement of cope flask onto the cope elevator.

Mounted on stop S in any suitable manner is limit switch LS10C adapted to be engaged by the cope on the cope elevator coming to its full final stop position where it is stopped by the stop S.

Referring now to Figs. 26 and 27 there is shown conveyor portion 644 which extends between the drag elevator 645 and the cope elevator 647. Pivoted to a bracket 645a mounted on the base of the drag mold machine, or on any other suitable support, is a cylinder 8I (Figs. 7, 26, 27), disposed in a vertical position. Within the cylinder is a piston 580 to the upper end of which is attached a clevis 581 supporting a transverse horizontal shaft 581a. The cylinder 8I is located between the sides of the conveyor 644 and just beyond the drag elevator 645. Pivoted to the shaft 581a are links 582. Mounted on the conveyor 644 are guide roller support angles 583 disposed above the rollers of the conveyor 644. Attached to the ends of the horizontal angles 583 are vertical angles 584 supporting a transverse pivot pin 585. Pivoted to the pivot pins 585 are a pair of stop levers 586. Carried by the upper ends of the links 582 is a transverse shaft 582a. The levers 586 are pivoted to the shaft 582a as shown in Figs. 26 and 27 of the drawing.

The cylinder 8I is controlled by solenoids SV8IE which extends the piston 580 when energized to move the links 582 upwardly. During such motion the finger ends 586a of the stops 586 move down to serve as a stop for the drag flask on the drag elevator. The cylinder 8I is also controlled by a solenoid SV8IR which serves to retract the piston and move the links 582 downwardly thereby raising the stop fingers 586a. In this position the stop members 586 are in horizontal or clear position permitting the flasks to pass through the drag elevator and onto the conveyor portion 644 to be moved toward the cope elevator.

Supported in any suitable manner is a limit switch LS24 which is adapted to be actuated when the cylinder 8I is retracted and the stop fingers 586a move to clear position. Also on the conveyor 644 are a pair of limit switches LS22 and LS23. These are so spaced apart that when a cope is passed through the drag elevator and onto the conveyor section 644 the cope flask passing beyond the drag elevator will actuate both limit switches LS22 and LS23. As the drag flask comes to a position fully within the drag elevator it will close a limit switch LS10D as shown in Fig. 27.

As the flasks enter the elevators they may be located centrally by any suitable dogs (not shown) against the flask stop 586a. The flask stop is behind the drag flask and is lowered to stop the drag entering the drag elevator from going further, as a cope flask passes beyond the drag elevator. The switches LS22 and LS23 are so placed that each end of a cope flask passing fully beyond the drag elevator closes one of them. The cope flask in passing the cleared stop on the drag elevator simultaneously closes switches LS22 and LS23 to energize the solenoid SV8IE (see Fig. 65, right side) to lower the stop fingers 586a and stop the drag flask on the drag elevator. The circuit to LS22 is automatic regardless of how the machine is run, whether manually or automatically. This insures the operation since the momentum of the cope while carrying it several inches beyond these stages still leaves the forward switch to be closed and the next index of the line of flasks by the rear end of the cope mentioned. Thus, this closing of one switch by the rear end of the cope flask in being indexed, will not cause the stops down action and it will not occur until a new cope has fully entered the switch area. The stops "Up" or "Clear" will occur when the drag elevator returns to its down position and limit switch LS25 is closed momentarily (see Fig. 28). When the stops are "Up" the line is clear for passage of the next cope flask through the drag elevator. When the limit switch LS25 is closed, the solenoid SV8IR (Fig. 65) is energized to cause the piston 58 to be retracted to move the stops 586 to the full line or clear position of Fig. 27.

It will be noted that the limit switch LS24 is closed by the stops of cylinder 8I in the stops "Up" or "Clear" position and is a safety interlock with cylinder 5T and cylinder 7T of the punch-out transfer line so that the flasks will not be indexed until the stops are clear to the passage of flasks. As will be seen hereinafter, the limit switches LS12D and LS12C are closed by the drag elevator and cope elevator, respectively, at the bottom of their strokes. These limit switches are also safety interlocks so that the flasks will not index unless the elevators are down and clear of the conveyor line.

*The drag and cope elevators*

Referring now to Figs. 6 and 7, the drag elevator is indicated generally by the reference numeral 645 and leads from the forward end of conveyor structure 525 to the rearward end of a conveyor structure indicated generally at 644. The latter leads to a cope elevator 647. The cope elevator 647 is substantially similar to the drag elevator 645. As best seen in Figs. 28 to 31 inclusive, each elevator 645, 647 comprises a stationary conveyor structure 646, having four vertical column elements 647' secured by angle base members 648 at their lower ends to the floor surface indicated by the reference letter G. Four longitudinally-extending angle elements 649, 650, 651, 652 are fixed to the upper end of column elements 647 and have rotatably mounted therebetween two horizontally-extending series of rollers 653, 654 onto which the flask sections 83, 83a are moved after leaving conveyor structure 525. Angle elements 649 to 652 are secured to column elements 647 by gussets as at 655.

The floor on which the apparatus of the present invention is mounted is provided with a pit 656 having a horizontal bottom 657 on which is fixedly mounted the lower end of a vertical air cylinder indicated by the reference designations 5MC, 5MD referring to the cylinders of the cope elevator 647 and drag elevator 645 respectively. Each of the cylinders 5MC, 5MD has therein a reciprocally-slidable piston connected to a piston rod 658 which is in turn connected at its upper end by a nut 659 to a horizontal plate 660 having channel members 661, 662 fixedly mounted thereon. The opposite ends of the latter are secured to intermediate portions of a pair of longitudinally-extending channel beams 663, 664 located between the longitudinal angle elements 650 and 651. The opposite forward and rearward ends of beams 663, 664 have transverse members 665, 666 fixedly mounted thereon for rotatably supporting two series of rollers 667, 668. The latter are mounted for rotation about their respective horizontal axes which extend perpendicular to the axes of rotation of rollers 653, 654.

A pair of transverse angle elements 669, 670 extend across and are secured to intermediate portions of vertical column elements 647 and have fixedly welded thereto a pair of vertical hollow guide sleeves 671, 672 slidably receiving a pair of guide rods 673. The latter are secured at their upper ends to plates 674 which are in turn mounted to the lower surfaces of longitudinal beams 653, 654. It will thus be seen that beams 663, 664, members 655, 656 with rollers 657, 658 rotatably mounted thereon comprise a vertically-reciprocable platform indicated generally by the reference numeral 675, and guided for up and down movement by guide sleeves 671, 672 and guide rods 673. Platform 675 is moved upwardly and downwardly by actuation of air cylinder 5MC, 5MD.

When platform 675 of drag elevator 645 is in its lowermost position, cam 627 secured to the rear end of beam 663 engages the roller 626 of the index mechanism (shown in Figs. 26 and 27 and described above) to permit a pair of flask sections 83, 83a with the cope section 83a leading, to roll from conveyor structure 525 to rollers 653, 654 of drag elevator 645. The cope section 83a continues to move onwardly to conveyor structure 644 and then to the cope elevator 647. The drag section 83 is provided with a downwardly extending lug 128, as shown in Fig. 5a and described above, which engages a suitable projection 676 on beam 652 of drag elevator 645 so as to stop the forward movement of drag section 83 while the latter rests on rollers 653, 654. Cylinder 5MD of drag elevator 645 is then actuated to raise platform 675 as shown in Figs. 30 and 31, thereby permitting rollers 667, 668 of platform 675 to engage drag section 83 and raise the latter upwardly. The drag section 83 may then be moved along rollers 667, 668 by a measuring box 682 to the drag moulding machine 84 as will be explained below. In a similar manner, the cope section 83a may be raised by the platform 675 of cope elevator 647 and then rolled to the cope molding machine 86.

As shown schematically in Fig. 30 each of the molding machines 84, 86 is provided with a limit switch LS3C and LS3D respectively adapted to be actuated by engagement with a lug 677 mounted on the platform 675 of both the drag elevator 645 and the cope elevator 647 when said platforms 675 are in their uppermost positions. Referring to Fig. 7, another limit switch LS10D is mounted on the rear end of conveyor structure 646 and is closed by engagement with drag 83 when the latter moves onto elevator 645. A similar limit switch LS10C is closed by cope 83a when the latter moves onto elevator 647. The limit switches LS3C, LS3D, LS10D and LS10C comprise part of an automatic electrical control circuit to be described in detail below. Also forming part of this control circuit are a pair of limit switches indicated at LS12C for the cope elevator and LS12D for the drag elevator. Limit switches LS12C, LS12D are engaged by platform 675 when the latter are in their lowered positions as shown in Fig. 28.

*The sand measuring devices*

As shown in Fig. 31a, when drag section 83 has been raised by platform 675 of drag elevator 645, a sand measuring device 680 associated with each of the molding machines 84, 86 moves drag section 83 from platform 675 to the drag molding machine 84 and fills the drag section with molding said. Referring to Figs. 32 to 39 inclusive, each of the sand measuring devices 680 comprises a stationary hopper 681 adapted to contain a supply of molding sand and located over elevators 645, 647 respectively. A measuring box indicated generally at 682 is mounted for reciprocal movement from a position below the open end of hopper 681 to a position within molding machines 84, 86 and then back again.

Hopper 681 comprises an upper portion 683' of downwardly converging shape and a lower portion 683 of rectangular shape in cross-section and having vertical side walls 684, 685 joined to vertical end walls 686, 687. A pair of horizontal longitudinal angle elements 688, 689 are secured to end walls 686, 687 respectively along their vertical flange portions 688', 689' and are provided with horizontal flange portions 688", 689" to which are secured the horizontal flange portions 690', 691' of a pair of angle elements 690, 691. The latter have vertical flange portions 690", 691" to which a series of rollers 692 are mounted for rotation about their respective horizontal axes.

The rollers 692 are each provided with a cylindrical portion 693 and an enlarged peripheral flange 694 at the outer end. An axial bore 695 extends through each roller 692 for receiving the enlarged cylindrical portion 696 of a shaft indicated generally at 697. The latter is provided with a reduced portion 698 extending through an aperture 699 formed in the vertical flange portions 690", 691" of each of the angle elements 690, 691.

The inner end of each shaft 697 is threaded for receiving a castellated nut 700 locked in place by a cotter pin 701. A washer 702 is located between nut 700 and the inner shoulder 703 of portion 696 of shaft 697. A washer 704 is located between the inner surface of vertical flange 690" and the outer shoulder 705 of shaft portion 696. A split retaining ring 706 is located between the outer surface of vertical flange 690" and a retaining nut 707 on the outer end of shaft 696. The vertical flanges 688', 689' of angle elements 688, 689 are secured to hopper side walls 686, 687 by bolts 708, and nuts 709, whereas the horizontal flanges 690', 691' of angle elements 690, 691 are secured to the horizontal flanges 688", 689" of angle elements 688, 689 by bolts 710 and nuts 711.

Measuring box 682 comprises a pair of vertical side walls 712, 713 located adjacent and outwardly of hopper side walls 686, 687 respectively. The upper edges 714 of measuring box side walls 712, 713 are above the lower edges 715 of hopper side walls 686, 687 so that the upper portions of walls 712, 713 overlap the lower portions of walls 686, 687. An upper pair of longitudinal angle elements 716, 717 are secured to the upper portions of measuring box side walls 712, 713 respectively. A lower pair of angle elements 718, 719 are secured to measuring box walls 712, 713 and are spaced below angle elements 716, 717 respectively. Angle elements 716 to 719 are secured to walls 712, 713 along their vertical flanges 716' to 719' and are provided with horizontal flanges 716" to 719" which are adapted to receive rollers 692 therebetween and to roll along the latter so as to provide a mounting arrangement for the reciprocal movement of measuring box 682.

A plurality of screws 721 extend through measuring box side walls 712, 713 adjacent the lower edges 722 of the latter. Each of the screws 721 is provided with a bearing sleeve 723 rotatably mounted thereon and a series of links 724 are mounted on sleeves 723 at their upper ends so as to be pivotable about the axes of pivot pins 721. The outer ends of the latter are threaded at 725 for receiving a retaining nut 726 which engages a split retaining ring 727 abutting against a washer 728, there being another washer 729 adjacent the outer surface of side walls 712, 713.

The lower ends of links 724 are provided with apertures 729 receiving pivot pins 730 which extend through bearing sleeves 731 fixed within a pair of longitudinal elements 732, 732' extending in spaced parallel relation along the lower edges 722 of measuring box side walls 712, 713. Elements 732, 732' are joined together at their rearward ends by a transverse member 733 of T-shape in cross-section to form a U-shaped actuating member indicated generally by the reference numeral 734. The outer ends of pivot pins 730 are threaded at 735 to receive a nut 736 abutting against a split retaining ring 737 which in turn abuts a washer 738, there being another washer 739 adjacent the outer surface of each link 724.

It will thus be seen that the series of links 724 are pivotally connected at their upper ends to lower portions of each of the measuring box side walls 712, 713 and at their lower ends to the U-shaped actuating member 734 so that when the latter is in the forward or right hand position shown in Figs. 34 and 35 the links 724 will assume a forwardly and downwardly inclined position, whereas if actuating member 734 is moved rearwardly or to the left, links 724 will be pivoted about pivot pins 721 until they assume a rearwardly inclined position so as to be at an angle of approximately 90° with respect to their initial forwardly inclined positions before said movement of actuating member 734.

It will be obvious that each of the links 724 pivoted to side walls 712 is opposite a respective one of the links 724 pivoted to the opposite side wall 713 so as to form horizontally-aligned pairs of links. Extending between each of the aligned pairs of links 724 and fixedly secured thereto, as by welding at 741, is a respective one of a series of planar gate members 742. When links 724 are in their forwardly inclined positions shown in Figs. 32 and 33, gate members 742 will extend horizontally so as to close the lower open end of measuring box 682 and thereby prevent the molding sand from flowing outwardly through said lower open end. However, when actuating member 734 is moved rearwardly, links 724 will be pivoted about pivot pins 721 to their rearwardly inclined positions causing gate members 742 to assume the vertical open positions shown in dash-dot lines in Fig. 33 and indicated by the reference numeral 742'.

The forward end of measuring box 682 is closed by a transverse wall 743 and its rearward end is closed by a transverse wall 744. A pair of horizontal bottom walls 745, 746 extend forwardly and rearwardly from walls 743, 744 respectively. The upper end of measuring box 682 is open and when box 682 is in its rearward position shown in Figs. 34 and 35 its upper open end is directly beneath and in communication with the lower open end of hopper 681 so as to allow the molding sand therein to flow downwardly and fill the hollow interior of measuring box 682. When measuring box 682 is moved forwardly on rollers 692 to the extended position shown in Figs. 32, 33 and 35, the lower open end of hopper 681 is closed by bottom wall 746.

As best seen in Fig. 34, the lower edge 747 of hopper wall 685 is spaced above the bottom wall 745 of measuring box 682. A bracket 748 is fixedly secured to hopper wall 685. A gate 749 abuts against the exterior surface of hopper wall 685 and is provided with a lower end 750 extending downwardly below the lower edge 747 of hopper wall 685 but spaced above the wall 745 of measuring box 682 so as to provide an orifice therebetween through which the molding sand may flow as measuring box 682 moves forwardly to its extended position. Gate 749 is mounted for vertical adjustment by means of a flange 751 having slots 752 receiving bolts 753. The height of the lower end 750 of gate 749 thus determines the height of the pile of molding sand in the measuring box 682 when the latter has been moved forwardly to its extended position, the height of this pile of sand being adjusted by varying the vertical position of gate 749.

As stated above, there are two sand measuring devices 680, one being associated with the drag molding machine 84 and the other cooperating with the cope molding machine 86. In order to move the sand measuring box 682 of each of these sand measuring devices 680 forwardly and rearwardly, there is provided an air cylinder indicated by the reference designation 1MC for the sand measuring device 680 associated with the cope molding machine 86 and 1MD for the sand measuring device 680 associated with the drag molding machine 84. Each of the air cylinders 1MC, 1MD is provided with a reciprocally slidable piston connected to a piston rod 754 having a clevis 755 at its outer end pivoted at 756 to a bracket 757 secured to the rear wall 744 of sand measuring box 682.

In order to move the actuating member 734, each of the sand measuring devices 680 is provided with an air cylinder indicated at 3MC and 3MD respectively. Each of the latter air cylinders is provided with a rearwardly extending pair of ears 758 pivoted at 759 to a bracket 760 fixedly secured to the lower end of a downwardly-extending support member 761 having its upper end fixedly secured to the bottom wall 746 of sand measuring box 682. Cylinders 3MC, 3MD are each provided with a reciprocable piston connected to a piston rod 762 having at its forward end a clevis 763 pivotally connected by a pivot pin 764 to a lug 765 secured to the transverse T-shaped member 733 of the actuating member 734. It will thus be seen that cylinders 3MC, 3MD may be actuated to move member 734 and thereby pivot links 724 to rotate gate members 742 to their horizontal closed positions or their vertical open positions.

As shown in Fig. 33, a pair of horizontally-extending arms 766 are secured at their rearward ends to the lower edges of vertical support members 767 which are in turn secured at their upper ends to side walls 712, 713 of sand measuring box 682. The forward ends of arms 766 are provided with recesses at 768 for receiving the trunnions 120, 121 of the flask sections 83, 83a as the latter are moved to the uppermost position of platform 675 of elevators 645, 647 after which air cylinders 1MC, 1MD are actuated to move sand measuring box 682 to its extended position thereby moving flask sections 83, 83a therewith from the rollers 667, 668 of elevator platform 675 onto the rollers of the molding machines 84, 86 respectively.

The two sand measuring devices 680 of the cope and drag lines each comprises several limit switches which are part of the automatic electrical control system to be described in detail below. A first limit switch indicated at LS9C, LS9D respectively is fixedly mounted to one of the longitudinal angle elements 688, 689 and is engaged by the rear end of one of the angle elements 716, 717 secured to measuring box 682 when the latter is in its outward position over the drag or cope elevator, this outward position being at the left as shown in Fig. 34 and directly below hopper 681. Referring to Fig. 33, a limit switch LS8C, LS8D is fixedly mounted to one of the angle elements 690, 691 by means of a vertical bracket 769 and is momentarily actuated by engagement with support 761 as sand measuring box 682 is moving outwardly toward the position shown in Fig. 34. Another limit switch LS7C, LS7D is fixedly secured to support member 767 and is actuated by engagement with T-shaped member 733 of actuating member 734 when the latter is moved by cylinder 3MC or 3MD to the rearward position for the opening of gate members 742.

*The molding machines*

Referring now to Figs. 40 to 44a, the molding machines 84, 86 will now be described. Molding machines 84, 86 are located adjacent elevators 645, 647 respectively and each comprises a frame having vertical column elements 775 mounted to the floor by base angle elements 776 and connected together at their upper ends by horizontal channel members 778. A first pair of vertical posts 779, 780 are braced at their upper and lower ends by horizontal frame members 781 secured thereto and a second pair of vertical posts 782, 783 are braced by horizontal frame members 784.

The upper ends of posts 779, 782 are interconnected by a frame member 785 and their lower ends are similarly braced. The upper ends of posts 780, 783 are likewise interconnected by frame member 786 and their lower ends by a frame member 787. A pair of longitudinal horizontal members 788, 789 are secured at their outer ends to column elements 775 by gussets 790 and their inner ends are fixedly secured to intermediate portions of vertical posts 782, 783 respectively. The intermediate portions of members 788, 789 are fixedly secured to vertical posts 779, 780.

A squeeze car indicated generally by the reference numeral 791 is reciprocally slidable along frame members 788, 789 and comprises a series of horizontally extending I-beams 792 to 795 interconnected by a series of horizontal beams 796, 797, 798 extending transversely thereto. The lower ends of the latter are fixedly secured to a horizontal squeeze plate 799. The outer ends of I-beams 792 and 795 have supports 800, 801 secured thereto for rotatably mounting a pair of rollers 802, 803 which ride along frame members 788, 789 and support the outer end of squeeze table 791. The inner end of I-beams 792 and 795 are similarly provided with supports 804, 805 rotatably mounting rollers 806, 807 which roll along frame members 788, 789 and support the inner end of squeeze table 791. It will thus be seen that squeeze table 791 is reciprocally movable from the inner position shown in Fig. 40 to an outer position at the left as viewed in Fig. 40, and then back again to the inner position.

In order to move squeeze table 791 outwardly and inwardly, each of the molding machines 84, 86 is provided with an air cylinder indicated at 4MD, 4MC respectively. The outer end of each air cylinder is secured by a bracket 808 to channel member 778 and its inner end is secured by a bracket 809 to an angle element 810 fixedly mounted to member 781. Each of these air cylinders 4MC, 4MD is provided with a reciprocally slidable piston connected to a piston rod 811 having at its forward end a clevis 812 pivotally connected by a pin 813 to a lug 814 secured to the inner end of squeeze table 791. It will be seen in Fig. 42 that air cylinder 4MC, 4MD extends between I-beams 793 and 794 so as to permit squeeze table 791 to be moved to the outer or retracted position shown in Fig. 42.

Secured to I-beams 792 to 795 and extending downwardly therefrom are a series of supports 815 having suitable bearing openings in their lower ends for rotatably mounting a horizontally-extending shaft 816. A pair of brackets 817, 818 are fixedly secured to the opposite ends of shaft 816 and have secured thereto a pair of horizontally-extending angle elements 819, 820 respectively. The forward ends of the latter are secured to a strike-off member 821 to which is mounted a horizontally extending angle element 822 having a horizontally projecting flange portion abutting the upper end of a bolt 823 adjustably mounted on a suitable support 824 extending downwardly from the forward ends of I-beams 792 to 795. It will thus be seen that elements 819, 820 are rotatable about the axis of shaft 816 so as to provide for adjustment of the vertical height of strike-off member 821 by regulating the adjusting bolt 823.

Each of the molding machines 84, 86 is provided with a pair of vertical air cylinders indicated at 6MD and 6MC respectively. These cylinders are provided with a base portion 825 resting upon a frame supported by columns separate from the building structure. As best seen in Fig. 44a, each of the cylinders 6MC, 6MD is provided with a hollow piston 826 reciprocally slidable therein and having a vertical cylindrical wall 827 integral with a horizontal bottom wall 828. The upper end of each piston 826 is open and is provided with an inwardly-extending horizontal flange 829 to which is secured by bolts 830 the lower plate 831 of a squeeze table indicated generally by the reference numeral 832.

An upper plate 833 is spaced above plate 831 and is secured thereto by vertical members 834. The peripheral edges of plate 831 extend outwardly beyond the edges of plate 833 and are connected thereto by angularly-extending members 835 to which are secured vertically-extending members 836. The latter are provided with horizontal bearing surfaces 837 on which rests the horizontal bearing surfaces 838 of members 839 secured to the angularly extending walls 840 of a frusto-pyramid housing 841 of a draw frame indicated generally by the reference numeral 842. Fixedly mounted on the upper plate 833 of squeeze table 832 is the dish plate 129 shown in Fig. 3, the latter being adapted to have the pattern plates 138 mounted within the recess 136 thereof in the manner described above.

The frusto-pyramid housing 841 of draw frame 842 comprises a pair of upwardly-converging side walls 840, 843 joined to a pair of upwardly-converging end walls 844, 845. Walls 840, 843, 844, 845 are provided at their lower ends with integral vertical wall portions as shown at 840', 843', 845'. Two pairs of brackets 846, 847 are secured to side walls 840, 843 and two additional pairs of brackets 848, 849 are secured to end walls 844, 845 respectively. A pair of horizontal parallel members 850, 851 are fixedly mounted to the upper ends of brackets 846 to 849 and are each provided with a series of rollers 852 rotatably mounted thereto about their respective horizontal axes. The rollers 852 are adapted to engage the lower surfaces of the bars 116, 117 at the opposite ends of each of the flask sections 83, 83a so as to support the latter. Said bars 116, 117 are best seen in Figs. 4 and 5.

The upper open end of frusto-pyramid housing 841 forms a rectangular opening exposing therethrough dish plate 129 and pattern plate 138. It will thus be seen that the entire draw frame structure 842 may move upwardly relative to squeeze plate 839 and dish plate 129, as will be explained in more detail below. Squeeze plate 832 is moved upwardly by the upward movement of pistons 826 connected thereto and slidable within the pair of cylinders 6MC, 6MD. In order to move the draw frame 842 upwardly and independently of the position of squeeze table 832, four cylinders designated 7MC, 7MD are fixedly mounted to cylinders 6MC, 6MD. The designation 7MC refers to the four cylinders of the cope molding machine 86 whereas the designation 7MD refers to the four cylinders associated with the drag molding machine 84.

Each of the cylinders 7MC, 7MD comprises a lower cylindrical housing 853 joined at its upper open end to the lower open end of an upper cylindrical housing 854. A pair of bearing sleeves 855, 856 are fixedly mounted within upper housing 854 for slidably mounting a vertical piston rod 857 extending therethrough. The upper end of piston rod 857 projects upwardly from the upper end of cylinder housing 854 and is provided with a reduced portion 858 to which is secured a member 859 by a nut 860 threaded on suitable external threads provided on portion 858. Each of the four members 859 is welded at 860 to one of the side walls 840, 843 of the frusto-pyramid housing 841 and is also welded at 861 to a downwardly-projecting element 862 secured to the upper edge of an opening 863 formed in walls 840, 843 for receiving member 859. The latter is also welded at 864 to an angle element 865 abutting the under surfaces of each of the walls 840, 843. It will thus be seen that the upper ends of piston rods 857 are fixedly secured to the frusto-pyramid housing 841 of draw frame 842.

A piston 866 is vertically reciprocally slidable within the lower cylindrical housing 853 and is provided with a cylindrical recess 867 extending downwardly from its upper surface 868 for slidably receiving the lower end of piston rod 857. The lower end face 869 of piston rod 857 is adapted to abut the bottom surface 870 of recess 867 whereby upward movement of piston 866 imparts upward movement of piston rod 857 and hence urges the entire draw frame structure 842 upwardly therewith. It will also be noted that squeeze table 832 may move draw frame structure 842 upwardly relative to piston 866 in which case the lost-motion connection provided by recess 867 and the lower end of piston rod 857 will permit said piston rod lower end to move upwardly out of recess 867.

Pistons 826 of cylinders 6MC, 6MD are urged upwardly by fluid under pressure, such as air, which is fed thereinto through inlet openings 871 provided in the base 825 of each cylinder 6MC, 6MD. Pistons 866 of cylinders 7MC, 7MD are preferably also air-actuated and the lower ends of the lower cylinder housings 853 are provided with air inlet openings 872 for this purpose. As best seen in Figs. 41 and 43, draw frame 842 is guided for vertical reciprocal movement by a plurality of lugs 873 fixedly mounted to cylinders 6MC, 6MD and provided with vertical openings therethrough for slidably receiving a rod 874 having its upper end secured to draw frame 842 by a nut 875. A nut 876 on the lower end of each of the rods 874 is adapted to abut the respective one of lugs 873 so as to limit the upward movement of draw frame 842.

*Operation of sand measuring devices and molding machines*

The mode of operation and coaction of sand measuring devices 680, elevators 645, 647 and each of the molding machines 84, 86 will now be briefly described. Reference will be made in this description only to the drag molding machine 84. It being understood that the cope elevator 647, cope molding machine 86 and the sand measuring device 680 associated therewith operate in a substantially similar manner. After the platform 675 of drag elevator 645 raises the drag flask section 83 to the upper position shown in Figs. 30 and 31, the trunnions 120, 121 of drag section 83 will project through the recesses 768 of arms 766 fixed to the sand measuring box 682 since the latter will be in the outward or retracted position directly over drag elevator 645 as the platform 675 is being raised.

Cylinder 1MD is then actuated by a suitable automatic electrical control system, to be described in detail below, so as to move sand measuring box 682 together with drag 83 inwardly toward drag molding machine 84 so as to place drag 83 on the rollers 852 of draw frame 842. During this transfer of drag 83, pistons 866 of cylinders 7MD are in their uppermost positions to maintain draw frame 842 in an intermediate position raised relative to squeeze table 832 which at this time is in its lowermost position with pistons 826 of cylinders 6MD in their lowermost positions therein. The fluid pressure below pistons 866 is then reduced to lower draw frame 842 downwardly towards squeeze table 832 thereby permitting the pins 141 of dish plate 129 to enter the apertures 113 of lugs 109 to 112 of drag 83 and causing the latter to move downwardly so as to rest upon dish plate 129 with the pattern portions 139 of pattern plates 138 projecting upwardly into the hollow interior of drag 83.

Air cylinder 3MD is then actuated to retract its piston rod 762 thereby moving the actuating member 734 to cause gate members 742 to pivot downwardly to their vertical open positions indicated at 742' in Fig. 33. The sand within measuring box 682 is thus discharged into drag 83 to fill the latter. Cylinder 3MD is then actuated to close gate members 742 and the sand measuring box 682 is then moved outwardly by cylinder 1MD toward the retracted or outer position beneath hopper 681 and above drag elevator 645.

Cylinder 4MD is then actuated to move squeeze car 791 outwardly from the inner position shown in Fig. 42 to the outer position shown in Fig. 40 directly over drag 83. During this movement of squeeze car 791, strike-off member 821 scrapes the surface sand from the top of drag 83. Cylinders 6MD are then actuated to move pistons 826 upwardly and thereby move squeeze table 832, draw frame 842 and the filled drag 83 upwardly therewith to an uppermost position to squeeze and ram the molding sand within drag 83 against the squeeze plates 799 of squeeze car 791, thereby compressing the molding sand firmly around pattern portions 139 to form the molding impressions in the sand.

Air cylinders 6MD are then actuated to move pistons 826 downwardly to their lowermost positions and thereby move squeeze table 832, dish plate 129 and pattern plates 138 downwardly therewith to the initial lowermost position. However, cylinders 7MD have been actuated to move pistons 866 therein upwardly so as to prevent draw frame 842 and the drag 83 mounted on the rollers 852 thereof from moving downwardly with squeeze table 832, draw frame 842 stopping at the initial intermediate position. Squeeze car 791 is then moved inwardly or toward the left as viewed in Fig. 40 by actuation of cylinder 4MD. During this inward movement of squeeze car 91, strike-off member 821 will engage drag 83 and move it inwardly along rollers 852 to a full drag rollover device 85 to be described in detail below, said rollover device 85 inverting the filled drag 83 and placing it on a car 82 in the portion 81c of the main conveyor 81. The location of rollover device 85 relative to other parts of the entire apparatus is best shown in Figs. 1 and 31a.

Both of the molding machines 84, 86 are provided with a plurality of limit switches which form part of the automatic electrical control system to be described in detail below. More specifically, and referring to Fig. 41, a bracket 877 is fixedly mounted to squeeze table 832 and is provided with a detent 876 adapted to engage a pair of limit switches LS2C, LS2D and LS14C, LS14D fixed with respect to cylinders 6MC, 6MD of each of the molding machines 84, 86. Limit switch LS2C, LS2D is closed when squeeze table 832 is at its lowermost position and limit switch LS14C, LS14D is momentarily closed by squeeze table 832 as the latter moves downwardly near the bottom of its downward travel.

As shown in Fig. 40, a limit switch LS4C, LS4D is closed by draw frame 842 when the latter is at its intermediate or midway position and another limit switch LS6C, LS6D is closed by draw frame 842 when the latter is all the way down in its lowermost position. Still another limit switch LS1C, LS1D is engaged by squeeze car 791 when the latter is in its outermost position, that is, away from squeeze table 832. The limit switch LS3C, LS3D, mentioned above when describing the details of construction of elevators 645, 647 is closed when the elevator platform 675 is in the uppermost position. As shown in Fig. 42, a limit switch LS5C, LS5D is closed by engagement with sand measuring box 682 when the latter has been moved inwardly over squeeze table 832. Still another limit switch LS13C, LS13D is closed by an engagement with squeeze car 791 when the latter has been moved inwardly over squeeze table 832.

*The full drag rollover device*

Referring now to Figs. 45 to 47 inclusive, the full drag rollover device 85 comprises a conveyor structure 880 having a plurality of horizontally-extending members 881 rotatably supporting a series of rollers 882 mounted for rotation about their respective horizontal axes. Rollers 882 are at the same height as rollers 852 of draw frame 842 when the latter is at its intermediate position and conveyor structure 880 extends from drag molding machine 84 to the rollover device 85. The strike-off member 821 of molding machine 84 moves the drag section 83 onto rollers 882 of conveyor structure 880.

As shown in Fig. 47, a hydromotor indicated generally at 883 and of well-known construction is mounted on a support 884 and is provided with an output shaft 885 connected to a coupling 886 which is in turn connected to the reduced end portion 887 of a horizontally-extending shaft 888. The latter is rotatably mounted at one end in a suitable bearing provided in a pillow block 889 mounted on a support plate 890. The opposite end of shaft 888 is similarly rotatably mounted in a bearing provided within a pillow block 891 mounted on support plate 892.

A pair of collars 893, 894 are fixedly mounted on shaft 888 adjacent the opposite ends thereof and are provided with arms 895, 896 secured thereto and extending in mutually parallel relation outwardly therefrom. As best seen in Fig. 46, arms 895, 896 are preferably in the form of channel beams each having a vertical web section 897, 898. A pair of clamp members 899 are rotatably mounted to the outer ends of arms 895, 896 by means of pivot pins 900 extending through web portions 897, 898. Another pair of clamp members 901 are similarly rotatably mounted adjacent to the inner ends of arms 895, 896 by means of pivot pins indicated at 902.

Clamp members 899, 901 are preferably of channel shape in cross section and are provided at their upper ends with recesses 903 adapted to receive and grip the longitudinal rib members 114, 115 of drag section 83. The lower ends of clamp members 899 are pivotally connected to the opposite ends of a longitudinal horizontal shaft 904 and the lower ends of clamp members 901 are similarly rotatably mounted to a shaft 905 extending parallel to shaft 904. A link 906 is pivotally connected at its outer end to an intermediate portion of shaft 904 and the outer end of a link 907 is pivotally connected to an intermediate portion of shaft 905.

Attached to the underside of arms 895, 896 is a transverse hanger 912 closer to pivots 900 than to pivots 902. Said hanger 912 comprises vertical side arms 912a to the lower ends of which are connected a horizontal transverse channel member 912b. Fixed near the center of said channel member 912b as by bolts 911 is the upper end of air cylinder 9MD. Said cylinder projects downwardly from said member 912b. In air cylinder 9MD is a piston having a piston rod 910 projecting upwardly through an opening in channel member 912b. Fixed to the upper end of piston rod 910 is a clevis 908 carrying a pivot pin 909. Said pin 909 is connected by links 906, 907 to rods or shafts 904, 905, respectively. It will be noted that link 907 is longer than link 906.

It will thus be seen that after drag 83 has been moved by strike-off member 821 of drag molding machine 84 onto the rollers 882 to the position shown in solid lines in Fig. 45, hydromotor 883 may rotate shaft 888 so as to swing arms 895, 896 to the position shown in solid lines in Fig. 45 directly beneath drag 83. Cylinder 9MD may then be actuated to move piston rod 10 and clevis 908 downwardly to cause clamp members 899, 901 to pivot about the axes of pins 900, 902 from the disengaged position indicated in dash-dot lines to the drag engaging position indicated in solid lines. The recesses 903 in the upper end of clamp members 899, 901 will thereby engage longitudinal ribs 114, 115 of drag 83 to grip the latter.

Hydromotor 883 is then actuated to rotate shaft 888 through an angular displacement of 180 degrees so as to rotate arms 895, 896 therewith to the position shown in dash-dot lines and indicated by the reference numeral 895'. It will thus be seen that drag 83 gripped by clamp members 899, 901 is inverted and moved outwardly to the position shown in dash-dot lines and indicated by the reference numeral 83'. In this inverted position, drag 83 is thereby placed directly on a car 82 of the conveyor portion 81c of main conveyor 81. After drag 83 has been placed on car 82 of the main conveyor 81, air cylinder 9MD is actuated to cause clamp members 899, 901 to be disengaged from drag 83 and rollover device 85 is then free to return to its initial position to receive the next succeeding drag section 83 and the above-described cycle of operations is then repeated.

The automatic electrical control system mentioned above and to be described in detail below comprises several limit switches associated with the full drag rollover device 85. More specifically, a pair of horizontally-aligned limit switches LS16D, LS17D are engaged by drag 83 when the latter is moved from molding machine 84 onto roller 82 of rollover device 85. Another limit switch LS18D is engaged by one of the clamp members 901 so as to be actuated when clamp members 899, 901 are moved to the drag engaging position shown in solid lines. Another limit switch LS15D shown in Fig. 47 is engaged by arm 895 when the arms 895, 896 are in a position to receive the drag 83 as shown in solid lines in Fig. 45.

Another limit switch LS19D is engaged by arm 895 when the hydromotor 883 has rotated arms 895, 896 to the position shown in dash-dot lines at 895'. Still another limit switch LS20D is actuated by one of the clamp members 899, 901 when the latter have been moved by cylinder 9MD to the disengaged position indicated at 899', 901' in dash-dot lines. Another limit switch LS21D is momentarily closed as the rollover device 85 begins its return movement from the position shown at 895' at the right as viewed in Fig. 45 to the initial position at the left in said figure.

*The cope closer device*

It will be recalled that the cope flask section 83a moves unimpeded over the rollers of the drag elevator 685 when the latter is in its lowermost position and then on to the conveyor structure 646 to the cope elevator 647, as best seen in Figs. 6 and 7. Cope elevator 647 raises each cope section 83a successively to the level of the rollers of cope molding machine 86 and the cope sections 83a are then transferred to the latter. The cope sections 83a are filled with molding sand in the cope molding machine 86 and are then transferred by the strike-off member of the latter to the cope closer device 88 which will now be described in detail.

As best seen in Figs. 48 to 50 inclusive, the cope closer device 88 comprises two pairs of vertical column elements 920, 921 supported on the floor surface at their lower ends by base members 922. A channel member 923 extends between and is secured to the upper ends of column elements 920 and another channel member 924 is similarly fixed to the upper ends of column elements 920. A pair of longitudinal angle elements 925, 926 extend in parallel spaced relation between channel members 923, 924 and are fixedly mounted thereto.

A cylinder mounting plate 927 is secured to intermediate portions of angle elements 925, 926 for fixedly mounting thereto the upper ends of a vertical air cylinder 10MC provided with a vertically reciprocal piston connected to a clevis 928. The latter is provided with a pin 929 to which is connected the upper link 930 of a short chain, the lower link 931 of which is connected to a pin 932 extending between a pair of lugs 933 fixedly mounted to an intermediate portion of a cross-head indicated generally by the reference numeral 934. The corners of cross-head 934 are connected to channels 923, 924 by inclined chains 934a to prevent swaying of the cross-head in full down position.

Cross head 934 comprises a channel member 935 having a horizontal web portion 936 integral with a pair of vertical flange portions 937, 938. A pair of gussets 939, 940 are mounted to the opposite ends of both flanges 937, 938 and are provided with suitable apertures serving as bearings for rotatably mounting a pair of horizontal shafts 941, 942. A pair of substantially vertical clamp arms 943 are mounted at their upper ends of shafts 941 for rotation about the axis of the latter and another pair of clamp arms 944 are similarly rotatably mounted about the axis of shaft 942. Brackets 945, 946 are fixedly mounted to intermediate portions of clamp arms 943, 944 and are pivotally connected by pivot pins 947, 948 to the outer ends of a pair of links 949, 950.

The inner ends of the latter are pivoted at 951 to a clevis 952 secured to the lower end of a piston rod 953 connected to a piston reciprocally slidable within an air cylinder 11MC having its upper end mounted to a support 954 which is secured to an intermediate portion of web 936 of channel member 935. The lower ends of clamp arms 943, 944 have fixedly mounted thereto horizontally-extending members 955, 956 to which two series of rollers 957, 958 are mounted for rotation about the respective horizontal axes of the latter.

An air cylinder 9MC is fixedly mounted to flange 937 adjacent one end of cross-head 934 and another air cylinder 9MC is mounted to flange 938 adjacent the opposite end of cross-head 934. Both air cylinders 9MC extend vertically and are provided with vertically reciprocable pistons connected to downwardly-projecting alignment pins 959, 960 having tapered lower ends at 959', 960'. Cross-head 934 is guided for vertical reciprocating movement by a pair of guide rods 961, 962 secured at their lower ends to opposite ends of channel member 935 by nuts 963, 964. The upper ends of guide rods 961, 962 are vertically slidable within guide sleeves 965, 966 having their upper ends secured to angle elements 925, 926.

It will thus be seen that when cylinder 11MC has been actuated to move clevis 952 downwardly to the lowermost position, links 949, 950 will pull inwardly on clamp arms 943, 944 to cause the latter to assume the vertical position shown in solid lines in Fig. 48. Cylinder 10MC may be actuated to raise cross-head 934 to its uppermost position shown in said figure. When the cope closer device 88 is in this condition, the rollers 957, 958 will be in horizontal alignment with the rollers of the cope molding machine 86 whereby the strike off member of the latter may move the filled cope section 83a from molding machine 86 onto rollers 957, 958 of cope closer device 88.

In this position the cope section 83a will be in direct vertical alignment over a drag section 83 which has previously been filled with molding sand by drag molding machine 84, has been placed on the conveyor portion 81c of main conveyor 81 and has travelled therealong to the cope closer device 88. The two cylinders 9MC may then be actuated to lower alignment pins 959, 960 so that the latter will enter the respective apertures 113 provided in a pair of diagonal lugs as at 109, 112 in Fig. 4 so as to align cross-head 934 with cope section 83a mounted thereon accurately with respect to the drag section 83 located thereunderneath. Cylinder 10MC is then actuated to lower the entire cross-head 934 and thereby place cope section 83a onto drag section 83.

Cylinder 11MC is then actuated to raise clevis 952 and thereby push outwardly on links 949, 950 to cause clamp arms 943, 944 to swing outwardly to the position indicated in dash-dot lines in Fig. 48, thereby moving rollers 957, 958 out of engagement with cope section 83a which is thus left mounted on drag section 83 as the latter rests upon a car 82 of conveyor portion 81c. The alignment pins 959, 960 which extend vertically through the apertures or bushings 113 of respective pairs of lugs on both cope section 83a and drag section 83 are then removed upwardly therefrom by cylinders 9MC. Cross-head 934 is then raised upwardly by cylinder 10MC and then clamp arms 943, 944 are pulled back to their initial vertical positions by cylinder 11MC so as to be in a position to receive the next succeeding cope section 83a and the above-described cycle of operation is then repeated.

A stop member 967 shown in Fig. 49 extends transversely of members 955, 956 and is secured thereto so as to abut against the leading edge of cope section 83a as the latter is rolled from molding machine 86 onto rollers 958 of cope closer device 88 and thereby stop the movement of cope section 83a when the latter reaches the proper predetermined position. A latch member 968 is pivotally mounted to clamp arms 944 at its inner end by a pivot pin 969 and its outer end is provided with a hook portion 970 adapted to engage cope section 83a to prevent the latter from rolling backwardly from said predetermined position. Another latch member 971 is mounted to members 956 and engages main conveyor 81 when cross-head 934 is lowered, thereby preventing relative sway movement of cross-head 934 with respect to conveyor 81 so as to aid in maintaining cope section 83a in proper vertical alignment with drag section 83 as cope section 83a is lowered onto the latter.

Cope closer device 88 comprises a number of limit switches which form part of the automatic electrical control system to be described in detail below. A pair of limit switches LS16C, LS17C are mounted to the outer ends of members 955, 956. These two limit switches are normally closed and are opened by engagement with cope section 83a when the latter is moved on to rollers 958. A limit switch LS15C is secured to cylinder 11MC and is actuated by engagement with a detent 972 mounted on the upper end of a vertical arm 973 secured to clevis 952 by a bracket 974. Limit switch LS15C is closed when cylinder 11MC has been actuated to move clamp arms 943, 944 inwardly toward the vertical position in which they are ready to receive a cope section 83a.

Another pair of limit switches LS18C, LS19C are mounted to cylinders 9MC and are actuated by detents 975, 976 fixed to the upper ends of arms 977, 978 connected by brackets 979, 980 to alignment pins 959, 960 respectively. Limit switches LS18C, LS19C are closed when cylinders 9MC have been actuated to move alignment pins 959, 960 downwardly toward their lowermost positions in which they extend through the apertures or bushings 113 of flask sections 83, 83a. Still another limit switch LS20C is mounted to the lower end of a support 981 extending downwardly from angle elements 925, 926 and is actuated by a detent 982 mounted on the upper end of a vertical arm 983 which is fixedly secured at its lowered end to cross-head 934. Limit switch LS20C is thus closed when cross-head 934 is moved downwardly to its lowermost position by air cylinder 10MC.

Another limit switch LS22C is mounted on support 981 above limit switch LS20C and is momentarily closed by detent 982 as cross-head 934 moves upwardly toward its uppermost position. Another limit switch LS21C is mounted on cylinder 11MC above limit switch LS15C and is closed by engagement with detent 972 when cylinder 11MC has been actuated to move clamp arms 943, 944 outwardly to their disengaged position indicated in dash-dot lines.

*The weight conveyor*

The conveyor cars 82, each having a filled drag section 83 on the pallet thereof with a filled cope section 83a in superimposed relation on drag section 83, are then moved along conveyor portions 81d, 81e toward the pouring device 91. As the cars travel along conveyor portions 81e, 81f, 81g and 81h, a weight conveyor indicated generally by the reference numeral 990 and shown in Figs. 57 to 62 inclusive, places weights on top of the cope sections 83a.

Weight conveyor 990 comprises a series of horizontally extending beams 991 supported by a suitable frame structure (not shown). A plurality of hangar members 992 extend downwardly from beams 991 so as to support at their lower ends a rail member indicated generally at 993. As best seen in Fig. 59, rail member 993 is in the form of an I-beam having a vertical web portion 994, upper horizontal flange portions 995, 996 and lower flange portions 997, 998. Rail member 993 extends horizontally and continuously in the form of a closed loop and comprises a vertical portion 993e extending over conveyor portion 81e, a curved portion 993f extending over conveyor portion 81f, a straight portion 993g extending over conveyor portion 81g and a curved portion 993h extending over conveyor portion 81h.

A conveyor chain indicated generally by the reference numeral 999 extends continuously around rail member 993 and is movably mounted thereon in the following manner. Conveyor chain 999 comprises a series of trolley members indicated at 1000 and each comprising a pair of upwardly curved arms 1001, 1002. The latter are provided at their upper ends with bearings 1003, 1004 rotatably mounting a pair of rollers 1005, 1006 which are adapted to roll along lower flanges 997, 998 of rail member 993.

The lower ends of curved arms 1001, 1002 are provided with downwardly extending portions 1007, 1008 between which extend the upper portions 1009, 1010 of a pair of segments which together form a bifurcated yoke 1011 having downwardly projecting arms 1012, 1013. Portions 1007, 1008 are fixedly secured with respect to portions 1009, 1010 by means of a bolt 1014 extending therethrough. Arms 1012, 1013 are each provided with horizontally-aligned apertures 1015, 1016 through which extends a circular ring 1017.

Each of the members 1011 is secured to a link 1018, the opposite end of the latter being pivotally connected to a pair of intermediate links 1019, 1020 arranged in alternate relation with respect to links 1018 so as to form therewith said continuous conveyor chain 999. Rings 1017 are alternately secured to the upper ends of a series of cables 1021 whereas the other rings 1017 are secured to the upper ends of another series of cables 1022 alternating with cables 1021.

As shown in Fig. 60, each of the weights 1023 is in the form of a flat plate of substantially rectangular shape in cross-section and is provided with a series of slots 1024, 1025, 1026 extending therethrough from one edge 1027 thereof. The slots provide openings through which the molten metal may be poured by pouring device 91 into the mold impressions formed in flask sections 83, 83a. A pair of eye-bolts 1028, 1029 are secured adjacent the forward edge 1030 of each weight 1023 and a single eye-bolt 1031 is secured adjacent the rear edge 1032. A cable 1033 is secured at its opposite ends to eye-bolts 1028, 1029 and is looped through a ring 1034 secured to the lower end of each cable 1022. The lower end of each cable 1021 is secured to the single eye-bolt 1031. It will thus be seen that the series of weights 1023 are hung from conveyor chain 999.

Conveyor chain 999 with weight 1023 suspended therefrom is moved along rail member 993 in short intermittent movements corresponding to the movements of main conveyor 81 in the following manner. As seen best in Fig. 57, each of the cars 82 of main conveyor 81 is provided with a downwardly-extending member 1035 adapted to engage a respective one of a series of upwardly projecting lugs 1036 which are secured to a continuous drive chain 1037. The latter extends around a pair of sprocket wheels 1038, 1039 secured to rotatably mounted shafts 1040, 1041. When main conveyor 81 moves forwardly a predetermined distance for one of its intermittent index movements, it will move drive chain 1037 therewith for the same distance and at the same time.

Shaft 1041 is rotatably mounted in bearings 1042, 1043 and its opposite end is provided with a sprocket wheel 1044 secured thereto. The latter is engaged by a chain 1045 which extends around another sprocket wheel 1046 fixedly secured to one end of a shaft 1047 rotatably mounted to a bearing 1048. The opposite end of shaft 1047 has secured thereto a bevel gear 1049 engaging another bevel gear 1050 secured to a vertical rotatable shaft 1051. The latter is provided at its lower end with a large sprocket wheel 1052 in engagement with the links of chain 999. It will thus be seen that the movement of main conveyor 81 is transmitted through chain drive 1037, sprocket wheel 1039, shaft 1041, sprocket wheel 1044, chain 1045, sprocket wheel 1046, shaft 1047, bevel gears 1049 and 1050, to the large sprocket wheel 1052 which moves conveyor chain 999 along rail member 993 directly over and in synchronized relation to conveyor 81.

As shown in Fig. 62, rail member 993 extends along a lower level at 993' and then rises upwardly at 993" so as to run along a higher level at 993'". The weights 1023 suspended along the lower level 993' are at a proper height to rest directly upon the upper cope section 83a and force the latter downwardly against the lower drag section 83 whereas the weights suspended from the upper level 993'" are at a height spaced above the cope section 83a therebeneath. Weights 1023 are thus lowered onto cope sections 83a as the flask sections are carried by conveyor 81 from conveyor portion 81d along conveyor portion 81e toward the pouring device 81 and then are maintained on the flask sections as the latter are carried around conveyor portions 81f, 81g when they are again raised upwardly therefrom towards the end of conveyor portion 81g so as to permit the flask sections 83, 83a filled with the molten casting metal to continue on along conveyor portion 81a.

The weights 1023 press cope sections 83a downwardly against the pressure of the molten metal poured into the mold cavities formed in the molding sand and maintain sections 83, 83a in tight abutting relation. The molten casting metal cools as the flask sections 83, 83a are carried along conveyor portion 81a toward the punch-out device 94 and then the above-described cycle of operations of the entire apparatus may be repeated.

It will be understood that all the above-described operations of the various devices occur simultaneously on different flask sections. That is, while a pair of flask sections are having molten metal poured therein by pouring device 91, another pair of flask sections are being subjected to the action of the punch-out device 94 while still another pair are subjected to the action of the unstacker device 98, and so forth. There is either a cope section 83a, or a drag section 83, or both, on every one of the conveyor cars 82 except for the period when the cars 82 travel along conveyor portions 81b, 81c from punch-out device 94 to the full drag rollover device 85.

The automatic electrical control system

Figure 66:
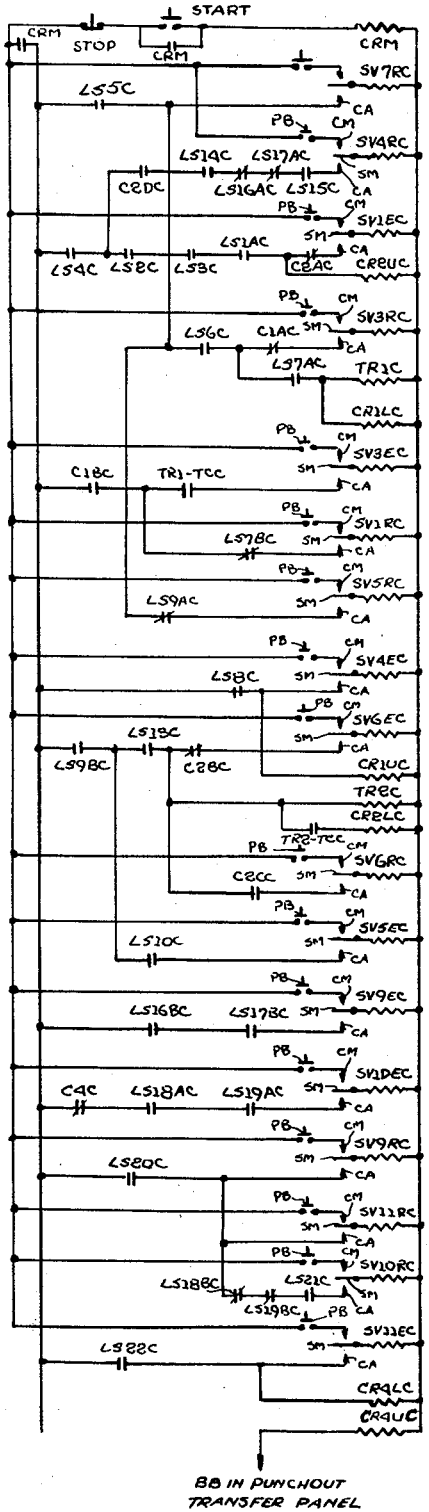

Referring now to Figs. 65 and 66, the automatic electrical control system which coordinates the operation of the various devices of the subject apparatus in properly timed sequence will now be described. The schematic wiring diagrams shown in these figures employ conventional symbols and reference designations for the various control relays, contacts, solenoid valves, and other components. Those components which form part of the cope line are given reference designations having the letter "C" at the end thereof whereas those components in the drag line end with the letter "D." The components in the portion of the apparatus through which both the drag and cope sections travel have reference designations ending with the letter "T."

The control relays are designated with the letters "CR" and the contacts or switches controlled by these relays are designated with the letter "C." If these contacts are of the normally-open type which are closed by energization of the corresponding control relay, the contacts are indicated by a symbol consisting of two parallel vertical lines. If the contacts are of the normally-closed type which are opened when the corresponding control relay is energized, a diagonal line extends through the vertical parallel lines.

The contacts or switches are given reference numerals corresponding to their respective control relays. That is, all of the contacts actuated by control relay CR2, for example, are given the reference designation C2 followed by a capital letter such as A, B, C or D, etc., to differentiate between the various sets of contacts controlled by a single control relay. Most of the control relays are of the type which latch and unlatch. That is, when one particular coil of the relay is energized all of the normally-open sets of contacts controlled thereby will be closed and will remain closed until the unlatch coil of that control relay is energized. In the same manner, when the latch coil of the relay is energized all of the normally-closed sets of contacts will be opened and will remain open until the unlatch coil is energized.

The various limit switches are designated by the reference letters LS followed by a number to differentiate between the various limit switches. Where a single limit switch has several sets of contacts, each set is differentiated from the others by reference letters such as A, B, C, etc.

The various solenoid-actuated valves which control the flow of air or other fluid medium to the several air cylinders and hydromotors are designated by the reference letters SV. With a few exceptions, these solenoid valves are of the type having a first coil which when energized will move the valve to a position to supply the fluid medium to the respective cylinder to move the piston of the latter toward either its extended or retracted position and will remain in said position for the complete stroke of the piston within the cylinder. The solenoid valve will not move to the opposite position to move the piston in the opposite direction until a second coil of the solenoid valve is energized. In other words, most of the solenoid valves are provided with two coils, one of which when energized will move the piston within the cylinder through a complete stroke to the extended position and the other coil when energized moving the piston to the retracted position.

The coils of each solenoid valve are differentiated from each other by the reference letters E and R, the former referring to the coil which moves the piston to the extended position and the latter referring to the coil which moves the piston in the opposite direction to the retracted position. For example, in Fig. 66, the two coils SV1EC and SV1RC correspond to the solenoid valve which controls cylinder 1MC of the cope line.

In describing the automatic electrical control system, reference is first made to the left-hand column of the schematic wiring diagram shown in Fig. 65 and beginning at the top of said column. Assuming that a full flask comprising drag section 83 and cope section 83a in superimposed relation thereto on a car 82 of conveyor 81 is filled with the solidified casting metal which has cooled by the time the full flask is at the transfer station 93 shown in Fig. 1, cylinder 3T of punch-out device 94 will be in a retracted position, the pair of cylinders 2T will be in a retracted position so that punch-out plates 386, 387, 388 will be raised, and cylinder 1T will be in the extended position.

The letters CRM (Fig. 65) is a relay whose sole purpose is to connect and disconnect power supply for the automatic control device. LS1T is a limit switch which is closed by the full flask on the mold conveyor as it arrives at the transfer station to the mold punch-out and it initiates the punch-out and transfer cycle. The normally-open limit switches LS5T and LS4T are closed.

These limit switches LS5T, LS4T and LS1T are in series with the solenoid valve coil SV1RT whereby the latter will be energized to cause cylinder 1T to move the flask at transfer station 93 from conveyor car 82 to the punch-out device 94.

When the flask enters the punch-out device 94, limit switch LS1T is opened to interrupt the energizing circuit for SV1RT. The normally-open contacts LS3BT of limit switch LS3T are closed at the same time by actuation of limit switch LS3T so as to establish an energizing circuit to SV1ET through limit switches LS5T, LS4T, LS3BT. When SV1ET is energized, cylinder 1T is caused to make a return stroke toward its initial extended position. The same circuit also energizes SV2ET to cause the pair of cylinders 2T to move their respective pistons downwardly and thereby urge punch-out plates 386, 387, 388 downwardly to punch out the castings and molding sand from the flask sections 83, 83a.

When cylinders 2T are thus extended, limit switch LS4AT is closed by engagement with detent 393 so as to establish an energizing circuit through control relay CR1LT. The latter is a latching relay which closes the normally-open contacts C1AT to establish an energizing circuit through LS4AT, C1AT to the solenoid valve coil SV2RT thereby causing cylinders 2T to move punch-out plates 386, 387, 388 upwardly. When cylinders 2T were first actuated to move their respective pistons downwardly, limit switch LS4T was opened.

The normally-opened contacts C1BT are now closed because latching relay CR1LT has been energized so that when the pistons of cylinders 2T again reach the upper limits of their stroke and limit switch LS4T is again closed, an energizing circuit is established to SV3ET causing cylinder 3T to move the empty flask from punch-out device 94 to the unstacker device 98 shown in Figs. 13 and 14. At this time the normally-open contacts LS7AT of limit switch LS7 are closed because the unstacker 98 is in its intermediate position and limit switch contacts LS5T are also closed because cylinder 3T is in its normal position. The unlatching coil CR17UT is thus energized to reestablish the main conveyor index circuit as shown in Fig. 64.

As soon as cylinder 3T moves from its retracted position, it opens contacts LS5T to open the energizing circuit for SV3ET and also to open the circuit for the relay unlatch coil CR17UT. When cylinder 3T attains its extended position to move the flask from punch-out device 94 to the unstacker device 98, the member 392 engages limit switch LS6T to close the normally-opened contacts LS6AT and to open the normally-closed contacts LS6BT. The contacts LS6AT thus establish an energizing circuit through the unlatched relay coil CR1UT thereby allowing the normally-closed contacts C1CT to close to establish an energizing circuit through the latch relay coil CR2LT.

Energization of the latter closes the normally-opened contacts C2AT in series with LS6AT and C1CT to establish an energizing circuit to SV3RT which returns the member 392 of cylinder 3T from its extended position at the unstacker device 98 back to its normal retracted position shown in Fig. 8. In this latter position the normally-closed contacts LS6BT are closed since limit switch LS6T is no longer engaged. Contacts C2BT are closed by the latching of relay CR2T. The normally-closed contacts C3AT are closed since relay CR3LT has not yet been operated. Thus an energizing circuit is established to solenoid valve coil SV4RT to cause cylinder 4T of unstacker device 98 to move the unstacker structure 431 upwardly and thereby lift cope section 83a upwardly off of drag section 83.

When the piston of cylinder 4T reaches the top of its upward stroke and the unstacker structure 431 is in its uppermost position, limit switch LS8T is closed. Contacts C3BT and C6AT are in their normally-closed position because control relays CR3LT and CR6LT have not yet been energized. An energizing circuit through LS8T, C3BT, and C6AT is thus established to solenoid valve coil SV5RT which actuates cylinder 5T to move the drag section 83 from the unstacker device 98 to the empty drag rollover device 99.

When the dog 444 on the end of piston rod 435 of cylinder 5T is in the retracted position at the rollover device 99, limit switch LS9T is thereby closed to establish an energizing circuit to the unlatching relay coil CR2UT to close the normally-closed contacts C2CT and thus energize the latching relay coil CR3LT. The normally-open contacts C3CT in series with limit switch LS9T are thereby closed to energize the solenoid valve coil SV5ET to thereby actuate cylinder 5T to move its piston toward the extended position at the unstacker device 98.

When cylinder 5T arrives at the rollover with the drag, a relay CR11LT is latched through LS9T and relay contact C3CT. A circuit is now made through LS13T, contacts CR11AT, LS12AT to SV6RT. The drag, however is not rolled over until the drag is completely in the rollover machine and LS12AT is released and its contact closed. Relay CR11UT is then unlatched as the rollover operation is nearing completion.

The normally-opened contacts C3DT were closed by the energization of latching relay coil CR3LT. Limit switch LS11T is closed as long as cylinder 5T is in its extended position with its dog 444 at the unstacker device 98. The normally-closed limit switch LS10T remains closed until cylinder 4T completes its downward stroke. An energizing circuit is thus established through LS11T, C3DT, and LS10T to solenoid valve coil SV4ET thereby causing a piston of cylinder 4T to move downwardly and set the cope section 83a on the rollers 407, 408 of the conveyor structure therebeneath.

As the rollover device 99 nears the end of its rollover movement, it momentarily closes limit switch LS14T to energize unlatching relay CR11UT. This unlatching opens contacts CR11AT and deenergize SV6RT and to establish an energizing circuit through solenoid valve coil SV7ET thereby causing the piston of cylinder 7T to move toward its extended position so as to move the dog 550 from vibrator device 100 to the rollover device 99. When cylinder 7T reaches its fully extended position, limit switch LS15T is closed. The normally-closed contacts C6CT are also closed at this time since latch relay coil CR6LT has not yet been energized. An energizing circuit is thus established through LS15T, LS24, LS12C, LS12D, and C6CT to energize latch relay coil CR4LT thereby closing the normally-open contact C4AT, C4BT and opening the normally-closed contacts C4CT.

In series with switch LS15T is switch LS24T adapted to be closed when the stops of cylinder 81 is in the upper clear position and is a safety interlock with cylinder #5 and cylinder #7 of the punch out transfer line so that the flasks will not be indexed until the stops are clear to flask passage through the drag elevator.

Switches LS12D and LS12C are closed by the drag elevator and cope elevator at the bottom of their strokes. These switches are also in series with LS15T, LS24 and hence serve as a safety interlock so that the flasks will not index unless the elevators are both lowered.

When the drag 83 is completely inverted by the rollover device 99, limit switch LS16T is closed to establish an energizing circuit through LS15T and LS16T to energize solenoid valve coil SV7RT, thereby causing cylinder 7T to move the drag 83 from the rollover device 99 to the vibrator device 100. The same circuit energizes control relay CR5T to close the normally-open contacts C5T and thereby establishes an energizing circuit through C5T, C6AT to solenoid valve coil SV5RT. When the latter is energized cylinder 5T is actuated toward its retracted position to move cope section 83a from the unstacker device 98 to the rollover device 99, the latter being at rest in its rolled over position.

When the piston of cylinder 7T is in its retracted position and the drag section 83 arrives at the vibrator device 100, limit switch contacts LS17AT are closed and the normally-open contacts C4AT in series therewith are also closed by the previous energization of control relay CR4LT. An energizing circuit is thus established through LS14AT and C4AT to solenoid valve coil SV7ET to cause cylinder 7T to be actuated so as to move its piston toward the extended position in a second stroke from vibrator device 100 to the rollover device 99. Closing of LS17AT also establishes an energizing circuit through contacts C4BT to energize latch relay coil CR6LT thereby opening the normally-closed sets of contacts C6AT, C6BT, C6CT, C6DT and closing the normally-open contacts C6ET.

When the dog 550 of cylinder 7T again arrives at the rollover device 99, it recloses limit switch LS15T to again establish an energizing circuit through LS15T, LS16T to the solenoid valve coil SV7RT to cause the latter to move the piston of cylinder 7T toward its retracted position and thereby take the cope section 83a from the rollover device 99 to the vibrator device 100. As the cope section 83a is thus moved, it abuts against the whole line of flask sections 83, 83a ahead of it so as to move said flask sections therewith a distance equal to the full stroke of cylinder 7T.

In series with limit switch LS15T are a pair of limit switches LS12C and LS12D which are closed by engagement with the respective platform of the cope and drag elevators when the platforms are at their lowermost positions. It will thus be seen that solenoid valve coil SV7RT may be energized to retract the piston of cylinder 7T and move the line of flask sections forwardly only when both elevator platforms are down in a position to receive a pair of the flask sections, thereby providing a safety device in addition to the mechanical indexing arrangement shown in Figs. 26 and 27.

When the energizing circuit was established to SV7RT to take cope section 83a from rollover device 99 to the vibrator device 100, control relay CR5T was also energized to close the normally-open contacts C5T. However, the normally-closed contacts C6AT were opened by the previous energization of latch relay coil CR6LT and hence no energized circuit is established to solenoid valve coil SV5RT and cylinder 5T is thus prevented from making any additional strokes or movements.

As cylinder 7T moves cope section 83a from rollover device 99 to the vibrator device 100, limit switch LS18T is momentarily closed to complete an energizing circuit through contacts C6ET to energize the unlatch relay coil CR4UT. When the latter is energized, contacts C4CT resume their normally-closed position to establish an energizing circuit through LS17AT, C4CT, C6DT to the solenoid valve coil SV6ET thereby causing rollover device 99 to return to its initial position ready to receive the next succeeding drag section 83. As rollover device 99 returns to said initial position, limit switch LS19T is momentarily closed to establish an energizing circuit through the unlatch relay coils CR3UT and CR6UT.

Each time the piston of cylinder 7T moves from its retracted position toward its extended position to release limit switch LS17AT, the normally-closed contacts LS17BT of the latter assume their closed position so as to establish an energizing circuit through the coil of time relay TR1T and also through the normally-closed time-opening contacts TR1—TOT of the latter. The control relay CR7T in series with normally-closed contacts C9AT and TR1—TOT is thus energized to close the normally-open contacts C7AT, thereby establishing an energizing circuit through LS17BT and C7AT to energize the solenoid valve coil SV8ET causing cylinder 8T to clamp the flask section 83 or 83a against vibrator device 100 and to set the latter in its vibrating action.

After a predetermined time interval, contacts TR1—TOT open so as to deenergize control relay CR7T and thereby open contacts C7AT and close contacts C7BT to deenergize solenoid valve SV8ET and energize SV8RT and thereby cause cylinder 8T to retract and vibrator 100 to stop vibrating. If cylinder 7T reaches its extended position at the rollover device 99 before time-opening contacts TR1—TOT are opened, limit switch LS15T will be closed to establish an energizing circuit therethrough to control relay CR9T and thereby open the normally-closed contacts C9AT and deenergize CR7T. When the latter is deenergized, contacts C7AT will be opened to stop the vibrating action and cause cylinder 8T to release the flask section 83 or 83a. That is, solenoid valve coil SV8ET will be deenergized by the opening of time relay contacts TR1—TOT or by cylinder 7T reaching the rollover device 99, whichever occurs first.

Vibrator device 100 and cylinder 8T are both supplied by air from the same valve outlet, so that when cylinder 8T starts to extend to clamp the flask section against vibrator device 100, the latter starts operating at the same time. The arrangement is such that when cylinder 8T starts to retract, vibrator device 100 stops vibrating, as is well-known to those skilled in the art.

Hand operation may be effected by appropriately closing the manual push button switches shown in Fig. 65 of the drawing. The system may be switched from automatic to hand operation by a suitable "Hand-Off"-"automatic" switch.

*The drag line portion of the control system*

Referring now to the wiring diagram shown in the right hand column of Fig. 65, there will now be described that portion of the electrical system which automatically controls the various devices in the drag line of the apparatus such as the draw frame 841, squeeze table 832 and squeeze car 791 of the drag molding machine 84, and also measuring box 682 of sand measuring device 680.

When draw frame 841 is at its intermediate position, limit switch LS4D will be closed. Squeeze table 832 closes limit switch LS2AD at the bottom of its travel. Limit switch LS3D is closed when the platform of drag elevator 645 is in its uppermost position. The normally-open contacts LS1AD of limit switch LS1D are closed when squeeze car 791 is in its outer position over drag elevator 645. An energizing circuit is thus established through LS4D, LS2AD, LS1AD to the unlatch relay coil CR2UD. When the latter is energized, the normally-closed contacts C2AD assume their closed position so as to establish an energizing circuit to solenoid valve coil SV1ED, thereby actuating cylinder 1MD to move measuring box 682 inwardly from its position over drag elevator 645 to a position over the squeeze table 832.

When measuring box 682 is in this latter position, it closes limit switch LS5D to complete an energizing circuit to solenoid valve coil SV7RD. The valve controlled by the latter is a two-way spring-closed valve device which is thus actuated to exhaust air from cylinders 7MD to cause draw frame 841 to move down. When draw frame 841 moves all the way down, it closes limit switch LS6D. The normally-closed contacts C1AD in series with the latter are closed since control relay CR1LD has not yet been energized. An energizing circuit is thus established through LS5D, LS6D, C1AD to solenoid valve coil SV3RD which actuates cylinder 3MD to open the gate members 742 of measuring box 682 and thereby dump the measured amount of molding sand into drag section 83.

When gate members 742 are thus opened, limit switch LS7AD is thereby closed to establish a circuit through LS5D, LS6D, LS7D to energize latch relay coil CR1LD and also to time relay TR1D. Latching of CR1LD closes the normally-open contacts C1BD and the time-closing normally-open contact TR1—TCD are closed after a predetermined time delay following the energization of time relay TR1D. An energizing circuit is thus established through C1BD, TR1—TCD to solenoid valve coil SV3ED to actuate cylinder 3MD and thereby close gate members 742.

As the latter close, limit switch LS7D is disengaged to allow the normally-closed contacts LS7BD thereof to close and establish an energizing circuit through C1BD and LS7BD to solenoid valve coil SV1RD. When the latter is energized, cylinder 1MD is actuated toward its retracted position to move measuring box 682 toward its outward position over drag elevator 645.

When measuring box 682 is still in its inward position over the squeeze table 832, the normally-closed contacts LS9AD of limit switch LS9D are closed to establish an energizing circuit through LS5D, LS9AD to solenoid valve coil SV5RD. When the latter is energized, cylinder 5MD of drag elevator 645 is actuated toward its retracted position to lower the platform of drag elevator 645 to its lowermost position for receiving the next drag section 83.

As the measuring box 682 returns to its position over drag elevator 645 from its position over squeeze table 832, it momentarily closes limit switch LS8D to complete an energizing circuit to solenoid valve coil SV4ED thereby actuating cylinder 4MD to bring squeeze car 791 inwardly over squeeze table 832. Limit switch LS8D also establishes an energizing circuit to the unlatch relay coil CR1UD. When the latter is energized, contacts C1AD assume their normally-closed position and contacts C1BD assume their normally-open position.

The normally-open contacts LS9BD of limit switch LS9D are closed when measuring box 682 reaches its outer position over drag elevator 645. Limit switch LS13D is closed when squeeze car 791 is over squeeze table 832. A circuit is thus established through LS9BD, LS13D, C2BD to energize solenoid valve coil SV6ED. The latter actuates cylinders 6MD to raise squeeze table 832 and draw frame 841 therewith to squeeze and ram the molding sand within the drag section 83 against the squeeze plate 799 of squeeze car 791.

An energizing circuit is also established through LS9BD, LS13D to time relay TR2D which closes contacts TR2—TCD after a predetermined time interval of approximately three seconds. When these time closing contacts TR2—TCD are closed, latch relay coil CR2LD is energized to open the normally-closed contacts C2BD and close the normally-open contacts C2CD and C2DD. An energizing circuit through LS9BD, LS13D, C2CD is thus established to solenoid valve coil SV6RD which exhausts the air from cylinders 6MD to move squeeze table 832 downwardly to its lowermost position.

After draw frame 841 is in its uppermost position and squeeze table 832 starts to move downwardly, draw frame 841 will drop by gravity to its intermediate position and will remain there. The drag section 83 which has been filled with molding sand and rammed is thus ready to be sent to the next station by the strike-off member 821 of squeeze car 791. At this time LS9BD is closed since measuring box 682 is in its outer position and limit switch LS10D is closed by the next succeeding drag section 83 in the drag elevator 645, the latter being in its lowermost position. An energizing circuit is thus made through LS9D, LS10D to solenoid valve coil SV5ED to actuate cylinder 5MD and cause the platform of drag elevator 645 to rise with the next succeeding drag section 83.

When draw frame 841 is at its intermediate position, limit switch LS4D is closed. Contacts C2DD are closed since latch relay coil CR2LD was previously energized. As squeeze table 832 moves downwardly, it momentarily closes limit switch LS14D near the bottom of its downward stroke. Limit switch LS15D is closed by the full drag rollover device 85 being in its normal position ready to receive a drag section 83. The normally-closed limit switches LS16AD and LS17AD are closed as long as rollover device 85 is empty and will not open until a drag section 83 is in properly aligned position on rollers 882 of rollover device 885.

An energizing circuit is thus established through LS4D, C2DD, LS14D, LS16AD, LS17AD, LS15D to solenoid valve coil SV4RD. When the latter is energized, cylinder 4MD is actuated to cause squeeze car 791 to move outwardly so that its strike-off member 821 pulls the drag section 83 from the draw frame rollers 852 toward the rollers 882 of the full drag rollover device 85. Momentum carries the drag section 83 the rest of the distance onto the rollers 882 of rollover device 85.

When the drag section 83 is in properly aligned position on rollers 882, the normally-open contacts LS16BD, LS17BD of limit switches LS16D, LS17D are closed to complete an energizing circuit to solenoid valve coil SV9ED. Cylinder 9MD of rollover device 85 is thus actuated to pivot clamp members 899, 901 toward their vertical clamping positions in engagement with the ribs 114, 115 extending along the sides of drag section 83. When clamp members 899, 901 are thus closed, limit switch LS18D is closed and an energizing circuit through normally-closed contacts C3AD and LS18D is established to solenoid valve coil SV10ED.

Energization of the latter actuates hydromotor 883 to cause rollover device 85 to assume the position indicated in dash-dot lines in Fig. 45, thereby inverting drag section 83 and placing the latter onto a car 82 of the main conveyor 81. When the rollover operation has been completed, limit switch LS19D is closed to complete an energizing circuit to solenoid valve coil SV9RD which actuates cylinder 9MD to release clamp members 899, 901 from the drag section 83 indicated at 83' in its inverted position in Fig. 45.

When clamp members 899, 901 are released, limit switch LS20D is closed to complete an energizing circuit through solenoid valve coil SV10RD which actuates hydromotor 883 to move the rollover device back to its original position. During this return movement of the rollover device 85, limit switch LS21D is momentarily closed to complete an energizing circuit through the latch relay coil CR3LD. Energization of the latter closes the normally-open contacts CR3 in the index circuit of the electrical control system shown in Fig. 64 for controlling the drive mechanism of main conveyor 81. The latter makes an index movement only when contacts CR3 of the drag rollover device 85 are closed, contacts CR4 of the cope closer 88 are closed, and contacts CR17 of the mold punch-out device are closed.

As explained above, the normally open contact CRX of Fig. 64 is controlled by the latching coil CRXL (Fig. 65) of the punch out transfer circuit and the limit switch LS27 (Fig. 65, left side) is closed during passage of a pallet during an index of the conveyor (Fig. 1). Said limit switch LS27 as stated has the function of unlatching relay CRXU (Fig. 65, left side). The normally open contact CR7 remains open if relay CRXL has not latched.

The unlatch circuit to contact CR3UD (Fig. 65, left side) is such that the unlatching impulse is received from contacts CR7 of Fig. 64 through contact CRXU.

Relay CR17UT of the punch-out transfer line is unlatched when cylinder 3T extends, fully closing limit switch LS6AT and completing the circuit to the unlatch coil CR17UT. This motion clears the index circuit of the mold conveyor for a further index.

The normally closed contact CRX (Fig. 65, left side) is in the latch circuit of relay CR17LT in series with the normally open contact CR7 of the electrical control system for the drive mechanism. Thus, relay CR7L (Fig. 64) latches closing contact CR7 near the end of the index of pallet at which time normally open contact CRX is closed as relay CRXU is unlatched during the motion of the conveyor. At this time relay CR17LT latches, setting up a block to further indexing operation until relay CR17UT is unlatched.

The normally closed contact CRX and the normally open contact CR7 are connected in parallel also to the unlatch circuits of relay CR3UD (Fig. 65, right side) of the drag circuit and relay CR4UC of the cope circuit (Fig. 66). The unlatching of these relays CR3UD and CR4UC stops further indexing movements of the mold conveyor until they are latched by completion of the drag rollover or cope closing movements.

The latch coil CRXL is in series with contacts CR3UD and CR4UC (Fig. 65, left side) and normally closed contact CR17. These contacts are closed when the drag rollover, cope closer, and transfer to unstacker have completed their operations. The latching of coil CRXL at this time closes the normally open contact CRX which is in the unlatching circuit of relay CR7U of the drive control system (Fig. 64) and serves as an interlock therefor. Unless coil CRXL latches at the completion of the actions of the drag rollover, cope closing and transfer to unstacker, the coil CR7U will not unlatch, the unlatching of this coil CR7U closes contact CR7D in the circuit of the solenoid SAV1 (Fig. 64) which causes the conveyor to move.

At that time, CR14A should be closed, but it may not be closed if CRXL has not yet been latched, since the energizing circuit to CR14 passes through the open contacts to latch relay CRXL. However at this time contact CR7 is still closed and will energize contact CR13 at the time that CR11B is closed. This operation assures that relays CR4U and CR7U are unlatched before relay CR13 is dropped out.

At the end of an index movement of main conveyor 81, the energization of unlatch relay coil CR3UD allows normally-closed contacts C3AD to close and thereby set up a circuit for another rollover operation for the next succeeding drag 83. It is not possible to begin the rollover operation unless main conveyor 81 is stationary and has already completed an indexing movement.

*The cope line portion of the control system*

Referring now to Fig. 66, the portion of the electrical system which automatically controls the various devices in the cope line will now be described. Limit switch LS4C is closed when draw frame 841 of the cope molding machine 86 reaches its intermediate position. Limit switch LS2C is closed when squeeze table 832 is at its lowermost position. Limit switch LS3C is closed when the platform of the cope elevator 647 is at its uppermost position in a common horizontal plane with draw frame 841. Limit switch LS1AC is closed by squeeze car 791 being in its outer position over elevator 647. An energizing circuit is thus established through LS4C, LS2C, LS3C and LS1AC to the unlatch relay coil CR2UC.

When the latter is energized, the normally-closed contacts C2AC are allowed to close to complete an energizing circuit to solenoid valve coil SV1EC. Energization of the latter actuates cylinder 1MC to move measuring box 682 inwardly to carry cope section 83a over squeeze table 832. As a result of this inward movement of measuring box 682, limit switch LS5C is closed to establish an energizing circuit to solenoid valve coil SV7RC so as to actuate cylinders 7MC to move draw frame 841 downwardly to its lowermost position.

When draw frame 841 reaches said lowermost position, it closes limit switch LS6C. In series with the latter is a normally-closed pair of contacts C1AC which are closed since latch relay CR1LC has not yet been energized. A circuit is established through LS5C, LS6C, C1AC to energize solenoid valve coil SV3RC and thereby actuate cylinder 3MC to open the gate members 742 of measuring box 682 of cope molding machine 86.

When gate members 742 are open, the molding sand drops down into cope section 83a and limit switch LS7C is actuated to close the normally-open contacts LS7AC and to open the normally-closed contacts LS7BC. An energizing circuit is thus established through LS5C, LS6C and LS7AC to time relay TR1C and also to latch relay coil CR1LC. The normally-open contacts C1BC are thus closed by energization of CR1LC and the normally-open time-closing contacts TR1—TCC are closed after a predetermined time interval to establish an energizing circuit to solenoid valve coil SV3EC, thereby actuating cylinder 3MC to close the measuring box gate members 742.

As gate members 742 close, limit switch LS7C is released thereby closing LS7BC and opening LS7AC. This establishes a circuit through C1BC and LS7BC to energize solenoid valve coil SV1RC to actuate cylinder 1MC and thereby move measuring box 682 back to its normal position over cope elevator 647.

While measuring box 682 was in its inner position over squeeze table 832, limit switch LS5C was closed and the normally-closed contacts LS9AC of limit switch LS9C were also closed. An energizing circuit is thus established through LS5C and LS9C to energize solenoid valve coil SV5RC causing the platform of cope elevator 647 to move downwardly toward its lowermost position so as to be ready to receive the next succeeding cope section 83a. As measuring box 682 returns to its position over cope elevator 647, it momentarily closes limit switch LS8C to establish an energizing circuit to solenoid valve coil SV4EC causing the squeeze car 791 to move into position over squeeze table 832 as measuring box 682 moves outwardly.

During this movement of squeeze car 791, strike-off bar 821 removes the excess molding sand from cope section 83a. Limit switch LS8C also establishes an energizing circuit to unlatch relay coil CR1UC. Energization of the latter closes the normally-closed contacts C1AC so as to be ready for the next cycle and opens the normally-open contacts C1BC to break the energizing circuit to solenoid valve coil SV3EC. Opening of contacts C1BC also breaks the energizing circuit to SV1RC until the next cycle.

When measuring box 682 reaches the end of its return stroke and assumes its initial position over cope elevator 647, limit switch LS9C is actuated to close the normally-open contacts LS9BC and to open the normally-closed contacts LS9AC. The opening of LS9AC interrupts the energizing circuit to SV5RC thereby isolating the circuit which moves cope elevator 647 downwardly until the next cycle. Since LS9BC is closed and limit switch LS13C is closed by the squeeze car 791 being in its inner position over squeeze table 832, and contacts C2BC are closed since latch relay coil CR2LC has not yet been energized, a circuit is established to solenoid valve coil SV6EC which actuates cylinders 6MC to cause squeeze table 832 and draw frame 841 to move upwardly to their uppermost positions, thereby ramming the molding sand within cope section 83a against the squeeze plate 799 of squeeze car 791.

At the same time a circuit is established through LS9BC and LS13C to time relay TR2C which, after a predetermined time interval, closes the normally-open contacts TR2-TCC. This controls the duration of the ramming period since when contacts TR2-TCC are closed, latch relay coil CR2LC is energized to open the normally-closed contacts C2BC and thereby deenergize SV6EC. Squeeze table 832 and draw frame 841 are thus lowered, squeeze table 832 going all the way down to its lowermost position and draw frame 841 stopping at its intermediate position. This withdraws the pattern plates 138 from cope section 83a as they are secured within the dish plate 129 fixedly mounted on the squeeze table 832.

During the preceding time interval, the next succeeding cope section 83a has entered the elevator 647 to close limit switch LS10C. A circuit is thus made through LS9BC and LS10C to energize solenoid valve coil SV5EC thereby actuating cylinder 5MC to move the platform 675 of cope elevator 647 upwardly to its uppermost position in a common horizontal plane with draw frame 841. Limit switch LS14C is closed by squeeze table 832 momentarily during the downward movement of the latter. Normally-closed contacts LS16AC of limit switch LS16C and normally-closed contacts LS17AC of limit switch LS17C are closed when there is no cope section 83a in the cope closer device 88. Limit switch LS15C is closed when clamp members 943, 944 of cope closer device 88 are set in the vertical position ready to receive a cope section 83a.

An energizing circuit is thus established through LS4C, C2DC, LS14C, LS16AC, LS17AC and LS15C to solenoid valve coil SV4RC, thereby actuating cylinder 4MC to cause squeeze car 791 to move outwardly and thereby pulling cope section 83a into the cope closer device 88. The strike off member 821 engages cope section 83a to pull it along with squeeze car 791 during this outward movement of the latter.

When cope section 83a arrives onto rollers 957, 958 of the cope closer device 88, it actuates limit switches LS16C, LS17C to close the normally-open contacts LS16BC, LS17BC of the latter thereby completing an energizing circuit to solenoid valve coil SV9EC. Energization of the latter actuates cylinder 9MC to lower the alignment pins 959, 960 thereby accurately positioning cope section 83a with respect to the corresponding drag section 83 therebeneath. When alignment pins 959, 960 are in their lowermost position, limit switches LS18C and LS19C are actuated to close their normally-open contacts LS18AC, LS19AC respectively, thereby establishing an energizing circuit to solenoid valve coil SV10EC to actuate cylinder 10MC and lower the crosshead 934 of cope closer device 88.

The cope section 83a is thus lowered onto the drag section 83, the alignment pins 959, 960 entering the sleeves or apertures 113 provided in the lugs of drag section 83. When the cross-head 934 reaches the bottom of its downward stroke, it closes limit switch LS20C to complete an energizing circuit to solenoid valve coil SV9RC which actuates cylinders 9MC to raise alignment pins 959, 960 upwardly from the apertures or bushings 113 provided in the lugs 109, 112 of cope and drag sections 83, 83a. An energizing circuit through closed limit switch LS20C is also provided to solenoid valve coil SV11RC to actuate cylinder 11MC and thereby move clamp members 943, 944 outwardly so as to be disengaged from the cope section 83a.

When alignment pins 959, 960 are raised, limit switches LS18C and LS19C are disengaged to permit their normally-closed contacts LS18BC, LS19BC to close. Limit switch LS21C is also closed by opening of clamps 943 and 944 to complete an energizing circuit to solenoid valve coil SV10RC. Energization of the latter actuates cylinder 10MC to raise the cross-head 934. As crosshead 934 rises, it momentarily closes limit switch LS22C thereby completing an energizing circuit to solenoid valve coil SV11EC so as to actuate cylinder 11MC to close clamp members 943, 944 so as to be ready to receive the next succeeding cope section 83a.

Closing of limit switch LS22C also completes a circuit to latching relay coil CR4LC. As shown in Fig. 64, a pair of normally-open contacts indicated at CR4 are located in the indexing circuit of main conveyor 81 and are closed upon energization of CR4LC, thereby setting up the index circuit for the next index movement of main conveyor 81. If CR4LC is not latched, main conveyor 81 will not index. The latching of CR4LC also opens the normally-closed contacts C4C and prevents a second operation of cope closer device 88 until after an index movement of main conveyor 81 has been completed.

When relay coil CR4UC is energized as explained above contacts C4C will be allowed to close and cope closer device 88 may thus undergo another lowering operation for the next succeeding cope section 83a. The energization of unlatch relay coil CR4UC prevents a second movement of main conveyor 81 until the next cycle of operations of cope closer device 88 has caused energization of latch relay coil CR4LC. This is inevitable since limit switch LS22C is closed momentarily only as the platform of cope elevator 647 rises to its uppermost position on the next cycle of operations.

Limit switches LS22 and LS23 are in series with coil SV8IE and both said switches have to be closed for energizing said coil to extend the piston of cylinder 8I to bring the drag stop to stopping position for stopping the drag on the lowered drag elevator (see Fig. 65).

Limit switch LS24 is in series with limit switches LS12C and LS12D. Limit switch LS24 is closed when the piston of indexing cylinder 8I is in its down position bringing the stops to "clear." Limit switch LS24 is in series with both CR5T and CR7T and is a safety interlock with cylinders 5T and 7T of the punch-out transfer lock so that flasks will not be indexed until the stops are clear of the flask passage. Limit switches LS12D and LS12C are closed by the drag elevator and the cope elevator, respectively, at the bottom of their strokes. These are also safety interlocks so that the flasks will not index until the elevators are down and clear of the conveyor line. As shown in the wire diagram of Fig. 65 limit switch LS25 is in series with coil SV8IR. This limit switch is closed momentarily as the drag elevator returns to its down position to actuate indexing cylinder 8I to bring the stops to clearing position.

Manually-controlled non-automatic operation

The electrical control system described above may be manually controlled instead of operating automatically, if so desired. All of the solenoid valve coils, which actuate the various air cylinders and hydromotors when energized, are each connected to a respective one of a series of switch arms SM. The latter are movable to engage either one of two contacts CA and CM associated therewith.

When switch arms SM engage contacts CA, the solenoid valve coils will be connected so as to provide the automatic operation described above. However when switch arms SM are moved to engage contacts CM, the solenoid valve coils are each placed in series with a respective push-button switch PB which, when manually depressed, will establish an energizing circuit to the corresponding solenoid valve coil to actuate the cylinder or hydromotor associated therewith.

Except for SV4RT, SV4ET, SV7RD and SV7RC, all impulses to other solenoid coils may be momentary and need not be held until end of the respective strokes of their cylinders or hydromotors.

The sand distribution apparatus

Referring now to Figs. 1, 2, and 67 to 69 inclusive, the sand apparatus 102 for processing and distributing the molding sand will now be briefly described. As best seen in Fig. 2, when the molding sand is removed from flask sections 83, 83a by shakeout device 95, the sand falls to a vibrating conveyor 1060 and travels therealong in the direction of arrow 1061 so as to be deposited on the end of a shakeout conveyor belt 1062. The latter travels in the direction of arrow 1063 and conveys the sand over a magnetic pulley 1064 at the opposite end where metal scrap and other impurities are removed from the sand which is then raised by a shakeout elevator 1065 and discharged through a chute 1066 at the upper end thereof so as to pass through a rotary breaker screen 1067.

The sand is then conveyed by a belt 1068 moving in the direction of arrow 1069 to a pair of sand storage hoppers 1070. From the latter, an apron feeder belt 1071 conveys the sand to a pair of mullers 1072, 1073 from which the sand is conveyed by a muller belt conveyor 1074 moving in the direction of arrow 1075 to the lower end of a prepared sand elevator 1076. The latter raises the sand and discharges it through a chute 1077 into an aerator 1078 from which the sand is discharged onto a main distribution conveyor belt 1079 moving in the direction of arrow 1080.

At an intermediate portion of belt 1079 the major quantity of sand thereon is transferred to a cross conveyor belt 1081 moving in the direction of arrow 1082 as best seen in Fig. 1. The remaining quantity of sand on belt 1079 travels to the opposite end thereof and is discharged into an overflow hopper 1083 and then onto an overflow conveyor belt 1084 moving in the direction of arrow 1085. The opposite end of belt 1084 discharges the overflow sand onto a cross overflow belt 1086 which travels beneath cross belt 1081 and in the same direction as indicated by arrow 1082.

The opposite end of cross conveyor belt 1081 discharges the sand onto one end of a molding machine distribution belt 1087 which moves in the direction of arrow 1088 as shown in Fig. 1 so as to distribute the sand into the hoppers 681 of drag molding machine 84 and cope molding machine 86. The spill sand which overflows flask sections 83, 83a and is scraped off therefrom by the strikeoff members 821 drops into the spill sand hoppers 1089, 1090 located beneath molding machines 84 and 86 respectively.

This spill sand then drops onto a spill sand conveyor 1091 which moves in the direction of arrow 1092 as best seen in Fig. 2 so as to discharge the spilled sand onto the cross overflow conveyor belt 1086 adjacent the end thereof. The latter then conveys both the overflow sand and the spilled sand to a conveyor belt 1093 which moves in the direction of arrow 1094 as shown in Fig. 2 and discharges the overflow and spill sand onto vibrating conveyor 1060 where it mixes with the shakeout sand falling from shakeout machine 95. Vibrating conveyor 1060 then conveys this sand to shakeout conveyor 1062 and the above-described cycle of sand processing and distribution is repeated.

It is to be understood that the specific embodiment of the apparatus shown in the drawings and described in detail above is merely illustrative of one of the many forms which the invention may take in practice without departing from the scope of the invention as delineated in the appended claims. It is intended that the claims be interpreted as broadly as possible in view of the prior art and not be limited by the disclosure of this particular embodiment.

Having thus described my invention, I claim as new and desire to secure by Letters Patent:

1. A sand casting apparatus comprising means to support a horizontal flask comprising a cope section assembled on top of a drag section at an unstacker station, means to raise the cope section above the drag section at said unstacker station, means to move the drag section longitudinally forwardly to an empty drag roll-over station beyond the raised cope section, means to invert the advanced drag section, means to lower the raised cope section to the level of the advanced and inverted drag section, means to advance the inverted drag section from said roll-over station to a vibrator station, means to move the lowered cope section to said roll-over station, means to vibrate said drag section at said vibrator station to shake out sand clinging thereto, means to advance the drag section from said vibrator station to an index station, means to advance the cope section from said roll-over station to said vibrator station, means to vibrate the cope at said vibrator station, means to advance the cope section to the index station, means to advance the cope and drag sections, with the drag section behind the cope section, beyond the index station, a drag elevator beyond the index station, a cope elevator beyond the drag elevator, said drag elevator comprising means to raise the drag section, means to move the raised drag section at right angles to the direction of previous movement of the cope and drag sections to a drag molding station, a molding means at said drag molding station and having a pattern plate, said molding means having means to assemble the pattern plate with the underside of the drag section, means to pour sand into the upper open end of the drag section and over the pattern plate, means to compress the poured sand against the pattern plate, means to cause relative movement between the pattern plate and the sand-filled drag section to remove the pattern plate therefrom to a position below the drag section, means to move the drag section from the molding station to a filled drag station, a conveyor, means to reinvert the drag section so that it is right-side-up and place the drag section on said conveyor, said cope elevator having means to raise the cope section, means to move the raised cope section at right angles to said direction of previous movement to a cope molding station, a molding means at said cope molding station and having a pattern plate, means to assemble said last-mentioned pattern plate to the underside of the cope section, means to pour sand into the upper open end of the cope section to fill the same and cover the pattern plate thereunder, means to compress the sand against the pattern plate, means to disassemble the pattern plate from the cope section, means to move the cope section to a cope closer station in vertical alignment above said conveyor, said conveyor having means to move the filled drag section to a position beneath the cope section at said cope closer station, cope closing means for assembling the cope section in superimposed relation to the drag section to form a molding flask supported on said conveyor, means to place a weight on the supported flask, means to pour molten casting metal into the weighted flask, means to remove said weight from the flask after the pouring operation, said conveyor including means to move the flask filled with casting metal to a punch-out station, means at the punch-out station to punch out the castings and sand from the flask, and means to move the empty flask from the punch-out station to said unstacker station.

2. A sand casting apparatus comprising means to support a horizontal flask comprising a cope section assembled on top of a drag section at an unstacker station, means to raise the cope section above the drag section at said unstacker station, means to move the drag section longitudinally forwardly to an empty drag roll-over station beyond the raised cope section, means to invert the advanced drag section, means to lower the raised cope section to the level of the advanced and inverted drag section, means to advance the inverted drag section from said roll-over station to a vibrator station, means to move the lowered cope section to said roll-over station, means to vibrate said drag section at said vibrator station to shake out sand clinging thereto, means to advance the drag section from said vibrator station to an index station, means to advance the cope section from said roll-over station to said vibrator station, means to vibrate the cope at said vibrator station, means to advance the cope section to the index station, means to advance the cope and drag sections, with the drag section behind the cope section, beyond the index station, a drag elevator beyond the index station, a cope elevator beyond the drag elevator, said drag elevator comprising means to raise the drag section, means to move the raised drag section at right angles to the direction of previous movement of the cope and drag sections to a drag molding station, a molding means at said drag molding station and having a pattern plate, said molding means having means to assemble the pattern plate with the underside of the drag section, means to pour sand into the upper open end of the drag section and over the pattern plate, means to compress the poured sand against the pattern plate, means to cause relative movement between the pattern plate and the sand-filled drag section to remove the pattern plate therefrom to a position below the drag section, means to move the drag section from the molding station to a filled drag station, a conveyor, means to reinvert the drag section so that it is right-side-up and place the drag section on said conveyor, said cope elevator having means to raise the cope section, means to move the raised cope section at right angles to said direction of previous movement to a cope molding station, a molding means at said cope molding station and having a pattern plate, means to assemble said last-mentioned pattern plate to the underside of the cope section, means to pour sand into the upper open end of the cope section to fill the same and cover the pattern plate thereunder, means to compress the sand against the pattern plate, means to disassemble the pattern plate from the cope section, means to move the cope section to a cope closer station in vertical alignment above said conveyor, said conveyor having means to move the filled drag section to a position beneath the cope section at said cope closer station, and cope closing means for assembling the cope section in superimposed relation to the drag section to form a molding flask supported on said conveyor.

3. A sand casting apparatus comprising means to support a horizontal flask comprising a cope section assembled on top of a drag section at an unstacker station, means to raise the cope section above the drag section at said unstacker station, means to move the drag section longitudinally forwardly to an empty drag roll-over station beyond the raised cope section, means to invert the advanced drag section, means to lower the raised cope section to the level of the advanced and inverted drag section, means to advance the inverted drag section from said roll-over station to a vibrator station, means to move the lowered cope section to said roll-over station, means to vibrate said drag section at said vibrator station to shake out sand clinging thereto, means to advance the drag section from said vibrator station to an index station, means to advance the cope section from said roll-over station to said vibrator station, means to vibrate the cope at said vibrator station, means to advance the cope section to the index station, means to advance the cope and drag sections, with the drag section behind the cope section, beyond the index station, a drag elevator beyond the index station, a cope elevator beyond the drag elevator, said drag elevator comprising means to raise the drag section, means to move the raised drag section at right angles to the direction of previous movement of the cope and drag sections to a drag molding station, a molding means at said drag molding station and having a pattern plate, said molding means having means to assemble the pattern plate with the underside of the drag section, means to pour sand into the upper open end of the drag section and over the pattern plate, means to compress the poured sand against the pattern plate, means to cause relative movement between the pattern plate and the sand-filled drag section to remove the pattern plate therefrom to a position below the drag section, means to move the drag section from the molding station to a filled drag station, a conveyor, means to reinvert the drag section so that it is right-side-up and place the drag section on said conveyor, said cope elevator having means to raise the cope section, means to move the raised cope section at right angles to said direction of previous movement to a cope molding station, a molding means at said cope molding station and having a pattern plate, means to assemble said last-mentioned pattern plate to the underside of the cope section, means to pour sand into the upper open end of the cope section to fill the same and cover the pattern plate thereunder, means to compress the sand against the pattern plate, means to disassemble the pattern plate from the cope section, means to move the cope section to a cope closer station in vertical alignment above said conveyor, said conveyor having means to move the filled drag section to a position beneath the cope section at said cope closer station, cope closing means for assembling the cope section in superimposed relation to the drag section to form a molding flask supported on said conveyor, means to pour molten casting metal into the flask, said conveyor including means to move the flask filled with casting metal to a punch-out station, means at the punch-out station to punch out the castings and sand from the flask, and means to move the empty flask from the punch-out station to said unstacker station.

4. A sand casting apparatus comprising means to support a horizontal flask comprising a cope section assembled on top of a drag section at an unstacker station, means to raise the cope section above the drag section at said unstacker station, means to move the drag section longitudinally forwardly to an empty drag roll-over station beyond the raised cope section, means to invert the advanced drag section, means to lower the raised cope section to the level of the advanced and inverted drag section, means to advance the inverted drag section from said roll-over station to a vibrator station, means to move the lowered cope section to said roll-over station, means to vibrate said drag section at said vibrator station to shake out sand clinging thereto, means to advance the drag section from said vibrator station to index station, means to advance the cope section from said roll-over station to said vibrator station, means to vibrate the cope at said vibrator station, means to advance the cope section to the index station, means to advance the cope and drag sections, with the drag section behind the cope section, beyond the index station, a drag elevator beyond the index station, a cope elevator beyond the drag elevator, said drag elevator comprising means to raise the drag section, means to move the raised drag section to a drag molding station, a molding means at said drag molding station and having a pattern plate, said molding means having means to assemble the pattern plate with the underside of the drag section, means to pour sand into the upper open end of the drag section and over the pattern plate, means to compress the poured sand against the pattern plate, means to cause relative movement between the pattern plate and the sand-filled drag section to remove the pattern plate therefrom, means to move the drag section from the molding station to a filled drag station, a conveyor, means to reinvert the drag section so that it is right-side-up and place the drag section on said conveyor, said cope elevator having means to raise the cope section, means to move the raised cope section to a cope molding station, a molding means at said cope molding station and having a pattern plate, means to assemble said last-mentioned pattern plate to the underside of the cope section, means to pour sand into the upper open end of the cope section to fill the same and cover the pattern plate thereunder, means to compress the sand against the pattern plate, means to disassemble the pattern plate from the cope section, means to move the cope section to a cope closer station in vertical alignment above said conveyor, said conveyor having means to move the filled drag section to a position beneath the cope section at said cope closer station, cope closing means for assembling the cope section in superimposed relation to the drag section to form a molding flask supported on said conveyor, means to place a weight on the supported flask, means to pour molten casting metal into the weighted flask, means to remove said weight from the flask after the pouring operation, said conveyor including means to move the flask filled with casting metal to a punch-out station, means at the punch-out station to punch out the castings and sand from the flask, and means to move the empty flask from the punch-out station to said unstacker station.

5. A sand casting apparatus comprising means to support a horizontal flask comprising a cope section assembled on top of a drag section at an unstacker station, means to raise the cope section above the drag section at said unstacker station, means to move the drag section longitudinally forwardly to an empty drag roll-over station beyond the raised cope section, means to invert the advanced drag section, means to lower the raised cope section to the level of the advanced and inverted drag section, means to advance the inverted drag section from said roll-over station to a vibrator station, means to move the lowered cope section to said roll-over station, means to vibrate said drag section at said vibrator station to shake out said clinging thereto, means to advance the drag section from said vibrator station to an index station, means to advance the cope section from said roll-over station to said vibrator station, means to vibrate the cope at said vibrator station, means to advance the cope section to the index station, means to advance the cope and drag sections, with the drag section behind the cope section, beyond the index station, a drag elevator beyond the index station, a cope elevator beyond the drag elevator, said drag elevator comprising means to raise the drag section, means to move the raised drag section to a drag molding station, a molding means at said drag molding station and having a pattern plate, said molding means having means to assemble the pattern plate with the underside of the drag section, means to pour sand into the upper open end of the drag section and over the pattern plate, means to compress the poured sand against the pattern plate, means to cause relative movement between the pattern plate and the sand-filled drag section to remove the pattern plate therefrom, means to move the drag section from the molding station to a filled drag station, a conveyor, means to reinvert the drag section so that it is right-side-up and place the drag section on said conveyor, said cope elevator having means to raise the cope section, means to move the raised cope section to a cope molding station, a molding means at said cope molding station and having a pattern plate, means to assemble said last-mentioned pattern plate to the underside of the cope section, means to pour sand into the upper open end of the cope section to fill the same and cover the pattern plate thereunder, means to compress the sand against the pattern plate, means to disassemble the pattern plate from the cope section, means to move the cope section to a cope closer station in vertical alignment above said conveyor, said conveyor having means to move the filled drag section to a position beneath the cope section at said cope closer station, cope closing means for assembling the cope section in superimposed relation to the drag section to form a molding flask supported on said conveyor, means to pour molten casting metal into the flask, said conveyor including means to move the flask filled with casting metal to a punch-out station, means at the punch-out station to punch out the castings and sand from the flask, and means to move the empty flask from the punch-out station to said unstacker station.

6. A sand casting apparatus comprising means to support a horizontal flask comprising a cope section assembled on top of a drag section at an unstacker station, means to raise the cope section above the drag section at said unstacker station, means to move the drag section longitudinally forwardly to an empty drag roll-over station beyond the raised cope section, means to invert the advanced drag section, means to lower the raised cope section to the level of the advanced and inverted drag section, means to advance the inverted drag section from said roll-over station to a vibrator station, means to move the lowered cope section to said roll-over station, means to vibrate said drag section at said vibrator station to shake out sand clinging thereto, means to advance the drag section from said vibrator station to an index station, means to advance the cope section from said roll-over station to said vibrator station, means to vibrate the cope at said vibrator station, means to advance the cope section to the index station, means to advance the cope and drag sections, with the drag section behind the cope section, beyond the index station, a drag elevator beyond the index station, a cope elevator beyond the drag elevator, said drag elevator comprising means to raise the drag section, means to move the raised drag section to a drag molding station, a molding means at said drag molding station and having a pattern plate, said molding means having means to assemble the pattern plate with the underside of the drag section, means to pour sand into the upper open end of the drag section and over the pattern plate, means to compress the poured sand against the pattern plate, means to cause relative movement between the pattern plate and the sand-filled drag section to remove the pattern plate therefrom, means to move the drag section from the molding station to a filled drag station, a conveyor, means to reinvert the drag section so that it is right-side-up and place the drag section on said conveyor, said cope elevator having means to raise the cope section, means to move the raised cope section to a cope molding station, a molding means at said cope molding station and having a pattern plate, means to assemble said last-mentioned pattern plate to the underside of the cope section, means to pour sand into the upper open end of the cope section to fill the same and cover the pattern plate thereunder, means to compress the sand against the pattern plate, means to disassemble the pattern plate from the cope section, means to move the cope section to a cope closer station in vertical alignment above said conveyor, said conveyor having means to move the filled drag section to a position beneath the cope section at said cope closer station, and cope closing means for assembling the cope section in superimposed relation to the drag section to form a molding flask supported on said conveyor.

7. A sand casting apparatus comprising means to support a horizontal flask comprising a cope section assembled on top of a drag section at an unstacker station, means to raise the cope section above the drag section at said unstacker station, means to move the drag section longitudinally forwardly to an empty drag roll-over station beyond the raised cope section, means to invert the advanced drag section, means to lower the raised cope section to the level of the advanced and inverted drag section, means to advance the inverted drag section from said roll-over station to an index station, means to advance the cope section from said roll-over station to the index station, means to advance the cope and drag sections, with the drag section behind the cope section, beyond the index station, a drag elevator beyond the index station, a cope elevator beyond the drag elevator, said drag elevator comprising means to raise the drag section, means to move the raised drag section at right angles to the direction of previous movement of the cope and drag sections to a drag molding station, a molding means at said drag molding station and having a pattern plate, said molding means having means to assemble the pattern plate with the underside of the drag section, means to pour sand into the upper open end of the drag section and over the pattern plate, means to compress the poured sand against the pattern plate, means to cause relative movement between the pattern plate and the sand-filled drag section to remove the pattern plate therefrom to a position below the drag section, means to move the drag section from the molding station to a filled drag station, a conveyor, means to reinvert the drag section so that it is right-side-up and place the drag section on said conveyor, said cope elevator having means to raise the cope section, means to move the raised cope section at right angles to said direction of previous movement to a cope molding station, a molding means at said cope molding station and having a pattern plate, means to assemble said last-mentioned pattern plate to the underside of the cope section, means to pour sand into the upper open end of the cope section to fill the same and cover the pattern plate thereunder, means to compress the sand against the pattern plate, means to disassemble the pattern plate from the cope section, means to move the cope section to a cope closer station in vertical alignment above said conveyor, said conveyor having means to move the filled drag section to a position beneath the cope section at said cope closer station, cope closing means for assembling the cope section in superimposed relation to the drag section to form a molding flask supported on said conveyor, means to place a weight on the supported flask, means to pour molten casting metal into the weighted flask, means to remove said weight from the flask after the pouring operation, said conveyor including means to move the flask filled with casting metal to a punch-out station, means at the punch-out station to punch out the castings and sand from the flask, and means to move the empty flask from the punch-out station to said unstacker station.

8. A sand casting apparatus comprising means to support a horizontal flask comprising a cope section assembled on top of a drag section at an unstacker station, means to raise the cope section above the drag section at said unstacker station, means to move the drag section longitudinally forwardly to an empty drag rollover station beyond the raised cope section, means to invert the advanced drag section, means to lower the raised cope section to the level of the advanced and inverted drag section, means to advance the inverted drag section from said roll-over station to an index station, means to advance the cope section from said roll-over station to the index station, means to advance the cope and drag sections, with the drag section behind the cope section, beyond the index station, a drag elevator beyond the index station, a cope elevator beyond the drag elevator, said drag elevator comprising means to raise the drag section, means to move the raised drag section at right angles to the direction of previous of previous movement of the cope and drag sections to a drag molding station, a molding means at said drag molding station and having a pattern plate, said molding means having means to assemble the pattern plate with the underside of the drag section, means to pour sand into the upper open end of the drag section and over the pattern plate, means to compress the poured sand against the pattern plate, means to cause relative movement between the pattern plate and the sand-filled drag section to remove the pattern plate therefrom to a position below the drag section, means to move the drag section from the molding station to a filled drag station, a conveyor, means to reinvert the drag section so that it is right-side-up and place the drag section on said conveyor, said cope elevator having means to raise the cope section, means to move the raised cope section at right angles to said direction of previous movement to a cope molding station, a molding means at said cope molding station and having a pattern plate, means to assemble said last-mentioned pattern plate to the underside of the cope section, means to pour sand into the upper open end of the cope section to fill the same and cover the pattern plate thereunder, means to compress the sand against the pattern plate, means to disassemble the pattern plate from the cope section, means to move the cope section to a cope closer station in vertical alignment above said conveyor, said conveyor having means to move the filled drag section to a position beneath the cope section at said cope closer station, cope closing means for assembling the cope section in superimposed relation to the drag section to form a molding flask supported on said conveyor, means to pour molten casting metal into the flask, said conveyor including means to move the flask filled with casting metal to a punch-out station, means at the punch-out station to punch out the castings and sand from the flask, and means to move the empty flask from the punch-out station to said unstacker station.

9. A sand casting apparatus comprising means to support a horizontal flask containing a cope section assembled on top of a drag section at an unstacker station, means to move the drag section longitudinally forwardly to an empty drag roll-over station beyond the raised cope section, means to invert the advanced drag section, means to lower the raised cope section to the level of the advanced and inverted drag section, means to advance the inverted drag section from said roll-over station to an index station, means to advance the cope section from said roll-over station to the index station, means to advance the cope and drag sections, with the drag section behind the cope section, beyond the index station, a drag elevator beyond the index station, a cope elevator beyond the drag elevator, said drag elevator comprising means to raise the drag section, means to move the raised drag section to a drag molding station, a molding means at said drag molding station and having a pattern plate, said molding means having means to assemble the pattern plate with the underside of the drag section, means to pour sand into the upper open end of the drag section and over the pattern plate, means to compress the poured sand against the pattern plate, means to cause relative movement between the pattern plate and the sand-filled drag section to remove the pattern plate therefrom, means to move the drag section from the molding station to a filled drag station, a conveyor, means to reinvert the drag section so that it is right-side-up and place the drag section on said conveyor, said cope elevator having means to raise the cope section, means to move the raised cope section to a cope molding station, a molding means at said cope molding station and having a pattern plate, means to assemble said last-mentioned pattern plate to the underside of the cope section, means to pour sand into the upper open end of the cope section to fill the same and cover the pattern plate thereunder, means to compress the sand against the pattern plate, means to disassemble the pattern plate from the cope section, means to move the cope section to a cope closer station in vertical alignment above said conveyor, said conveyor having means to move the filled drag section to a position beneath the cope section at said cope closer station, cope closing means for assembling the cope section in superimposed relation to the drag section to form a molding flask supported on said conveyor, means to place a weight on the supported flask, means to pour molten casting metal into the weighted flask, means to remove said weight from the flask after the pouring operation, said conveyor including means to move the flask filled with casting metal to a punch-out station, means at the punch-out station to punch out the castings and sand from the flask, and means to move the empty flask from the punch-out station to said unstacker station.

10. A sand casting apparatus comprising means to support a horizontal flask comprising a cope section assembled on top of a drag section at an unstacker station, means to raise the cope section above the drag section at said unstacker station, means to move the drag section longitudinally forwardly to an empty drag roll-over station beyond the raised cope section, means to invert the advanced drag section, means to lower the arised cope section to the level of the advanced and inverted drag section, means to advance the inverted drag section from said roll-over station to an index station, means to advance the cope section from said roll-over station to the index station, means to advance the cope and drag sections, with the drag section behind the cope section, beyond the index station, a drag elevator beyond the index station, a cope elevator beyond the drag elevator, said drag elevator comprising means to raise the drag section, means to move the raised drag section to a drag molding station, a molding means at said drag molding station and having a pattern plate, said molding means having means to assemble the pattern plate with the underside of the drag section, means to pour sand into the upper open end of the drag section and over the pattern plate, means to compress the poured sand against the pattern plate, means to cause relative movement between the pattern plate and the sand-filled drag section to remove the pattern plate therefrom, means to move the drag section from the molding station to a filled drag station, a conveyor, means to reinvert the drag section so that it is right-side-up and place the drag section on said conveyor, said cope elevator having means to raise the cope section, means to move the raised cope section to a cope molding station, a molding means at said cope molding station and having a pattern plate, means to assemble said last-mentioned pattern plate to the underside of the cope section, means to pour sand into the upper open end of the cope section to fill the same and cover the pattern plate thereunder, means to compress the sand against the pattern plate, means to disassemble the pattern plate from the cope section, means to move the cope section to a cope claser station in vertical alignment above said conveyor, said conveyor having means to move the filled drag section to a position beneath the cope section at said cope closer station, cope closing means for assembling the cope section in superimposed relation to the drag section to form a molding flask supported on said conveyor, means to pour molten casting metal into the flask, said conveyor including means to move the flask filled with casting metal to a punch-out station, means at the punch-out station to punch out the castings and sand from the flask, and means to move the empty flask from the punch-out station to said unstacker station.

11. A sand casting apparatus comprising means to support a horizontal flask comprising a cope section assembled on top of a drag section at an unstacker station, means to raise the cope section above the drag section at said unstacker station, means to move the drag section longitudinally forwardly to an empty drag roll-over station beyond the raised cope section, means to invert the advanced drag section, means to lower the raised cope section to the level of the advanced and inverted drag section, means to advance the inverted drag section from said roll-over station to an index station, means to advance the cope section from said roll-over station to the index station, means to advance the cope section, beyond the index station, a drag elevator beyond the index station, a cope elevator beyond the drag elevator, said drag elevator comprising means to raise the drag section, means to move the raised drag section to a drag molding station, a molding means at said drag molding station and having a pattern plate, said molding means having means to assemble the pattern plate with the underside of the drag section, means to pour sand into the upper open end of the drag section and over the pattern plate, means to compress the poured sand against the pattern plate, means to cause relative movement between the pattern plate and the sand-filled drag section to remove the pattern plate therefrom, means to move the drag section from the molding station to a filled drag station, a conveyor, means to reinvert the drag section so that it is right-side-up and place the drag section on said conveyor, said cope elevator having means to raise the cope section, means to move the raised cope section to a cope molding station, a molding means at said cope molding station and having a pattern plate, means to assemble said last-mentioned pattern plate to the underside of the cope section, means to pour sand into the upper open end of the cope section to fill the same and cover the pattern plate thereunder, means to compress the sand against the pattern plate, means to disassemble the pattern plate from the cope section, means to move the cope section to a cope closer station in vertical alignment above said conveyor, said conveyor having means to move the filled drag section to a position beneath the cope section at said cope closer station, and cope closing means for assembling the cope section in superimposed relation to the drag section to form a molding flask supported on said conveyor.

12. A sand casting apparatus comprising means to support a horizontal flask comprising a cope section assembled on top of a drag section at an unstacker station, means to raise the cope section above the drag section at said unstacker station, means to move the drag section longitudinally forwardly to an empty drag roll-over station beyond the raised cope section, means to invert the advanced drag section, means to lower the raised cope section to the level of the advanced and inverted drag section, a drag elevator, a cope elevator, said drag elevator comprising means to raise the drag section, means to move the raised drag section at right angles to the direction of previous movement of the cope and drag sections to a drag molding station, a molding means at said drag molding station and having a pattern plate, said molding means having means to assemble the pattern plate with the underside of the drag section, means to pour sand into the upper open end of the drag section and over the pattern plate, means to compress the poured sand against the pattern plate, means to cause relative movent between the pattern plate and the sand-filled drag section to remove the pattern plate therefrom to a position below the drag section, means to move the drag section from the molding station to a filled drag station, a conveyor, means to reinvert the drag section so that it is right-side-up and place the drag section on said conveyor, said cope elevator having means to raise the cope section, means to move the raised cope section at right angles to said direction of previous movement to a cope molding station, a molding means at said cope molding station and having a pattern plate, means to assemble said last-mentioned pattern plate to the underside of the cope section, means to pour sand into the upper open end of the cope section to fill the same and cover the pattern plate thereunder, means to compress the sand against the pattern plate, means to disassemble the pattern plate from the cope section, means to move the cope section to a cope closer station in vertical alignment above said conveyor, said conveyor having means to move the filled drag section to a position beneath the cope section at said cope closer station, cope closing means for assembling the cope section in superimposed relation to the drag section to form a molding flask supported on said conveyor, means to place a weight on the supported flask, means to pour molten casting metal into the weighted flask, means to remove said weight from the flask after the pouring operation, said conveyor including means to move the flask filled with casting metal to a punch-out station, means at the punch-out station to punch out the castings and sand from the flask, and means to move the empty flask from the punch-out station to said unstacker station.

13. A sand casting apparatus comprising means to support a horizontal flask comprising a cope section assembled on top of a drag section at an unstacker station, means to raise the cope section above the drag section at said unstacker station, means to move the drag section longitudinally forwardly to an empty drag roll-over station beyond the raised cope section, means to invert the advanced drag section, means to lower the raised cope section to the level of the advanced and inverted drag section, a drag elevator, a cope elevator, said drag elevator comprising means to raise the drag section, means to move the raised drag section to a drag molding station, a molding means at said drag molding station and having a pattern plate, said molding means having means to assemble the pattern plate with the underside of the drag section, means to pour sand into the upper open end of the drag section and over the pattern plate, means to compress the poured sand against the pattern plate, means to cause relative movement between the pattern plate and the sand-filled drag section to remove the pattern plate therefrom, means to move the drag section from the molding station to a filled drag station, a conveyor, means to reinvert the drag section so that it is right-side-up and place the drag section on said conveyor, said cope elevator having means to raise the cope section, means to move the raised cope section to a cope molding station, a molding means at said cope molding station and having a pattern plate, means to assemble said last-mentioned pattern plate to the underside of the cope section, means to pour sand into the upper open end of the cope section to fill the same and cover the pattern plate thereunder, means to compress the sand against the pattern plate, means to disassemble the pattern plate from the cope section, means to move the cope section to a cope closer station in vertical alignment above said conveyor, said conveyor having means to move the filled drag section to a position beneath the cope section at said cope closer station, cope closing means for assembling the cope section in superimposed relation to the drag section to form a molding flask supported on said conveyor, means to place a weight on the supported flask, means to pour molten casting metal into the weighted flask, means to remove said weight from the flask after the pouring operation, said conveyor including means to move the flask filled with casting metal to a punch-out station, means at the punch-out station to punch out the casting and sand from the flask, and means to move the empty flask from the punch-out station to said unstacker station.

14. A sand casting apparatus comprising means to support a horizontal flask comprising a cope section assembled on top of a drag section at an unstacker station, means to raise the cope section above the drag section at said unstacker station, means to move the drag section longitudinally forwardly to an empty drag roll-over station beyond the raised cope section, means to invert the advanced drag section, means to lower the raised cope section to the level of the advanced and inverted drag section, a drag elevator, a cope elevator, said drag elevator comprising means to raise the drag section, means to move the raised drag section to a drag molding station, a molding means at said drag molding station and having a pattern plate, said molding means having means to assemble the pattern plate with the underside of the drag section, means to pour sand into the upper open end of the drag section and over the pattern plate, means to compress the poured sand against the pattern plate, means to cause relative movement between the pattern plate and the sand-filled drag section to remove the pattern plate therefrom, means to move the drag section from the molding station to a filled drag station, a conveyor, means to reinvert the drag section so that it is right-side-up and place the drag section on said conveyor, said cope elevator having means to raise the cope section, means to move the raised cope section to a cope molding station, a molding means at said cope molding station and having a pattern plate, means to assemble said last-mentioned pattern plate to the underside of the cope section, means to pour sand into the upper open end of the cope section to fill the same and cover the pattern plate thereunder, means to compress the sand against the pattern plate, means to disassemble the pattern plate from the cope section, means to move the cope section to a cope closer station in vertical alignment above said conveyor, said conveyor having means to move the filled drag section to a position beneath the cope section at said cope closer station, cope closing means for assembling the cope section in superimposed relation to the drag section to form a molding flask supported on said conveyor, means to pour molten casting metal into the flask, said conveyor including means to move the flask filled with casting metal to a punch-out station, means at the punch-out station to punch out the castings and sand from the flask, and means to move the empty flask from the punch-out station to said unstacker station.

15. A sand casting apparatus comprising means to support a horizontal flask comprising a cope section assembled on top of a drag section at an unstacker station, means to raise the cope section above the drag section at said unstacker station, means to move the drag section longitudinally forwardly to an empty drag roll-over station beyond the raised cope section, means to invert the advanced drag section, means to lower the raised cope section to the level of the advanced and inverted drag section, a drag elevator, a cope elevator, said drag elevator comprising means to raise the drag section, means to move the raised drag section at right angles to the direction of previous movement of the cope and drag sections to a drag molding station, a molding means at said drag molding station and having a pattern plate, said molding means having means to assemble the pattern plate with the underside of the drag section, means to pour sand into the upper open end of the drag section and over the pattern plate, means to compress the poured sand against the pattern plate, means to cause relative movement between the pattern plate and the sand-filled drag section to remove the pattern plate therefrom to a position below the drag section, means to move the drag section from the molding station to a filled drag station, a conveyor, means to reinvert the drag section so that it is right-side-up and place the drag section on said conveyor, said cope elevator having means to raise the cope section, means to move the raised cope section at right angles to said direction of previous movement to a cope molding station, a molding means at said cope molding station and having a pattern plate, means to assemble said last-mentioned pattern plate to the underside of the cope section, means to pour sand into the upper open end of the cope section to fill the same and cover the pattern plate thereunder, means to compress the sand against the pattern plate, means to disassemble the pattern plate from the cope section, means to move the cope section to a cope closer station in vertical alignment above said conveyor, said conveyor having means to move the filled drag section to a position beneath the cope section at said cope closer station, and cope closing means for assembling the cope section in superimposed relation to the drag section to form a molding flask supported on said conveyor.

16. A sand casting apparatus comprising means to support a horizontal flask comprising a cope section assembled on top of a drag section at an unstacker station, means to raise the cope section above the drag section at said unstacker station, means to move the drag section longitudinally forwardly to an empty drag roll-over station beyond the raised cope section, means to invert the advanced drag section, means to lower the raised cope section to the level of the advanced and inverted drag section, means to advance the inverted drag section from said roll-over station to a vibrator station, means to move the lowered cope section to said roll-over station, means to vibrate said drag section at said vibrator station to shake out sand clinging thereto, means to advance the drag section from said vibrator station to an index station, means to advance the cope section from said roll-over station to said vibrator station, means to vibrate the cope at said vibrator station, means to advance the cope section to the index station, means to advance the cope and drag sections, with the drag section behind the cope section, beyond the index station, a drag elevator beyond the index station, a cope elevator beyond the drag elevator, said drag elevator comprising means to raise the drag section, means to move the raised drag section at right angles to the direction of previous movement of the cope and drag sections to a drag molding station, a molding means at said drag molding station and having a pattern plate, said molding means having means to assemble the pattern plate with the underside of the drag section, means to pour sand into the upper open end of the drag section and over the pattern plate, means to compress the poured sand against the pattern plate, means to cause relative movement between the pattern plate and the sand-filled drag section to remove the pattern plate therefrom to a position below the drag section, means to move the drag section from the molding station to a filled drag station, a conveyor, means to reinvert the drag section so that it is right-side-up and place the drag section on said conveyor, said cope elevator having means to raise the cope section, means to move the raised cope section at right angles to said direction of previous movement to a cope molding station, a molding means at said cope molding station and having a pattern plate, means to assemble said last-mentioned pattern plate to the underside of the cope section, means to pour sand into the upper open end of the cope section to fill the same and cover the pattern plate thereunder, means to compress the sand against the pattern plate, means to disassemble the pattern plate from the cope section, means to move the cope section to a cope closer station in vertical alignment above said conveyor, said conveyor having means to move the filled drag section to a position beneath the cope section at said cope closer station, cope closing means for assembling the cope section in superimposed relation to the drag section to form a molding flask supported on said conveyor, means to place a weight on the supported flask, means to pour molten casting metal into the weighted flask, means to remove said weight from the flask after the pouring operating, said conveyor including means to move the flask filled with casting metal to a punch-out station, means at the punch-out station to punch out the castings and sand from the flask, means to move the empty flask from the punch-out station to said unstacker station, and means for automatically controlling the operation of the means for raising the cope section above the drag section, the means to move the drag section to the roll-over station, the means to invert the drag section, the means to lower the raised cope section, the means to advance the inverted drag section, the means to move the lowered cope section, the means to advance the drag section to the index station, the means to advance the cope section from the roll-over station, the means to advance the cope section to the index station, and the means to advance the cope and drag sections, with the drag section behind the cope section in predetermined sequence.

17. An apparatus as recited in claim 16 wherein said automatic control means comprises a plurality of fluid-actuated means operable to actuate said automatically controlled means.

18. An apparatus as recited in claim 17 wherein said automatic control means further comprises a plurality of valve means for controlling the flow of fluid to said fluid-actuated means, and means for actuating said valve means in predetermined sequence.

19. An apparatus as recited in claim 18 wherein said valve actuating means comprises a plurality of solenoid means controlling said valve means, and electrical circuit means for energizing said solenoid means in predetermined sequence.

20. An apparatus as recited in claim 19 wherein said electrical circuit means comprises a plurality of limit switches actuable by the operation of said automatically controlled means for controlling the operation of said electrical circuit means in response to the operation of said automatically controlled means.

21. A sand casting apparatus comprising means to support a horizontal flask comprising a cope section assembled on top of a drag section at an unstacker station, means to raise the cope section above the drag section at said unstacker station, means to move the drag section longitudinally forwardly to an empty drag roll-over station beyond the raised cope section, means to invert the advanced drag section, means to lower the raised cope section to the level of the advanced and inverted drag section, means to advance the inverted drag section from said roll-over station to an index station, means to advance the cope section from said roll-over station to the index station, means to advance the cope and drag sections, with the drag section behind the cope section, beyond the index station, a drag elevator beyond the index station, a cope elevator beyond the drag elevator, said drag elevator comprising means to raise the drag section, means to move the raised drag section to a drag molding station, a molding means at said drag molding station and having a pattern plate, said molding means having means to assemble the pattern plate with the underside of the drag section, means to pour sand into the upper open end of the drag section and over the pattern plate, means to compress the poured sand against the pattern plate, means to cause relative movement between the pattern plate and the sand-filled drag section to remove the pattern plate therefrom, means to move the drag section from the molding station to a filled drag station, a conveyor, means to reinvert the drag section so that it is right-side-up and place the drag section on said conveyor, said cope elevator having means to raise the cope section, means to move the raised cope section to a cope molding station, a molding means at said cope molding station and having a pattern plate, means to assemble said last-mentioned pattern plate to the underside of the cope section, means to pour sand into the upper open end of the cope section to fill the same and cover the pattern plate thereunder, means to compress the sand against the pattern plate, means to disassemble the pattern plate from the cope section, means to move the cope section to a cope closer station in vertical alignment above said conveyor, said conveyor having means to move the filled drag section to a position beneath the cope section at said cope closer station, cope closing means for assembling the cope section in superimposed relation to the drag section to form a molding flask supported on said conveyor, and electrical circuit means for automatically controlling the operation of the means to raise the cope section above the drag section, the means to move the drag section to the drag roll-over station, the means to invert the advanced drag section, the means to lower the raised cope section to the level of the inverted drag section, the means to advance the cope section to the index station, and the means to advance the cope and drag sections, with the drag section behind the cope section in predetermined sequence.

22. An apparatus as recited in claim 21 wherein said electrical circuit means comprises a plurality of limit switches actuable by the operation of said automatically controlled means for controlling the operation of said electrical circuit means in response to the operation of said automatically controlled means.

23. A sand casting apparatus comprising means to support a horizontal flask comprising a cope section assembled on top of a drag section at an unstacker station, means to raise the cope section above the drag section at said unstacker station, means to move the drag section longitudinally forwardly to an empty drag roll-over station beyond the raised cope section, means to invert the advanced drag section, means to lower the raised cope section to the level of the advanced and inverted drag section, a drag elevator, a cope elevator, said drag elevator comprising means to raise the drag section, means to move the raised drag section at right angles to the direction of previous movement of the cope and drag sections to a drag molding station, a molding means at said drag molding station and having a pattern plate, said molding means having means to assemble the pattern plate with the underside of the drag section, means to pour sand into the upper open end of the drag section and over the pattern plate, means to compress the poured sand against the pattern plate, means to cause relative movement between the pattern plate and the sand-filled drag section to remove the pattern plate therefrom to a position below the drag section, means to move the drag section from the molding station to a filled drag station, a conveyor, means to reinvert the drag section so that it is right-side-up and place the drag section on said conveyor, said cope elevator having means to raise the cope section, means to move the raised cope section at right angles to said direction of previous movement to a cope molding station, a molding means at said cope molding station and having a pattern plate, means to assemble said last-mentioned pattern plate to the underside of the cope section, means to pour sand into the upper open end of the cope section to fill the same and cover the pattern plate thereunder, means to compress the sand against the pattern plate, means to disassemble the pattern plate from the cope section, means to move the cope section to a cope closer station in vertical alignment above said conveyor, said conveyor having means to move the filled drag section to a position beneath the cope section at said cope closer station, cope closing means for assembling the cope section in superimposed relation to the drag section to form a molding flask supported on said conveyor, means to place a weight on the supported flask, means to pour molten casting metal into the weighted flask, means to remove said weight from the flask after the pouring operation, said conveyor including means to move the flask filled with casting metal to a punch-out station, means at the punch-out station to punch out the castings and sand from the flask, means to move the empty flask from the punch-out station to said unstacker station, and means for automatically controlling the operation of the means to raise the cope section above the drag section, the means to move the drag section to the drag roll-over station, the means to invert the advanced drag section, the means to lower the raised cope section, the means to reinvert the drag section, the means to move the cope section to the cope closer station, and the cope closing means in predetermined sequence.

24. An apparatus as recited in claim 23 wherein said automatic control means comprises a plurality of fluid-actuated means operable to actuate said several above-recited means.

25. An apparatus as recited in claim 24 wherein said automatic control means further comprises a plurality of valve means for controlling the flow of fluid to said fluid-actuated means, and means for actuating said valve means in predetermined sequence.

26. An apparatus as recited in claim 25 wherein said valve actuating means comprises a plurality of solenoid means controlling said valve means, and electrical circuit means for energizing said solenoid means in predetermined sequence.

27. An apparatus as recited in claim 26 wherein said electrical circuit means comprises a plurality of limit switches actuable by the operation of said automatically controlled means for controlling the operation of said electrical circuit means in response to the operation of said automatically controlled means.

28. A sand casting apparatus comprising means to support a horizontal flask comprising a cope section assembled on top of a drag section at an unstacker station, means to raise the cope section above the drag section at said unstacker station, means to move the drag section longitudinally forwardly to an empty drag roll-over station beyond the raised cope section, means to invert the advanced drag section, means to lower the raised cope section to the level of the advanced and inverted drag section, a drag elevator, a cope elevator, said drag elevator comprising means to raise the drag section, means to move the raised drag section at right angles to the direction of previous movement of the cope and drag sections to a drag molding station, a molding means at said drag molding station and having a pattern plate, said molding means having means to assemble the pattern plate with the underside of the drag section, means to pour sand into the upper open end of the drag section and over the pattern plate, means to compress the poured sand against the pattern plate, means to cause relative movement between the pattern plate and the sand-filled drag section to remove the pattern plate therefrom to a position below the drag section, means to move the drag section from the molding station to a filled drag station, a conveyor, means to reinvert the drag section so that it is right-side-up and place the drag section on said conveyor, said cope elevator having means to raise the cope section, means to move the raised cope section at right angles to said direction of previous movement to a cope molding station, a molding means at said cope molding station and having a pattern plate, means to assemble said last-mentioned pattern plate to the underside of the cope section, means to pour sand into the upper open end of the cope section to fill the same and cover the pattern plate thereunder, means to compress the sand against the pattern plate, means to disassemble the pattern plate from the cope section, means to move the cope section to a cope closer station in vertical alignment above said conveyor, said conveyor having means to move the filled drag section to a position beneath the cope section at said cope closer station, cope closing means for assembling the cope section in superimposed relation to the drag section to form a molding flask supported on said conveyor, and electrical circuit means for automatically controlling the operation of the means to raise the cope section above the drag section, the means to move the drag section to an empty drag roll-over station, the means to invert the advanced drag section, the means to lower the raised cope section to the level of the advanced and inverted drag section in predetermined sequence.

29. An apparatus as recited in claim 28 wherein said electrical circuit means comprises a plurality of limit switches actuable by the operation of said automatically controlled means for controlling the operation of said electrical circuit means in response to the operation of said automatically controlled means.

30. A foundry apparatus comprising a continuous circuitous conveyor having means for supporting a series of flask sections in end-to-end relation, means for indexing the conveyor through intermittent movements each of a distance equal to the spacing between alternate flask sections, and a plurality of flask section treating means adjacent the conveyor for subjecting said flask sections in series to various successive operations, said plurality of treating means including means to support a horizontal flask comprising a cope section assembled on top of a drag section at an unstacker station, means to separate the cope section from the drag section at said unstacker station, means to move the drag section longitudinally forwardly to an empty drag roll-over station beyond the raised cope section, means at the latter station to invert the advanced drag section, means to lower the raised cope section to the level of the advanced and inverted drag section, means to advance the inverted drag section from said roll-over station to a vibrator station, means to move the lowered cope section to said roll-over station, means to vibrate said drag section at said vibrator station to shake out sand clinging thereto, means to advance the drag section from said vibrator station to an index station, means to advance the cope section from said roll-over station to said vibrator station, means to vibrate the cope at said vibrator station, means to advance the cope section to the index station, means to advance the cope and drag sections, with the drag section behind the cope section, beyond the index station, a drag elevator beyond the index station, a cope elevator beyond the drag elevator, said drag elevator comprising means to raise the inverted drag section, means to move the raised drag section at right angles to the direction of previous movement of the cope and drag sections to a drag molding station, a molding means at said drag molding station and having a pattern plate, said molding means having means to assemble the pattern plate with the underside of the drag section, means to pour sand into the upper open end of the drag section and over the pattern plate, means to compress the poured sand against the pattern plate, means to cause relative movement between the pattern plate and the sand-filled drag section to remove the pattern plate therefrom to a position below the drag section, means to move the drag section from the molding station to a filled drag roll-over station, roll-over means at said latter station to reinvert the drag section so that it is right-side-up and to place the drag section on said conveyor, said cope elevator having means to raise the cope section, means to move the raised cope section at right angles to said direction of previous movement to a cope molding station, a molding means at said cope molding station and having a pattern plate, means to assemble said last-mentioned pattern plate to the underside of the cope section, means to pour sand into the upper open end of the cope section to fill the same and cover the pattern plate thereunder, means to compress the sand against the pattern plate, means to disassemble the pattern plate from the cope section, means to move the cope section to a cope closer station in vertical alignment above said conveyor, said conveyor having means to move the filled drag section to a position beneath the cope section at said cope closer station, cope closer means for assembling the cope section in superimposed relation to the drag section to form a molding flask supported on said conveyor, means to place a weight on the supported flask, means to pour molten casting metal into the weighted flask, means to remove said weight from the flask after the pouring operation, whereby a series of flasks filled with casting metal are placed on said conveyor so as to be transported thereby during the indexing movements thereof, transfer means for successively removing one of said metal-filled flasks from the conveyor at a transfer station after each index movement of the conveyor, and for successively moving said removed flasks to a punch-out station, means at the punch-out station to punch out the casting and sand from the flasks, and means to move the the empty flasks successively from the punch-out station to said unstacker station, said flask treating means operating substantially simultaneously on different respective flasks and flask sections.

31. A foundry apparatus comprising a continuous circuitous conveyor having means for supporting a series of flask sections in end-to-end relation, means for indexing the conveyor through intermittent movements each of a distance equal to the spacing between alternate flask sections, and a plurality of flask section treating means adjacent the conveyor for subjecting said flask sections in series to various successive operations, said plurality of treating means including means to support a horizontal flask comprising a cope section assembled on top of a drag section at an unstacker station, means to separate the cope section from the drag section at said unstacker station, means to move the drag section longitudinally forwardly to an empty drag roll-over station beyond the raised cope section, means at the latter station to invert the advanced drag section, means to lower the raised cope section to the level of the advanced and inverted drag section, a drag elevator, a cope elevator, said drag elevator comprising means to raise the inverted drag section, means to move the raised drag section to a drag molding station, a molding means at said drag molding station and having a pattern plate, said molding means having means to assemble the pattern plate with the underside of the drag section, means to pour sand into the upper one end of the drag section and over the pattern plate, means to compress the poured sand against the pattern plate, means to cause relative movement between the pattern plate and the sand-filled drag section to remove the pattern plate therefrom, means to move the drag section from the molding station to a filled drag roll-over station, rollover means at said latter station to reinvert the drag section so that it is right-side-up and to place the drag section on said conveyor, said cope elevator having means to raise the cope station, means to move the raised cope section to a cope molding station, a molding means at said cope molding station and having a pattern plate, means to assemble said last-mentioned pattern plate to the underside of the cope section, means to pour sand into the upper open end of the cope section to fill the same and cover the pattern plate thereunder, means to compress the sand against the pattern plate, means to disassemble the pattern plate from the cope section, means to move the cope section to a cope closer station in vertical alignment above said conveyor, said conveyor having means to move the filled drag section to a position beneath the cope section at said cope closer station, cope closer means for assembling the cope section in superimposed relation to the drag section to form a molding flask supported on said conveyor, means to pour molten casting metal into the weighted flask, whereby a series of flasks filled with casting metal are placed on said conveyor so as to be transported thereby during the indexing movements thereof, transfer means for successively removing one of said metal-filled flasks from the conveyor at a transfer station after each index movement of the conveyor, and for successively moving said removed flasks to a punch-out station, means at the punch-out station to punch out the casting and sand from the flasks, and means to move the empty flasks successively from the punch-out station to said unstacker station, said flask treating means operating substantially simultaneously on different respective flasks and flask sections.

32. A foundry apparatus comprising a continuous circuitous conveyor having means for supporting a series of flask sections in end-to-end relation, means for indexing the conveyor through intermittent movements each of a distance equal to the spacing between alternate flask sections, and a plurality of flask section treating means adjacent the conveyor for subjecting said flask sections in series to various successive operations, said plurality of treating means including means to support a horizontal flask comprising a cope section assembled on top of a drag section at an unstacker station, means to separate the cope section from the drag section at said unstacker station, means to move the drag section to an empty drag roll-over station, means at the latter station to invert the drag section, a drag elevator, a cope elevator, said drag elevator comprising means to raise the inverted drag section, means to move the raised drag section to a drag molding station, a molding means at said drag molding station and having a pattern plate, said molding means having means to assemble the pattern plate with the underside of the drag section, means to pour sand into the upper open end of the drag section and over the pattern plate, means to compress the poured sand against the pattern plate, means to cause relative movement between the pattern plate and the sand-filled drag section to remove the pattern plate therefrom, means to move the drag section from the molding station to a filled drag rollover station, rollover means at said latter station to reinvert the drag section so that it is right-side-up and to place the drag section on said conveyor, said cope elevator having means to raise the cope section, means to move the raised cope section to a cope molding station, a molding means at said cope molding station and having a pattern plate, means to assemble said last-mentioned pattern plate to the underside of the cope section, means to pour sand into the upper open end of the cope section to fill the same and cover the pattern plate thereunder, means to compress the sand against the pattern plate, means to disassemble the pattern plate from the cope section, means to move the cope section to a cope closer station in vertical alignment above said conveyor, said conveyor having means to move the filled drag section to a position beneath the cope section at said cope closer station, cope closer means for assembling the cope section in superimposed relation to the drag section to form a molding flask supported on said conveyor, means to pour molten casting metal into the weighted flask, whereby a series of flasks filled with casting metal are placed on said conveyor so as to be transported thereby during the indexing movement thereof, transfer means for successively removing one of said metal-filled flasks from the conveyor at a transfer station after each index movement of the conveyor, and for successively moving said removed flasks to a punch-out station, means at the punch-out station to punch out the casting and sand from the flasks, and means to move the empty flasks successively from the punch-out station to said unstacker station, said flask treating means operating substantially simultaneously on different respective flasks and flask section.

33. A foundry apparatus comprising a continuous circuitous conveyor having means for supporting a series of flask sections in end-to-end relation, means for indexing the conveyor through intermittent movements each of a distance equal to the spacing between alternate flask sections, and a plurality of flask section treating means adjacent the conveyor for subjecting said flask sections in series to various successive operations, said plurality of treating means including means to support a horizontal flask comprising a cope section assembled on top of a drag section at an unstacker station, means to separate the cope section from the drag section at said unstacker station, means to move the drag section to an empty drag roll-over station, means at the latter station to invert the drag section, means to move the drag section to a drag molding station, a molding means at said drag molding station and having a pattern plate, said molding means having means to assemble the pattern plate with the underside of the drag section, means to pour sand into the upper open end of the drag section and over the pattern plate, means to compress the poured sand against the pattern plate, means to cause relative movement between the pattern plate and the sand-filled drag section to remove the pattern plate therefrom, means to move the drag section from the molding station to a filled drag rollover station, rollover means at said latter station to reinvert the drag section so that it is right-side-up and to place the drag section on said conveyor, means to move the cope section to a cope molding station, a molding means at said cope molding station and having a pattern plate, means to assemble said last-mentioned pattern plate to the underside of the cope section, means to pour sand into the upper open end of the cope section to fill the same and cover the pattern plate thereunder, means to compress the sand against the pattern plate, means to disassemble the pattern plate from the cope section, means to move the cope section to a cope closer station in vertical alignment above said conveyor, said conveyor having means to move the filled drag section to a position beneath the cope section at said cope closer station, cope closed means for assembling the cope section in superimposed relation to the drag section to form a molding flask supported on said conveyor, means to pour molten casting metal into the weighted flask, whereby a series of flasks filled with casting metal are placed on said conveyor so as to be transported thereby during the indexing movements thereof, transfer means for successively removing one of said metal-filled flasks from the conveyor at a transfer station after each index movement of the conveyor, and for successively moving said removed flasks to a punch-out station to punch out the casting and sand from the flasks, and means to move the empty flasks successively from the punch-out station to said unstacker station, said flask treating means operating substantially simultaneously on different respective flasks and flask sections.

34. An apparatus as recited in claim 33 in combination with automatic means for preventing operation of said rollover means and said cope closer means until said conveyor has been indexed and is stationary.

35. An apparatus as recited in claim 33 in combination with automatic means for preventing operation of said transfer means until said conveyor has been indexed and is stationary.

36. An apparatus as recited in claim 33 in combination with automatic means for preventing an indexing movement of said conveyor until said flask section treating means are in respective predetermined positions.

37. An apparatus as recited in claim 33 wherein said conveyor indexing means comprises a reciprocally movable member, means on said member for gripping said conveyor in one direction of movement of the member and releasably disengageable therefrom in the opposite direction of movement of the member, and actuating means for moving said member in said directions.

38. An apparatus as recited in claim 37 and comprising automatic control means for operating said actuating means to index the conveyor in response to said flask section treating means attaining respective predetermined positions.

39. An apparatus as recited in claim 33 wherein said conveyor is articulated and said conveyor indexing means comprises means for imparting impulses to said conveyor at a plurality of different points thereof simultaneously so as to prevent slack from accumulating throughout the length of the conveyor.

40. A sand casting apparatus comprising means to support a horizontal flask comprising a cope section assembled on top of a drag section at an unstacker station, means to separate the cope section from the drag section at said unstacker station, means to move the drag section to an empty drag roll-over station beyond the cope section, means to invert the drag section at the latter station, means to move the drag section to a drag molding station, a molding means at said drag molding station and having a pattern plate, said molding means having means to assemble the pattern plate to the drag section at the underside thereof, means to feed a measured amount of sand into the upper open end of the drag section and over the pattern plate, means to strike off excess sand from the upper end of the drag section, means to compress the sand in the drag section against the pattern plate, means to cause relative movement beween the pattern plate and the sand-filled drag section to remove the pattern plate therefrom, means to move the drag section from the molding station to a filled drag rollover station, a conveyor, means to reinvert the drag section at the latter station so that it is right-side-up and to place the drag section on said conveyor, means to move the cope section to a cope molding station, a molding means at said cope molding station and having a pattern plate, means to assemble said last-mentioned pattern plate to the underside of the cope section, means to feed a measured amount of sand into the upper open end of the cope section to fill the same and cover the pattern plate thereunder, means to strike off excess sand from the upper end of the cope section, means to compress the sand in the cope section against the pattern plate, means to disassemble the pattern plate from the cope section, means to move the cope section to a cope closer station in vertical alignment above said conveyor, said conveyor having means to move the filled drag section to a position beneath the cope section at said cope closer station, cope closer means for assembling the cope section in superimposed relation to the drag section to form a molding flask supported on said conveyor, means to pour molten casting metal into the flask, said conveyor including means to move the flask filled with casting metal to a punch-out station, means at the punch-out station to punch out the castings and sand from the flask, and means to move the empty flask from the punch-out station to said unstacker station.

41. An apparatus as recited in claim 40 in combination with a sand distribution system comprising sand processing means, means for conveying said excess sand struck off from said drag and cope sections, and said sand punched out from said flask to said sand processing means, and means for conveying processed sand from said sand processing means to the sand feeding means.

42. A sand casting apparatus comprising means to support a horizontal flask comprising a cope section assembled on top of a drag section at an unstacker station, means to separate the cope section from the drag section at said unstacker station, means to move the drag section to an empty drag roll-over station beyond the cope section, means to invert the drag section at the latter station, means to move the drag section to a drag molding station, a molding means at said drag molding station and having a pattern plate, said molding means having means to assemble the pattern plate to the drag section at the underside thereof, means to feed a measured amount of sand into the upper open end of the drag section and over the pattern plate, means to compress the sand in the drag section against the pattern plate, means to cause relative movement between the pattern plate and the sand-filled drag section to remove the pattern plate therefrom, means to move the drag section from the molding station to a filled drag rollover station, a conveyor, means to reinvert the drag section at the latter station so that it is right-side-up and to place the drag section on said conveyor, means to move the cope section to a cope molding station, a molding means at said cope molding station and having a pattern plate, means to assemble said last-mentioned pattern plate to the underside of the cope section, means to feed a measured amount of sand into the upper open end of the cope section to fill the same and cover the pattern plate thereunder, means to compress the sand in the cope section against the pattern plate, means to disassemble the pattern plate from the cope section, means to move the cope section to a cope closer station in vertical alignment above said conveyor, said conveyor having means to move the filled drag section to a position beneath the cope section at said cope closer station, cope closer means for assembling the cope section in superimposed relation to the drag section to form a molding flask supported on said conveyor, means to pour molten casting metal into the flask, said conveyor including means to move the flask filled with casting metal to a punch-out station, means at the punch-out station to punch out the castings and sand from the flask, and means to move the empty flask from the punch-out station to said unstacker station, and a sand distribution system comprising sand processing means, means for collecting spilled sand falling from the drag and cope sections when sand is poured thereinto, means for conveying said collected spilled sand and the sand punched out from the flask to said sand processing means, and means for conveying processed sand from said sand processing means to the sand feeding means.

43. A foundry apparatus comprising a continuous circuitous conveyor having means for supporting a series of flask sections in end-to-end relation, means for indexing the conveyor through intermittent movements each of a distance equal to the spacing between alternate flask sections, and a plurality of flask section treating means adjacent the conveyor for subjecting said flask sections in series to various successive operations, said plurality of treating means including means to support a horizontal flask comprising a cope section assembled on top of a drag section at an unstacker station, means to separate the cope section from the drag section at said unstacker station, means to move the drag section to a drag molding station, means to pour sand into the upper openend of the drag section, means to compress the poured sand, means to move the drag section from the molding station to a filled drag rollover station, rollover means at said latter station to place the drag section on said conveyor, means to move the cope section, to a cope molding station, means to pour sand into the upper open end of the cope section to fill the same, means to compress the sand, means to move the cope section to a cope closer station in vertical alignment above said conveyor, said conveyor having means to move the filled drag section to a position beneath the cope section at said cope closer station, cope closing means for assembling the cope section in superimposed relation to the drag section to form a molding flask supported on said conveyor, means to pour molten casting metal into the weighted flask, whereby a series of flasks filled with casting metal are placed on said conveyor so as to be transported thereby during the indexing movements thereof, transfer means for successively removing one of said metal-filled flasks from the conveyor at a transfer station after each index movement of the conveyor, and for successively moving said removed flasks to a punch-out station, means at the punch-out station to punch out the casting and sand from the flasks, and means to move the empty flasks successively from the punch-out station to said unstacker station, said flask treating means operating substantially simultaneously on different respective flasks and flask sections.

44. An apparatus as recited in claim 43 in combination with automatic means for preventing operation of said rollover means, said cope closer means and said transfer means until said conveyor has been indexed and is stationary.

45. A method of making molds comprising the steps of supporting a horizontal flask comprising a cope section assembled on top of a drag section at an unstacker station, raising the cope section above the drag section at said unstacker station, moving the drag section longitudinally forwardly to a rollover station beyond the raised cope section, inverting the advanced drag section, lowering the raised cope section to the level of the advanced inverted drag section, advancing the inverted drag section from said rollover station to a vibrator station, moving the lowered cope section to said rollover station, vibrating said drag section at said vibrator station to shake out sand clinging thereto, advancing the drag section from said vibrator station to an index station, advancing the cope section from said rollover station to said vibrator station, vibrating the cope section at said vibrator station, advancing the cope section to said index station, advancing the cope and drag sections, with the drag section behind the cope section, beyond the index station, raising the drag section beyond the index station, moving the raised drag section at right angles to the direction of previous movement of the cope and drag sections to a drag molding station, assembling a pattern plate with the underside of the drag section, pouring sand into the upper open end of the drag section and over the pattern plate, compressing the poured sand against the pattern plate, then removing the pattern plate from the drag section, then moving the drag section from the molding station to a filled drag rollover station, then reinverting the drag section at said last-recited rollover station, moving the reinverted drag section to a cope closer station, raising the cope section beyond said index station, moving the raised cope section at right angles to said direction of previous movement of the cope and drag sections to a cope molding station, assembling another pattern plate with the underside of the cope section, pouring sand into the upper open end of the cope section and over its pattern plate, compressing the poured sand against the last-recited pattern plate, then removing said pattern plate from the cope section, then moving the filled cope section to said cope closer station in vertical alignment above said drag section, placing the cope and drag sections in superimposed assembled relation to form a molding flask, placing a weight on said flask, pouring molten casting metal into said flask, then removing said weight from the flask, moving said metal filled flask to a punchout station while allowing the molten metal to solidify to form a casting, punching out the casting and molding sand from said flask, moving the empty flask to said unstacker station, and then repeating the above-recited steps.

46. A method as recited in claim 45 wherein a plurality of flasks each comprising a cope section and a drag section are successively subjected to the operations of said recited steps, the sections of each flask being located at a respective one of said stations and being moved in series to the next succeeding station, said recited steps taking place substantially simultaneously on different respective flask sections.

47. A method of making molds comprising the steps of supporting a horizontal flask comprising a cope section assembled on top of a drag section at an unstacker station, raising the cope section above the drag section at said unstacker station, moving the drag section longitudinally forwardly to a rollover station beyond the raised cope section, inverting the advanced drag section, lowering the raised cope section to the level of the advanced inverted drag section, advancing the inverted drag section from said rollover station to a vibrator station, moving the lowered cope section to said rollover station, vibrating said drag section at said vibrator station to shake out sand clinging thereto, advancing the drag section from said vibrator station to an index station, advancing the cope section from said rollover station to said vibrator station, vibrating the cope section at said vibrator station, advancing the cope section to said index station, advancing the cope and drag sections, with the drag section behind the cope section, beyond the index station, raising the drag section beyond the index station, moving the raised drag section at right angles to the direction of previous movement of the cope and drag sections to a drag molding station, assembling a pattern plate with the underside of the drag section, pouring sand into the upper open end of the drag section and over the pattern plate, compressing the poured sand against the pattern plate, then removing the pattern plate from the drag section, then moving the drag section from the molding station to a filled drag rollover station, then reinverting the drag section at said last-recited rollover station, moving the reinverted drag section to a cope closer station, raising the cope section beyond said index station, moving the raised cope section at right angles to said direction of previous movement of the cope and drag sections to a cope molding station, assembling another pattern plate with the underside of the cope section, pouring sand into the upper open end of the cope section and over its pattern plate, compressing the poured sand against the last-recited pattern plate, then removing said pattern plate from the cope section, then moving the filled cope section to said cope closer station in vertical alignment above said drag section, placing the cope and drag sections in superimposed assembled relation to form a molding flask.

48. A method of making molds comprising the steps of supporting a horizontal flask comprising a cope section, assembled on top of a drag section at an unstacker station, raising the cope section above the drag section at said unstacker station, moving the drag section longitudinally forwardly to a rollover station beyond the raised cope section, inverting the advanced drag section, lowering the raised cope section to the level of the advanced inverted drag section, advancing the inverted drag section from said rollover station to a vibrator station, moving the lowered cope section to said rollover station, vibrating said drag section at said vibrator station to shake out sand clinging thereto, advancing the drag section from said vibrator station to an index station, advancing the cope section from said rollover station to said vibrator station, vibrating the cope section at said vibrator station, advancing the cope section to said index station, advancing the cope and drag sections, with the drag section behind the cope section, beyond the index station, raising the drag section beyond the index station, moving the raised drag section at right angles to the direction of previous movement of the cope and drag sections to a drag molding station, assembling a pattern plate with the underside of the drag section, pouring sand into the upper open end of the drag section and over the pattern plate, compressing the poured sand against the pattern plate, then removing the pattern plate from the drag section, then moving the drag section from the molding station to a filled drag rollover station, then reinverting the drag section at said last-recited rollover station, moving the reinverted drag section to a cope closer station, raising the cope section beyond said index station, moving the raised cope section at right angles to said direction of previous movement of the cope and drag sections to a cope molding station, assembling another pattern plate with the underside of the cope section, pouring sand into the upper open end of the cope section and over its pattern plate, compressing the poured sand against the last-recited pattern plate, then removing said pattern plate from the cope section, then moving the filled cope section to said cope closer station in vertical alignment above said drag section, placing the cope and drag sections in superimposed assembled relation to form a molding flask, pouring molten casting metal into said flask, moving said metal filled flask to a punch out station while allowing the molten metal to solidify to form a casting, punching out the casting and molding sand from said flask, moving the empty flask to said unstacker station, and then repeating the above-recited steps.

49. A method of making molds comprising the steps of supporting a horizontal flask comprising a cope section assembled on top of a drag section at an unstacker station, raising the cope section above the drag section at said unstacker station, moving the drag section longitudinally forwardly to a rollover station beyond the raised cope section, inverting the advanced drag section, lowering the raised cope section to the level of the advanced inverted drag section, advancing the inverted drag section from said rollover station to a vibrator station, moving the lowered cope section to said rollover station, vibrating said drag section at said vibrator station to shake out sand clinging thereto, advancing the drag section from said vibrator station to an index station, advancing the cope section from said rollover station to said vibrator station, vibrating the cope section at said vibrator station, advancing the cope section to said index station, advancing the cope and drag sections, with the drag section behind the cope section, beyond the index station, raising the drag section beyond the index station, moving the raised drag section to a drag molding station, assembling a pattern plate with the underside of the drag section, pouring sand into the upper open end of the drag section and over the pattern plate, compressing the poured sand against the pattern plate, then removing the pattern plate from the drag section, then moving the drag section from the molding station to a filled drag rollover station, then reinverting the drag section at said last-recited rollover station, moving the reinverted drag section to a cope closer station, raising the cope section beyond said index station, moving the raised cope section to a cope molding station, assembling another pattern plate with the underside of the cope section, pouring sand into the upper open end of the cope section and over its pattern plate, compressing the poured sand against the last-recited pattern plate, then removing said pattern plate from the cope section, then moving the filled cope section to said cope closer station in vertical alignment above said drag section, placing the cope and drag sections in superimposed assembled relation to form a molding flask, pouring molten casting metal into said flask, moving said metal filled flask to a punch out station while allowing the molten metal to solidify to form a casting, punching out the casting and molding sand from said flask, moving the empty flask to said unstacker station, and then repeating the above-recited steps.

50. A method of making molds comprising the steps of supporting a horizontal flask comprising a cope section assembled on top of a drag section at an unstacker station, raising the cope section above the drag section at said unstacker station, moving the drag section longitudinally forwardly to a rollover station beyond the raised cope section, inverting the advanced drag section, lowering the raised cope section to the level of the advanced inverted drag section, advancing the cope and drag sections, raising the drag section, moving the raised drag section at right angles to the direction of previous movement of the cope and drag sections to a drag molding station, assembling a pattern plate with the underside of the drag section, pouring sand into the upper open end of the drag section and over the pattern plate, compressing the poured sand against the pattern plate, then removing the pattern plate from the drag section, then moving the drag section from the molding station to a filled drag rollover station, then reinverting the drag section at said last-recited rollover station, moving the reinverted drag section to a cope closer station, raising the cope section, moving the raised cope section at right angles to said direction of previous movement of the cope and drag sections to a cope molding station, assembling another pattern plate with the underside of the cope section, pouring sand into the upper open end of the cope section and over its pattern plate, compressing the poured sand against the last-recited pattern plate, then removing said pattern plate from the cope section, then moving the filled cope section to said cope closer station in vertical alignment above said drag section, placing the cope and drag sections in superimposed assembled relation to form a molding flask, placing a weight on said flask, pouring molten casting metal into said flask, then removing said weight from the flask, moving said metal filled flask to a punchout station while allowing the molten metal to solidify to form a casting, punching out the casting and molding sand from said flask, moving the empty flask to said unstacker station, and then repeating the above-recited steps.

51. A method of making molds comprising the steps of supporting a horizontal flask comprising a cope section assembled on top of a drag section at an unstacker station, raising the cope section above the drag section at said unstacker station, moving the drag section longitudinally forwardly to a rollover station beyond the raised cope section, inverting the advanced drag section, lowering the raised cope section to the level of the advanced inverted drag section, advancing the cope and drag sections, raising the drag section, moving the raised drag section to a drag molding station, assembling a pattern plate with the underside of the drag section, pouring sand into the upper open end of the drag section and over the pattern plate, compressing the poured sand against the pattern plate, then removing the pattern plate from the drag section, then moving the drag section from the molding station to a filled drag rollover station, then reinverting the drag section at said last-recited rollover station, moving the reinverted drag section to a cope closer station, raising the cope section, moving the raised cope section at right angles to said direction of previous movement of the cope and drag sections to a cope molding station, assembling another pattern plate with the underside of the cope section, pouring sand into the upper open end of the cope section and over its pattern plate, compressing the poured sand against the last-recited pattern plate, then removing said pattern plate from the cope section, then moving the filled cope section to said cope closer station in vertical alignment above said drag section, placing the cope and drag sections in superimposed assembled relation to form a molding flask, pouring molten casting metal into said flask, moving said metal filled flask to a punchout station while allowing the molten metal to solidify to form a casting, punching out the casting and molding sand from said flask, moving the empty flask to said unstacker station, and then repeating the above-recited steps.

52. A method of making molds comprising the steps of supporting a horizontal flask comprising a cope section assembled on top of a drag section at an unstacker station, raising the cope section above the drag section at said unstacker station, moving the drag section longitudinally forwardly to a rollover station beyond the raised cope section, inverting the advanced drag section, lowering the raised cope section to the level of the advanced inverted drag section, advancing the cope and drag sections, raising the drag section, moving the raised drag section to a drag molding station, assembling a pattern plate with the underside of the drag section, pouring sand into the upper open end of the drag section and over the pattern plate, compressing the poured sand against the pattern plate, then removing the pattern plate from the drag section, then moving the drag section from the molding station to a filled drag rollover station, then reinverting the drag section at said last-recited rollover station, moving the reinverted drag section to a cope closer station, raising the cope section, moving the raised cope section to a cope molding station, assembling another pattern plate with the underside of the cope section, pouring sand into the upper open end of the cope section and over its pattern plate, compressing the poured sand against the last-recited pattern plate, then removing said pattern plate from the cope section, then moving the filled cope section to said cope closer station in vertical alignment above said drag section, placing the cope and drag sections in super-imposed assembled relation to form a molding flask, pouring molten casting metal into said flask, moving said metal filled flask to a punchout station while allowing the molten metal to solidify to form a casting, punching out the casting and molding sand from said flask, moving the empty flask to said unstacker station, and then repeating the above-recited steps.

53. A method of making molds comprising the steps of supporting a horizontal flask comprising a cope section assembled on top of a drag section at an unstacker station, raising the cope section above the drag section at said unstacker station, moving the drag section longitudinally forwardly to a rollover station beyond the raised cope section, inverting the advanced drag section, lowering the raised cope section to the level of the advanced inverted drag section, advancing the cope and drag sections, raising the drag section, moving the raised drag section at right angles to the direction of previous movement of the cope and drag sections to a drag molding station, assembling a pattern plate with the underside of the drag section, pouring sand into the upper open end of the drag section and over the pattern plate, compressing the poured sand against the pattern plate, then removing the pattern plate from the drag section, then moving the drag section from the molding station to a filled drag rollover station, then reinverting the drag section at said last-recited rollover station, moving the reinverted drag section to a cope closer station, raising the cope section, moving the raised cope section at right angles to said direction of previous movement of the cope and drag sections to a cope molding station, assembling another pattern plate with the underside of the cope section, pouring sand into the upper open end of the cope section and over its pattern plate, compressing the poured sand against the last-recited pattern plate, then removing said pattern plate from the cope section, then moving the filled cope section to said cope closer station in vertical alignment above said drag section, placing the cope and drag sections in superimposed assembled relation to form a molding flask.

54. A method as recited in claim 53 wherein a plurality of flasks each comprising a cope section and a drag section are successively subjected to the operations of said recited steps, the sections of each flask being located at a respective one of said stations and being moved in series to the next succeeding station, said recited steps taking place substantially simultaneously on different respective flask sections.

55. A foundry apparatus comprising a circuitous movable conveyor, stand means extending alongside and adjacent a first portion of the conveyor for movably supporting a series of flask cope and drag sections in end-to-end relation, means for filling a drag section with molding sand and extending from said stand means at a first point thereof to a first station of a second portion of the conveyor opposite said first portion thereof, means for filling a cope section with molding sand and extending from said stand means at a second point thereof forwardly of said first point to a second station of said second conveyor portion forwardly of said first station, said filling means each including means for moving said flask sections from the respective points of said stand means to the respective stations of said second conveyor portion.

56. An apparatus as recited in claim 55 in combination with means for placing said filled drag section on the conveyor at said first station, means for moving the conveyor to convey said drag section to said second station, and means for placing the filled cope section on the drag section at said second station.

57. A foundry apparatus comprising means for conveying a series of flask drag and cope sections in end-to-end relation, a drag elevator means and a cope elevator means located at spaced points along said conveying means for raising flask sections arriving at said points, indexing means for restraining movement of said series of flask sections and permitting two sections at a time to travel along said conveying means to said cope and drag elevator means, respectively, a pair of molding machines each located adjacent a respective one of said elevator means, and a pair of sand measuring means associated with said molding machines respectively for moving the raised flask sections from their respective elevator means to said molding machines and for filling said flask sections with a predetermined quantity of molding sand.

58. A foundry apparatus comprising means for conveying a series of flask drag and cope sections in end-to-end relation, a drag elevator means and a cope elevator means located at spaced points along said conveying means for raising flask sections arriving at said points, a pair of molding machines each located adjacent a respective one of said elevator means, and a pair of sand measuring means associated with said molding machines respectively for moving the raised flask sections from their respective elevator means to said molding machines and for filling said flask sections with a predetermined quantity of molding sand.

59. An apparatus as recited in claim 58 wherein each of said sand measuring means comprises a hopper for containing a supply of sand, a measuring box reciprocally movable from a first position under said hopper and in communication therewith and over said raised flask section on the respective elevator means to a second position over the respective molding machine and then back again to said first position, and means on the measuring box for engaging said raised flask section to move the latter therewith to said second position in the molding machine, said measuring box comprising means for discharging sand therefrom into said flask section.

60. An apparatus as recited in claim 59 wherein each of said molding machines comprises a squeeze car reciprocally movable from a first location to a second location over said flask section when the latter is in said second position in the molding machine and then back again to said first location, said squeeze car having a strike-off means for removing the excess sand from the top of the flask section when the squeeze car moves to said second location.

61. An apparatus as recited in claim 60 wherein said strike-off means includes means positioned to engage the flask section for moving the latter with the squeeze car from the molding machine as the squeeze car moves from said second location to said first location.

62. An apparatus as recited in claim 61 and comprising a drag rollover device located at said first location adjacent the molding machine which is adjacent said drag elevator means, said strike-off means moving the filled drag section from the last-recited molding machine to said drag rollover device, the latter having means for inverting the drag section.

63. An apparatus as recited in claim 61 and comprising a cope closer device located at said first location adjacent the molding machine which is adjacent said cope elevator means, said strike-off means moving the filled cope section from the last-recited molding machine to said cope closer device.

64. An apparatus as recited in claim 61 and comprising a drag rollover device located at said first location adjacent the molding machine which is adjacent said drag elevator means, said strike-off means moving the filled drag section from the last-recited molding machine to said drag rollover device, the latter having means for inverting the drag section, a cope closer device located at said first location adjacent the molding machine which is adjacent said cope elevator means, said strike-off means moving the filled cope section from the last-recited molding machine to said cope closer device, conveyor means extending adjacent said drag rollover device, said drag rollover device having means for placing the filled drag section on said conveyor means, the latter including means for conveying said drag section to said cope closer means, the cope closer means having means for placing the filled cope section on said drag section.

65. A foundry apparatus comprising a molding machine, including means to assemble a pattern plate with the underside of a flask section, a sand measuring means for moving a flask section to said molding machine and for filling the assembled flask section with molding sand, said sand measuring means comprising a hopper for containing a supply of sand, a measuring box reciprocally movable from a first position under said hopper and in communication therewith and over said flask section to a second position over the molding machine and then back again to the first position, and means on the measuring box for engaging said flask section to move the latter therewith to said second position in the molding machine, said measuring box comprising means for discharging sand therefrom into said flask section.

66. An apparatus as recited in claim 65 wherein said molding machine comprises a squeeze car reciprocally movable from a first location to a second location over said flask section when the latter is in said second position in the molding machine and then back again to said first location said squeeze car having a strike-off means for removing the excess sand from the top of the flask section when the squeeze car moves to said second location.

67. An apparatus as recited in claim 66 wherein said strike-off means includes means positioned to engage the flask section for moving the latter with the squeeze car from the molding machine as the squeeze car moves from said second location to said first location.

68. An apparatus as recited in claim 67 and comprising a drag rollover device located at said first location adjacent the molding machine, said strike-off means moving the filled drag section from the molding machine to said drag rollover device, the latter having means for inverting the drag section.

69. An apparatus as recited in claim 68 and comprising a cope closer device located at said first location adjacent the molding machine, said strike-off means moving the filled cope section from the molding machine to said cope closer device.

70. A sand casting apparatus comprising means to support a horizontal flask comprising a cope section assembled on top of a drag section, means to separate the cope and drag sections so that the cope section is above the drag section, means to invert the drag section, means to cause the cope and drag sections to be disposed in tandem at the same level, means to assemble a pattern plate with the underside of the inverted drag section, means to pour sand on the upper open end of the inverted drag section and over its pattern plate, means to compress the poured sand against the pattern plate, means to separate the pattern plate from the sand filled drag section, means to reinvert the sand filled drag section after the pattern plate has been removed therefrom so that it is right side up, means to assemble a second pattern plate with the underside of the cope section, means to pour sand into the upper end of the cope section to fill the same and cover the pattern plate thereunder, means to compress the sand against the pattern plate in the cope section, means to separate the cope section from its pattern plate, a conveyor, means to place the reinverted drag section on the conveyor, means to place the cope section with the sand therein, after separation from its pattern plate, on top of the drag section on the conveyor, to form a molding flask.

71. The combination of claim 70, in combination with means to move the conveyor to bring the molding flask to a pouring station, means to place a weight on the molding flask, and means to pour molten casting metal into the weighted flask.

72. The combination of claim 71, in combination with means to remove the weight from the flask after the pouring operation, said conveyor moving means comprising means to move the conveyor for moving the flask to a further position, a punch out means, and means to move the flask from the conveyor to the punch out means, and means for operating the punch out means to punch out the casting and the sand from the flask.

References Cited in the file of this patent

UNITED STATES PATENTS

| | | |
|---|---|---|
| 938,904 | Sherman | Nov. 2, 1909 |
| 1,011,735 | Brown, Jr. | Dec. 12, 1911 |
| 2,570,927 | Fellows et al. | Oct. 9, 1951 |
| 2,588,669 | Taccone | Mar. 11, 1952 |
| 2,600,206 | Christensen | June 10, 1952 |
| 2,612,668 | Hutchison | Oct. 7, 1952 |
| 2,638,645 | Olson | May 19, 1953 |
| 2,651,087 | Fellows | Sept. 8, 1953 |
| 2,680,270 | Gedris | June 8, 1954 |
| 2,752,646 | Lasater et al. | July 3, 1956 |